United States Patent [19]
Yoshizumi et al.

[11] Patent Number: 5,896,434
[45] Date of Patent: Apr. 20, 1999

[54] POWER SUPPLY SYSTEM FOR DRIVING REACTOR COOLANT RECIRCULATION PUMPS

[75] Inventors: Masami Yoshizumi; Kazuhiro Narita; Fuminao Kamota, all of Yokohama, Japan

[73] Assignee: Kabushiki Kaisha Toshiba, Kawasaki, Japan

[21] Appl. No.: 08/899,676

[22] Filed: Jul. 24, 1997

[30] Foreign Application Priority Data

Jul. 24, 1996 [JP] Japan ................. 8-212163
Jan. 21, 1997 [JP] Japan ................. 9-008776

[51] Int. Cl.[6] ........................... G21C 15/243
[52] U.S. Cl. ................ 376/379; 376/210; 376/402
[58] Field of Search ................ 376/210, 379, 376/402, 404; 417/22, 45, 46

[56] References Cited

U.S. PATENT DOCUMENTS 3,753,002  8/1973  Jacobson et al. ............... 307/87
5,610,957  3/1997  Tanikawa et al. ............... 376/210

FOREIGN PATENT DOCUMENTS 6-347584  12/1994  Japan .
8-43579   2/1996   Japan .
8-50190   2/1996   Japan .

Primary Examiner—Daniel D. Wasil
Attorney, Agent, or Firm—Foley & Lardner

[57] ABSTRACT

A power supply system for driving reactor coolant recirculation pumps within an advanced boiling water reactor is configured in such a manner that: at least one normal-operation busbar branches off from either a main on-site power line or from a power line for auxiliary power generation that branches off from the main on-site power line, with a house transformer therebetween; at least one MG set is connected to one of these normal-operation busbars; one static adjustable-frequency power supply device is connected to each MG set; and a plurality of recirculation pumps is connected to each static adjustable-frequency power supply device.

10 Claims, 35 Drawing Sheets

POWER SUPPLY SYSTEM FOR DRIVING REACTOR COOLANT RECIRCULATION PUMPS

BACKGROUND OF THE INVENTION

1. Field of the Invention

The present invention relates to a power supply system for driving reactor coolant recirculation pumps in an advanced boiling water nuclear reactor and, in particular, to a power supply system for driving reactor coolant recirculation pumps which has a simple configuration and which is capable of keeping the plant functioning with a high degree of reliability if components thereof should fail.

2. Description of Related Art

In the power-generating plant of an advanced boiling water reactor (hereinafter abbreviated to ABWR), the coolant of the reactor is circulated by a number of reactor coolant recirculation pumps, such as ten pumps (where each is an reactor internal pump, hereinafter abbreviated to RIP). These RIPs use an internal recirculation method to circulate the coolant directly within the reactor of the ABWR.

The amount of coolant circulated by these RIPs is related to the reactivity of the core of the reactor, so this fact can be used to control the amount of coolant that is circulated by the RIPs and thus control the output of the reactor. Any halting of the RIPs by unforeseen causes has an effect on the health of the reactor (coolant) recirculation system (hereinafter abbreviated to RRS), and it could also stop the entire generating plant. Thus the power supply system for driving the RIPs must have a configuration such that the flow rate in the RIPs can be controlled and also the plant can be kept functioning with a high degree of reliability if components of the power system should fail.

The configuration of a prior-art power supply system for driving the reactor coolant recirculation pumps of an advanced boiling water nuclear generating plant is shown in FIG. 35. In this power supply system, an RRS has ten recirculation pumps RIP and each recirculation pump RIP has a static adjustable-frequency power supply device (an adjustable-speed drive, hereinafter abbreviated to ASD). Each static adjustable-frequency power supply device ASD causes changes in the power frequency to control the speed of the corresponding RIP, thus adjusting the flow rate through the core to implement output control of the reactor. An inverter method is generally used for this.

In this prior-art power supply system for driving reactor coolant recirculation pumps, the ten recirculation pumps RIP are divided into two groups of five pumps connected to two normal-operation busbars A and B. The normal-operation busbars A and B are designed to supply power to auxiliary devices of the generating plant, such as the recirculation pumps RIP, and each is connected to a main on-site power line 2 by a house transformer HT. These normal-operation busbars A and B are provided as metal-enclosed switchgear (M/C), and each is designed so that the cables of auxiliary generating equipment such as the recirculation pumps, reactor water feed pumps, etc. can be connected thereto.

With each of the normal-operation busbars A and B, two of the static adjustable-frequency power supply devices ASD are connected directly to the busbar and three of the static adjustable-frequency power supply devices ASD are each connected thereto by an MG set 3, which is usually configured of an electric motor M and a generator G with a flywheel FW attached. Such an MG set 3 causes the generator G with attached flywheel FW to rotate by driving the electric motor M, enabling electrical power to be supplied to the corresponding recirculation pumps RIP.

The main on-site power line 2 is supplied with electrical power by a main generator SG that is rotated by steam from the reactor to generate electricity. The power supplied to the main on-site power line 2 is supplied to the recirculation pumps RIP through the house transformers HT on the one hand, and it is also transmitted to external transmission cables through a transmission transformer MT.

With this prior-art power supply system for driving reactor coolant recirculation pumps in an advanced boiling water nuclear generating plant, the power generated by the main generator SG is supplied to the static adjustable-frequency power supply devices ASD through the house transformers HT, normal-operation busbars A and B, and MG sets 3, etc., and the frequencies of voltages flowing thereto can be controlled by the static adjustable-frequency power supply devices ASD to control the rotational speeds of the corresponding RIPs. This adjusts the flow rate of coolant passing through the core, enabling control over the output of the reactor.

This configuration also makes it possible to prevent three or more recirculation pumps RIP from stopping simultaneously, even if a single failure occurs in one of the MG sets 3 or static adjustable-frequency power supply devices ASD that configure the power supply system for driving reactor coolant recirculation pumps.

However, with this prior-art power supply system for driving reactor coolant recirculation pumps, one static adjustable-frequency power supply device ASD is provided for driving each of the recirculation pumps RIP. Thus the installation configuration is complicated and also expensive. With a prior-art system of this configuration, a failure caused by the stopping of a recirculation pump RIP by the failure of one static adjustable-frequency power supply device ASD goes no further than that one unit and so has little effect, but, on the other hand, there is a large number of static adjustable-frequency power supply devices ASD. For that reason, there has long been a requirement in the art to provide the power supply system for driving reactor coolant recirculation pumps with an installation configuration that is as simple as possible.

Furthermore, if one MG set should fail in the above-described prior-art power supply system for driving reactor coolant recirculation pumps, three recirculation pumps RIP are halted. However, if three or more RIPs are halted simultaneously, it is difficult to absolutely guarantee the flow rate of coolant through the core of the ABWR, which could lead to a drop in the rated output of the nuclear generating plant.

Thus there is a requirement in the art, particularly in the development of the next generation of boiling water reactors, to provide a configuration that ensures that simultaneous failures of RIPs are restricted to no more than two RIPs, a 100% flow rate is guaranteed without any problems in the core even when two RIPs have halted (with at least eight RIPs still operating), and thus the rated output of the nuclear generating plant can be maintained.

An objective of this invention is therefore to provide a power supply system for driving reactor coolant recirculation pumps that has a simple configuration with a reduced number of ASDs in the ABWR.

Another objective of this invention is to provide a power supply system for driving reactor coolant recirculation pumps in which there is an extremely low probability of any number of RIPs halting simultaneously, other than two RIPs, and which makes it possible to maintain the rated output of the plant if two RIPs should halt simultaneously.

SUMMARY OF THE INVENTION

The above objectives can be achieved by a configuration in which a plurality of recirculation pumps RIP is driven by one static adjustable-frequency power supply device ASD, the specifications of the MG sets and static adjustable-frequency power supply devices ASD are made common, a plurality of power supply busbars are used for auxiliary power generation, and rectifiers and inverters are utilized.

DESCRIPTION OF PREFERRED EMBODIMENTS

Embodiments of this invention are described below with reference to the accompanying drawings. Note that the reactor coolant recirculation pumps mentioned below are arrayed substantially equidistantly around the core of the reactor and reactor coolant recirculation pumps that use a power supply in common are positioned substantially symmetrically with respect to each other. This ensures that no unbalance occurs in the flow rate distribution within the reactor if a fault occurs such as a failure of the power supply system equipment used to drive the reactor coolant recirculation pumps. Therefore, reactor coolant recirculation pumps that use power lines in common are arranged in such a fashion that they are not physically adjacent to each other. It should be noted, however, that reference numbers that are assigned to the reactor coolant recirculation pumps in the following descriptions of the embodiments of the present invention are arranged sequentially for convenience and to make the details of the invention more comprehensible.

Figure 1:
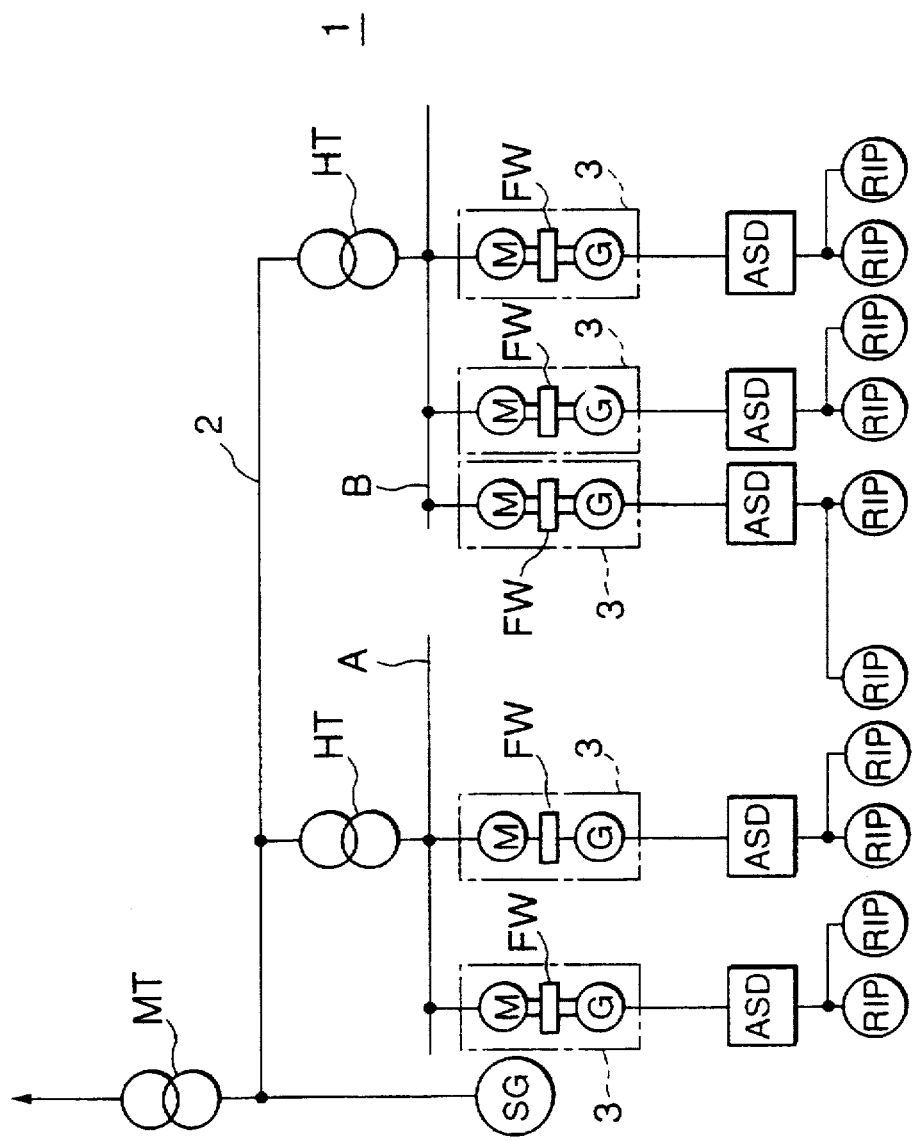
FIG. 1 shows the configuration of a power supply system for driving reactor coolant recirculation pumps of an advanced boiling water nuclear generating plant, in accordance with a first embodiment of the invention.

A first embodiment of this invention, as set forth in claim 1 herein, will be described first. The configuration of a power supply system for driving reactor coolant recirculation pumps in accordance with this first embodiment of the invention is shown in FIG. 1.

As shown in this figure, the power supply system 1 for driving reactor coolant recirculation pumps in accordance with this first embodiment of the invention is configured in such a manner that normal-operation busbars A and B are each connected to a main on-site power line 2 by a house transformer HT, two MG sets 3 are connected to the normal-operation busbar A, three MG sets 3 are connected to the normal-operation busbar B, one static adjustable-frequency power supply device ASD is connected to each MG set 3, and two recirculation pumps RIP are connected to each static adjustable-frequency power supply device ASD. The main on-site power line 2 is supplied with electrical power by a main generator SG that is rotated by steam from the reactor to generate electricity. The power supplied to the main on-site power line 2 is supplied to the recirculation pumps RIP through the house transformers HT on the one hand, and it is also transmitted to external transmission cables through a transmission transformer MT.

Note that the configuration of this embodiment is such that there are two normal-operation busbars, as described above, two and three MG sets 3 are connected to these normal-operation busbars A and B, respectively, and two recirculation pumps RIP are connected to each of the static adjustable-frequency power supply devices ASD. However, the numbers of these components are not limited by this invention, so long as at least one MG set 3 is connected to one normal-operation busbar and a plurality of recirculation pumps RIP is connected to one static adjustable-frequency power supply device ASD. In the present invention, irrespective of a manner of connection of the normal-operation busbar to the main on site power line system, etc., it suffices that a combination of the MG set 3 of the above-described structure, the static adjustable-frequency power supply device ASD and the reactor internal pump RIP is connected to the normal-operation busbar. The present invention covers, for example, an arrangement that a plurality of normal-operation busbar are connected to the main on-site power line or a power line for the auxiliary power generation which will be described later through one house transformer, and the combination of the MG set 3 of the above-described structure, the static adjustable-frequency power supply device ASD and the reactor internal pump RIP to one of the plural normal-operation busbar.

An MG set 3 is usually configured of an electric motor M and a generator G with a flywheel FW attached. Such an MG set 3 causes the generator G with attached flywheel FW to rotate by driving the electric motor M, enabling electrical power to be supplied to the corresponding recirculation pumps RIP. The flywheel FW is provided to ensure that, if a momentary interruption should occur in the electrical power, the inertia thereof will keep the recirculation pumps RIP operating. It should be noted, however, that this means of exerting inertia is not limited to the flywheel FW if other means can be provided. For example, means such as a fluid coupling could be provided between the electric motor M and the generator G. Furthermore, this means of exerting inertia could be omitted if it is not necessary. Note also that the above-described configurations relating to the MG sets are common to all the embodiments below.

If this first embodiment is employed, the configuration is such that power is supplied to drive ten recirculation pumps RIP for the entire nuclear generating plant by five MG sets 3 and five static adjustable-frequency power supply devices ASD. This enables a simpler system configuration in comparison with the prior-art power supply system for driving reactor coolant recirculation pumps in which ten recirculation pumps RIP are driven by ten static adjustable-frequency power supply devices ASD. The number of recirculation pumps RIP that are halted at the same time by a failure of a single MG set 3 or static adjustable-frequency power supply device ASD can thus be limited to two.

Note that, since the static adjustable-frequency power supply devices ASD in this embodiment are connected to the normal-operation busbars A and B by the MG sets 3, leakage of high frequency current into the normal-operation busbars A and B due to the switching of the static adjustable-frequency power supply device ASD can be prevented. This is because leakage of high-frequency components to the main on-site power line 2 side can be prevented by the way in which the MG sets are connected physically to the input portions of the static adjustable-frequency power supply devices ASD, but are isolated therefrom electrically.

The above first embodiment can be further developed by providing a plurality of normal-operation busbars, or a plurality of power lines on the upstream side, thus further reducing the probability of a number of recirculation pumps RIP stopping simultaneously if a single busbar failure occurs. Second to ninth embodiments which are described below are aspects of the present invention that are based on this concept.

Figure 2:
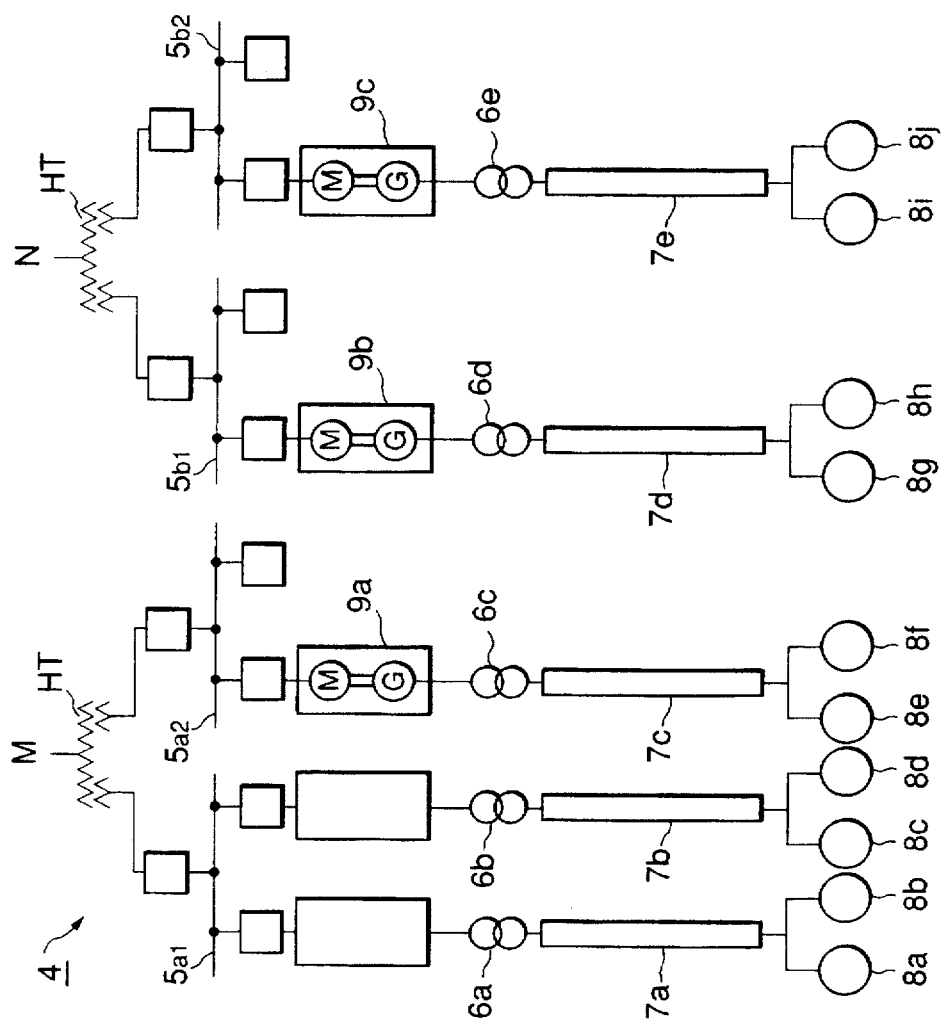
FIG. 2 shows the configuration of a second embodiment of the power supply system for driving reactor coolant recirculation pumps.

The configuration of a power supply system for driving reactor coolant recirculation pumps in accordance with a second embodiment of this invention, as defined in claim 2, is shown in FIG. 2.

A power supply system 4 for driving reactor coolant recirculation pumps of this embodiment has two power lines M and N for auxiliary power generation that branch off from a main on-site power line (not shown in the figure), two normal-operation busbars 5a1 and 5a2 are connected by a house transformer HT to the first power line M for auxiliary power generation, and two normal-operation busbars 5b1 and 5b2 are connected by another house transformer HT to the other power line N for auxiliary power generation. These normal-operation busbars 5a1, 5a2, 5b1, and 5b2 are preferably provided as metal-enclosed switchgear.

Furthermore, two static adjustable-frequency power supply devices ASD 7a and 7b are connected directly to the normal-operation busbar 5a1 of the first power line M for auxiliary power generation and one static adjustable-frequency power supply device ASD 7c is connected by an MG set 9a to the other normal-operation busbar 5a2 thereof. If necessary in this case, input transformers 6a to 6c are provided for the static adjustable-frequency power supply devices ASD 7a to 7c, respectively. In addition, two of a group of recirculation pumps RIP 8a to 8f are connected to each of the static adjustable-frequency power supply devices ASD 7a to 7c.

One static adjustable-frequency power supply device ASD 7d is connected by an MG set 9b to the normal-operation busbar 5b1 of the other power line N for auxiliary power generation. Similarly, one static adjustable-frequency power supply device ASD 7e is connected by an MG set 9c to the other normal-operation busbar 5b2 of the power line N for auxiliary power generation.

If necessary, input transformers 6d and 6e are provided for the static adjustable-frequency power supply devices ASD 7d and 7e, respectively. Two of a group of recirculation pumps RIP 8g to 8j are connected to each of the static adjustable-frequency power supply devices ASD 7d and 7e.

This configuration ensures that two pairs of RIPs without MG sets (MG-less RIPs) 8a and 8b, and 8c and 8d are connected to the first normal-operation busbar 5a1 of the power line M for auxiliary power generation in the power supply system 4 for driving reactor coolant recirculation pumps of this embodiment, and one pair of RIPs with MG sets (MG-equipped RIPs) 8e and 8f is connected to the other normal-operation busbar 5a2 thereof. One pair of MG-equipped RIPs 8g and 8h, and 8i and 8j is connected to each of the normal-operation busbars 5b1 and 5b2, respectively, of the power line N for auxiliary power generation. Viewed overall, the power supply system 4 for driving reactor coolant recirculation pumps of this embodiment is configured to drive ten recirculation pumps RIP 8a to 8j by three MG sets 9a to 9c and five static adjustable-frequency power supply devices ASD 7a to 7e. In addition, the power lines of this power supply system 4 for driving reactor coolant recirculation pumps comprise a total of four normal-operation busbars 5a1, 5a2, 5b1, and 5b2 connected by house transformers HT to two power lines M and N.

Figure 35:
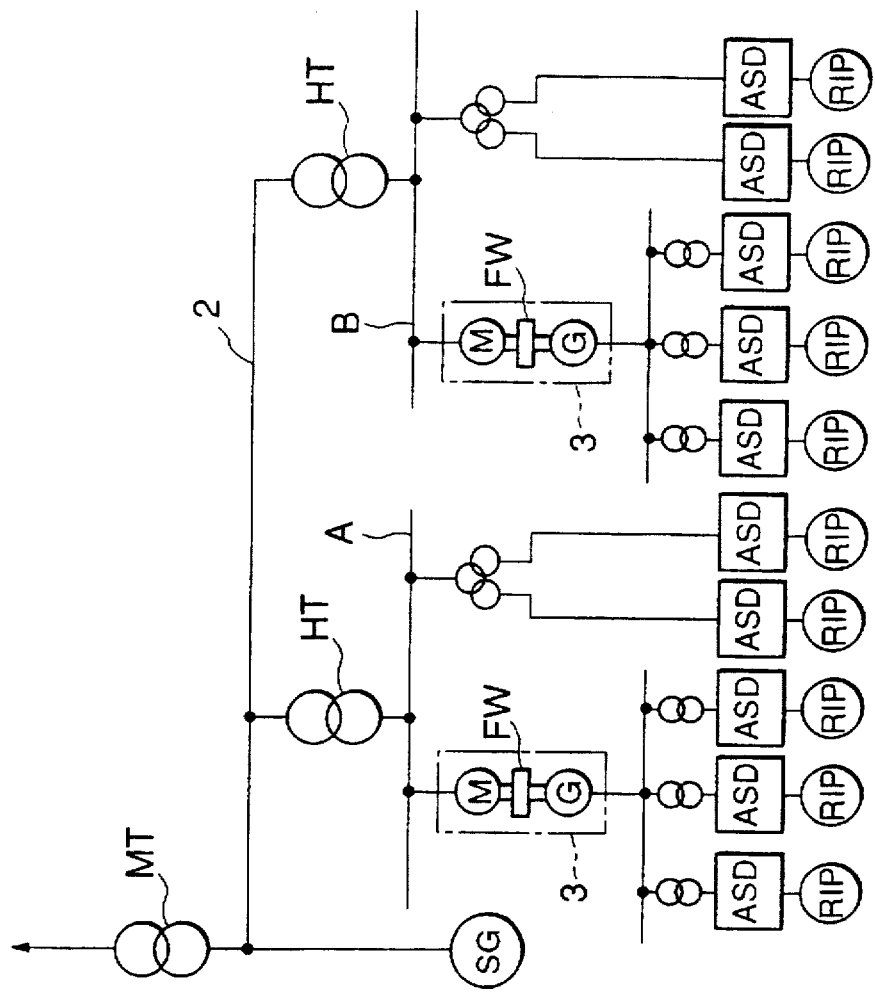
FIG. 35 shows the configuration of a prior-art power supply system for driving reactor coolant recirculation pumps of an advanced boiling water nuclear generating plant.

Since the above configuration ensures that each of the MG sets 9a to 9c drives two recirculation pumps RIP in the power supply system 4 for driving reactor coolant recirculation pumps of this embodiment, it is sufficient to ensure that each of the MG sets has a unit capacity that is two-thirds that of the prior-art system in which three recirculation pumps RIP are driven by each MG set. Five input transformers 6a to 6e are provided, which is fewer than those required in the prior-art power supply system for driving reactor coolant recirculation pumps (in which there is a total of eight input transformers, as shown in FIG. 35), and this also enables the use of components with common specifications.

In addition, the static adjustable-frequency power supply devices ASD 7a to 7e are shared in such a manner that each ASD drives two recirculation pumps RIP, which means that the capacity of single components is twice that of the prior art but the number of installed components can be reduced to five; half the ten of the prior art. Moreover, these static adjustable-frequency power supply devices ASD can be made to have common specifications, which helps make the structural components simpler and easier to maintain. Note that three MG sets 9a to 9c drive the six RIPs 8e to 8j, the same number as in the prior art, so that they fulfill the role of providing supplementary inertia if a momentary halt occurs in the power line or an external power loss occurs.

The power supply system 4 for driving reactor coolant recirculation pumps of this embodiment makes it possible to restrict the number of halted RIPs to no more than two, regardless of which single failure occurs among the RIP power line components (the ASDs, input transformers, and MG sets, etc.), so that operation can be continued with the remaining eight RIPs without any drop in the rated output of the plant. The above-described inertia of the MG sets 9a to 9c also makes it possible for operation to continue without any drop in the rated output of the plant, even if there should be a momentary halt or loss in the power supply system.

In other words, if a single failure should occur in the RIPs 8a to 8j, it is inevitable that one of the RIPs 8a to 8j will halt. If such a failure occurs in the input transformers 6a and 6b and ASDs 7a and 7b, only one pair of RIPs 8a and 8b or 8c and 8d will be halted.

Furthermore, if a failure should occur amongst the MG sets 9a to 9c, the input transformers 6c to 6e, the ASDs 7c to 7e, and the normal-operation busbar 5a2, 5b1, and 5b2, one pair of RIPs 8e and 8f, 8g and 8h, or 8i and 8j will be halted, but in no case will three or more RIPs be halted.

There now follows an investigation of calculations of the frequencies at which trips occur in various different numbers of the RIPs 8a to 8j in the power supply system 4 for driving reactor coolant recirculation pumps. Note that these trip frequencies per numbers of RIPs are obtained from fault trees relating to the number of RIPs that are tripped by individual primary factors.

Figure 3:
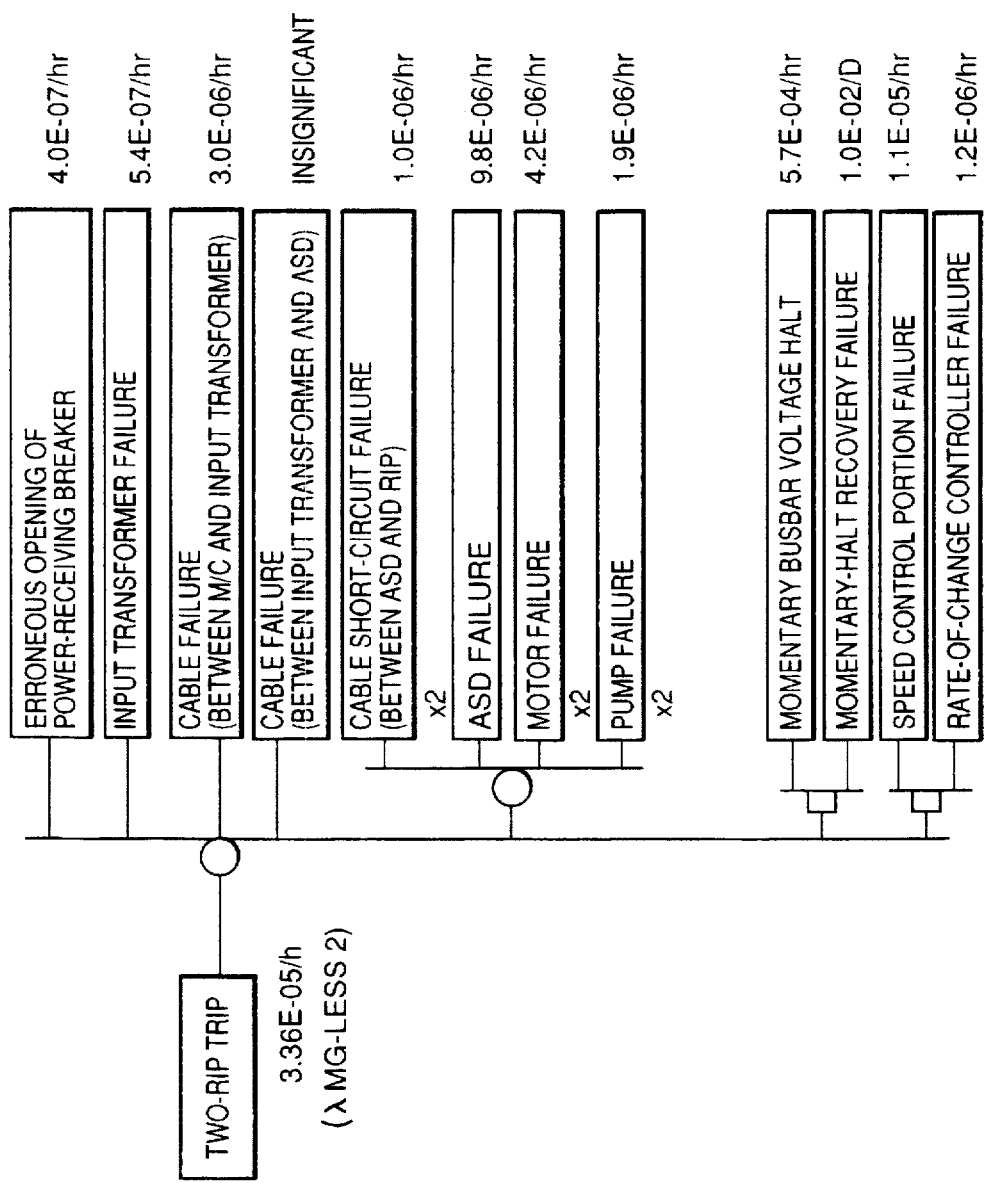
FIG. 3 shows a fault tree of the causes and frequencies of two-RIP trips in RIPs without MG sets (MG-less RIPs)
Figure 4:
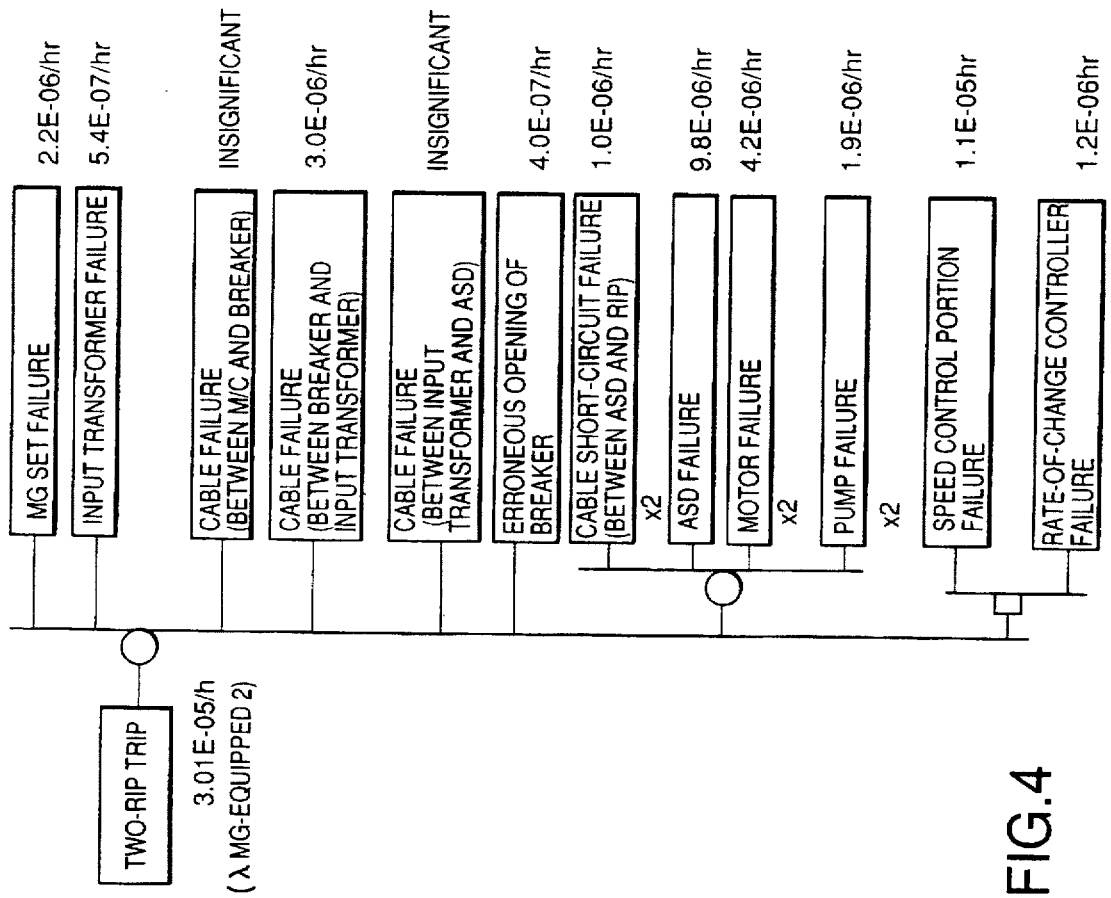
FIG. 4 shows a fault tree of the causes and frequencies of two-RIP trips in RIPs with MG sets (MG-equipped RIPs)
Figure 5:
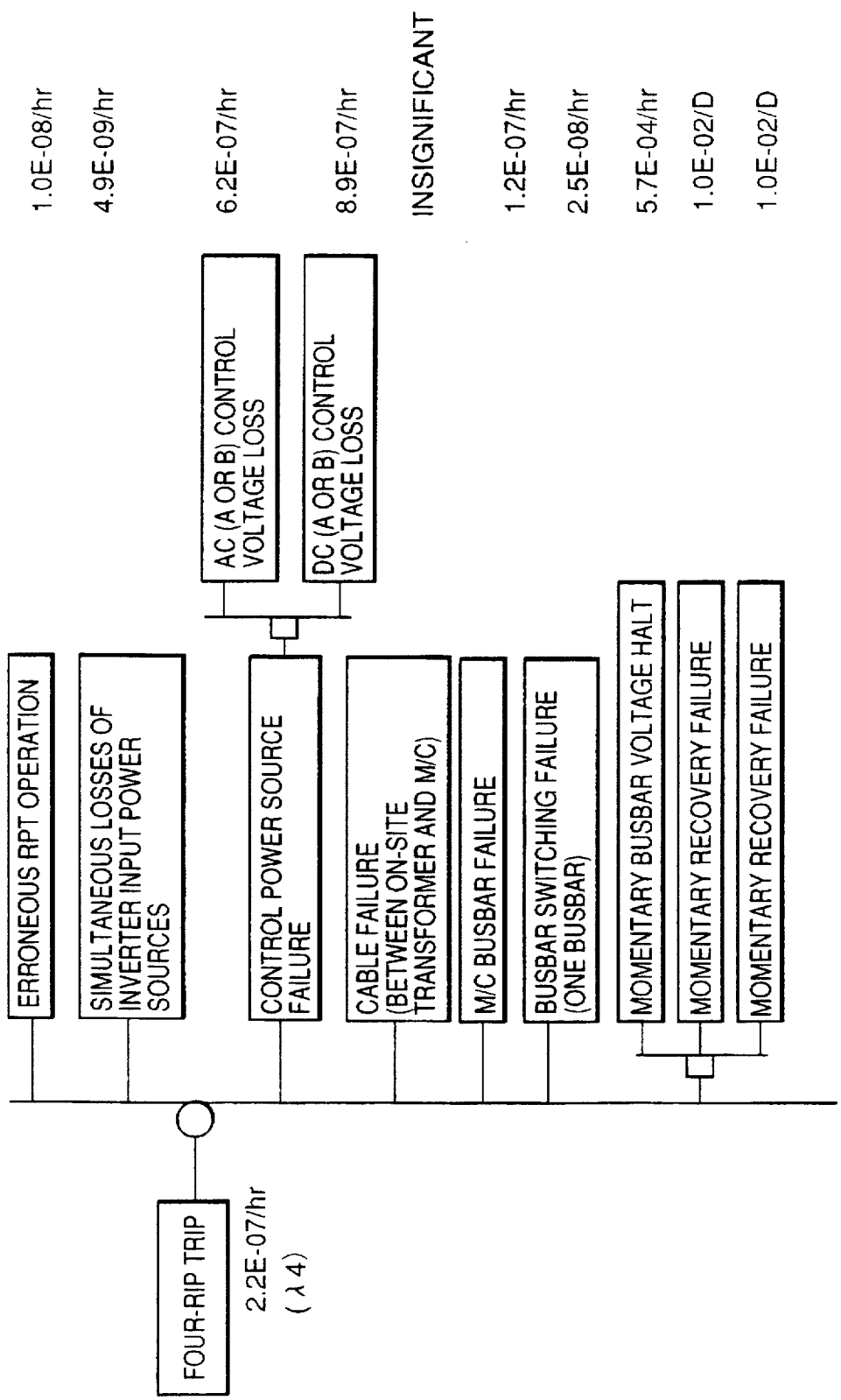
FIG. 5 shows a fault tree of the causes and frequencies of four-RIP trips.

A fault tree of the causes and frequencies of two-RIP trips in RIPs that are not connected to MG sets (MG-less RIPs) is shown in FIG. 3, a fault tree of the causes and frequencies of two-RIP trips in RIPs that are connected to MG sets (MG-equipped RIPs) is shown in FIG. 4, and a fault tree of the causes and frequencies of four-RIP trips is shown in FIG. 5.

Figure 6:
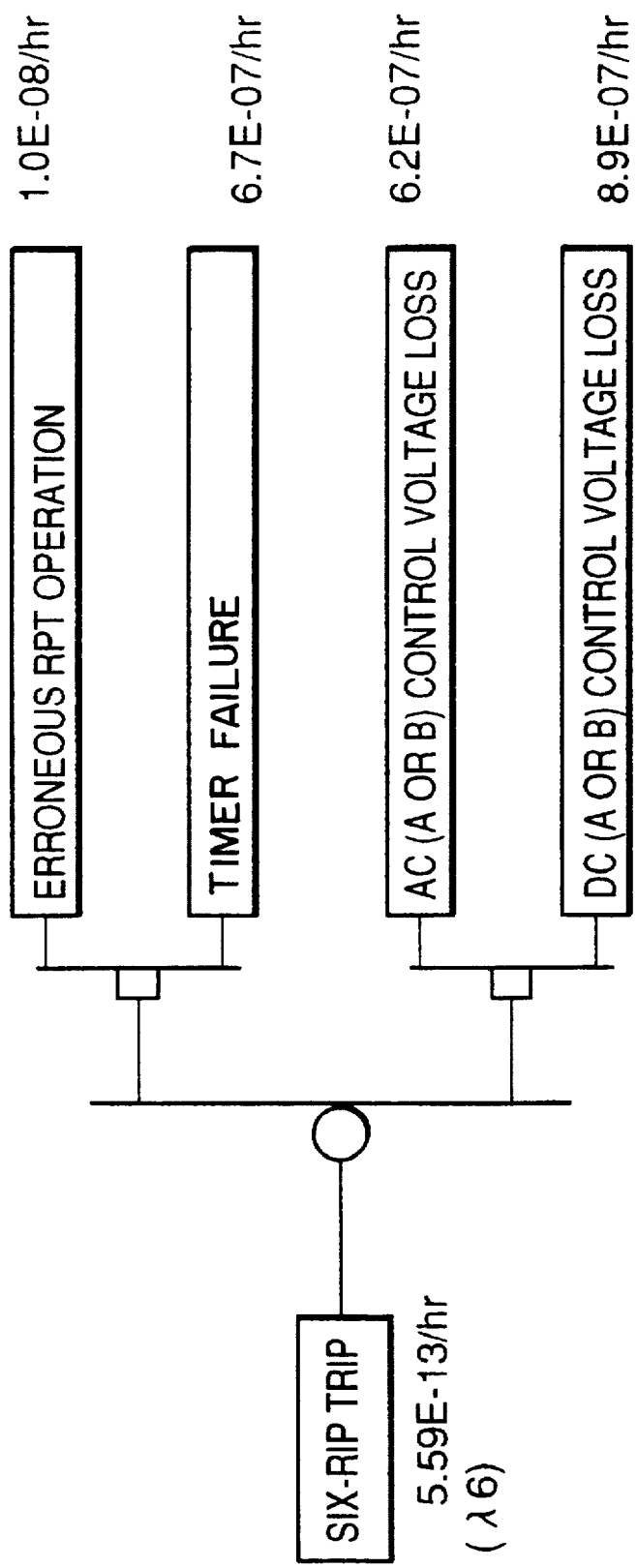
FIG. 6 shows a fault tree of the causes and frequencies of six-RIP trips.
Figure 7:
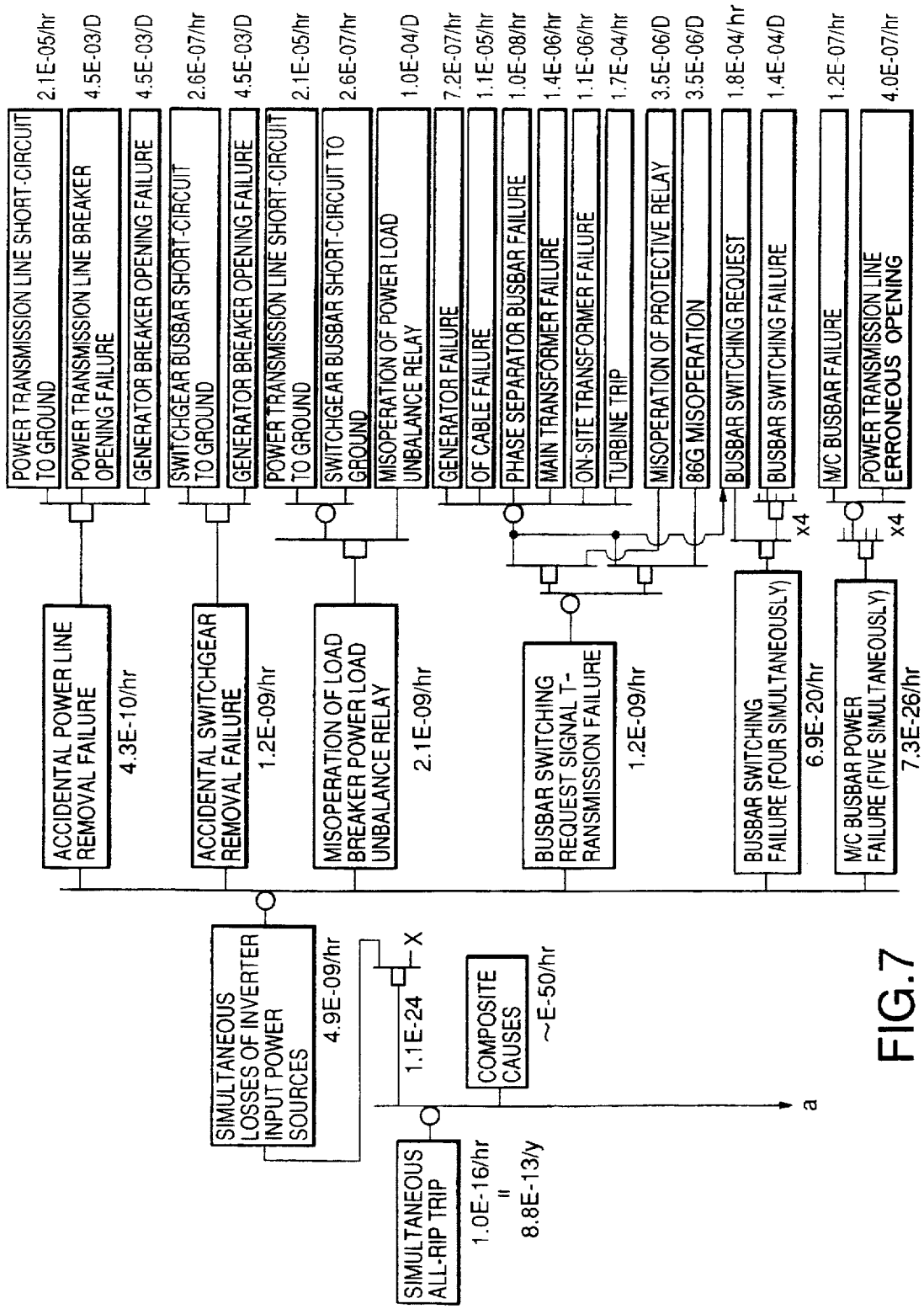
FIG. 7 shows a fault tree of the causes and frequencies of simultaneous all-RIP trips (ten-RIP trips)
Figure 8:
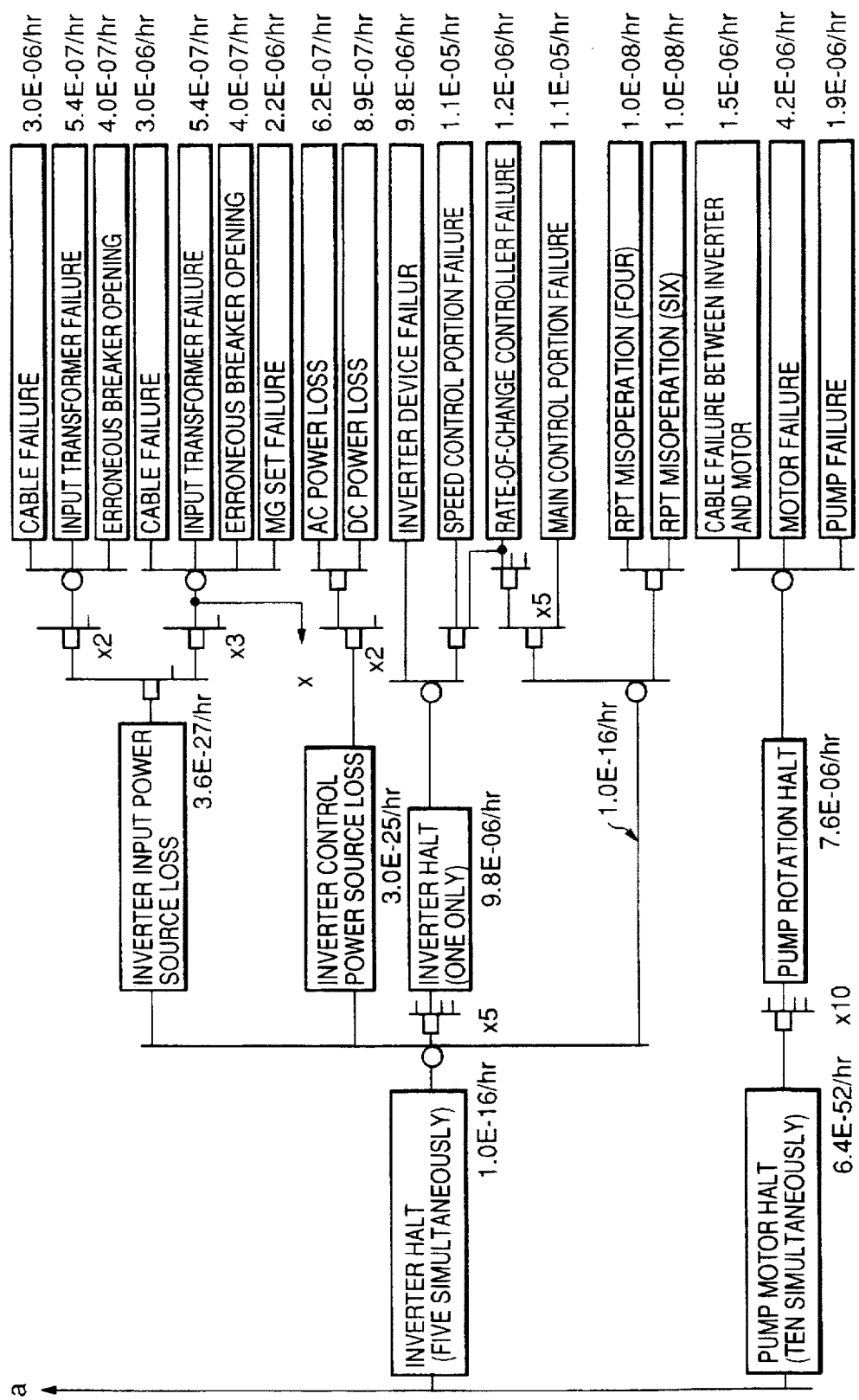
FIG. 8 is a continuation of the fault tree of FIG. 7.

In the fault tree of FIG. 6 showing the causes and frequencies of six-RIP trips, the causes and frequencies when all (ten) of the RIPs trip simultaneously are divided into two for the sake of convenience in the description, and are shown as a fault tree extending over FIGS. 7 and 8, connected by arrows a—a. The trip frequencies for each number of RIPs 8a to 8j can be calculated as follows by combining these fault trees:

one-RIP trip frequency=0 two-RIP trip frequency=$2\lambda$MG-less2+$3\lambda$MG-equipped2 =$1.12\times10^0$/year three-RIP trip frequency=0 four-RIP trip frequency=$\lambda4+\lambda$MG-less$2^2$+$2\lambda$MG-less2 $\times3\lambda$MG-equipped2+$3\lambda$MG-equipped$2^2$=$2.01\times10^{-3}$/year five-RIP trip frequency=0 six-RIP trip frequency=$\lambda6+\lambda4\times3\lambda$MG-equipped2+$\lambda$MG-less$2^2\times3\lambda$MG-equipped2+$2\lambda$MG-less2$\times3\lambda$MG-equipped$2^2$+$\lambda$MG-equipped$2^3$=$1.82\times10^{-7}$/year seven-RIP trip frequency=0 eight-RIP trip frequency=$\lambda6\times2\lambda$MG-equipped2+$\lambda4\times3\lambda$MG-equipped$2^2$+$\lambda$MG-less$2^2\times3\times$MG-equipped$2^2$+$2\lambda$MG-less2$\times\lambda$MG-equipped$2^3$=$5.72\times10^{-12}$/year nine-RIP trip=0 ten-RIP trip=$8.8\times10^{-13}$/year

It can be seen from the above that the only one of the above frequencies that is as high as $10^{-2}$/year, a transient phenomenon, is the two-RIP trip phenomenon. In addition, the all-RIP trip frequency is equivalent to that of existing systems.

This ends the description of the second embodiment. The description now turns to a power supply system for driving reactor coolant recirculation pumps in accordance with a third embodiment of this invention.

Figure 9:
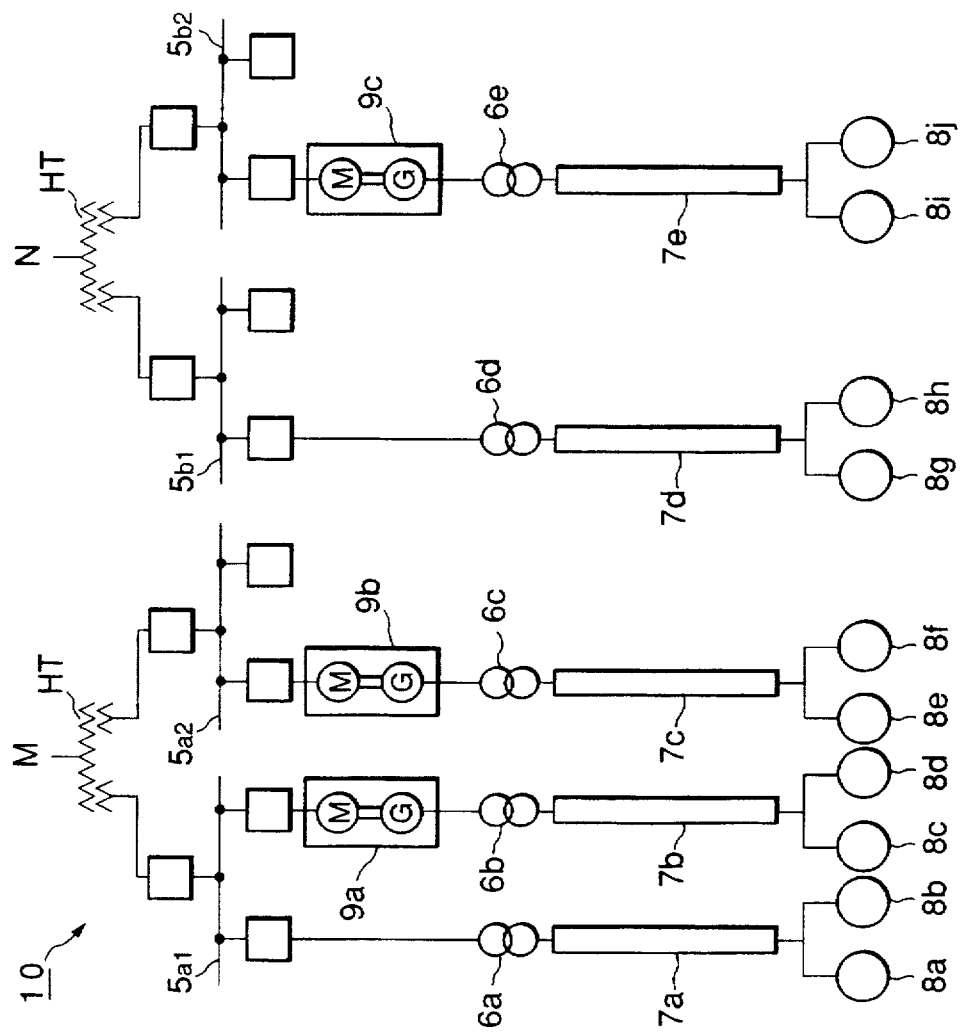
FIG. 9 shows the configuration of a third embodiment of the power supply system for driving reactor coolant recirculation pumps.

The system configuration of a power supply system 10 for driving reactor coolant recirculation pumps in accordance with this third embodiment is shown in FIG. 9. Note that components thereof that are the same as those of the second embodiment are denoted by the same reference numbers, to facilitate comprehension of this embodiment.

The power supply system 10 for driving reactor coolant recirculation pumps of this third embodiment differs from the above-described power supply system for driving reactor coolant recirculation pumps of the second embodiment in that the MG-less RIPs 8c and 8d connected to the normal-operation busbar 5a1 are replaced with MG-equipped RIPs 8c and 8d and the MG-equipped RIPs 8g and 8h connected to the normal-operation busbar 5b1 are replaced with MG-less RIPs 8g and 8h. Specific details of this configuration are given below.

As shown in FIG. 9, the power supply system 10 for driving reactor coolant recirculation pumps of this embodiment is configured in such a manner that two power lines M and N for auxiliary power generation branch off from a main on-site power line (not shown in the figure), two normal-operation busbars 5a1 and 5a2 are connected by a house transformer HT to the first power line M for auxiliary power generation, and two normal-operation busbars 5b1 and 5b2 are connected by another house transformer HT to the other power line N for auxiliary power generation.

Furthermore, one static adjustable-frequency power supply device ASD 7a is connected directly to the normal-operation busbar 5a1 of the first power line M for auxiliary power generation and also one static adjustable-frequency power supply device ASD 7b is connected by an MG set 9a thereto. In addition, one static adjustable-frequency power supply device ASD 7c is connected by an MG set 9b to the normal-operation busbar 5a2 of this power line M for auxiliary power generation.

One static adjustable-frequency power supply device ASD 7d is connected directly to the normal-operation busbar 5b1 of the other power line N for auxiliary power generation and another static adjustable-frequency power supply device ASD 7e is connected by an MG set 9c to the normal-operation busbar 5b2 of this power line N for auxiliary power generation.

Note that input transformers 6a to 6e are provided for the static adjustable-frequency power supply devices ASD 7a to 7e, respectively, if necessary, in a manner similar to that of the second embodiment. Furthermore, two of the group of recirculation pump RIPs 8a to 8j are connected to each of the static adjustable-frequency power supply devices ASD 7a to 7e.

Thus the power supply system 10 for driving reactor coolant recirculation pumps of this embodiment is configured in such a manner that one pair of MG-less RIPs 8a and 8b and one pair of MG-equipped RIPs 8c and 8d are connected to the first normal-operation busbar 5a1 of the power line M for auxiliary power generation and one pair of MG-equipped RIPs 8e and 8f is connected to the other normal-operation busbar 5a2 thereof. In addition, one pair of MG-less RIPs 8g and 8h is connected to the normal-operation busbar 5b1 of the power line N for auxiliary power generation and one pair of MG-equipped RIPs 8i and 8j is connected to the other normal-operation busbar 5b2 thereof.

Viewed overall, the power supply system 10 for driving reactor coolant recirculation pumps of this embodiment is configured to drive ten recirculation pumps RIP 8a to 8j by three MG sets 9a to 9c and five static adjustable-frequency power supply devices ASD 7a to 7e, in the same way as in the system of the second embodiment. In addition, the power supply system is similar to the above second embodiment in that a total of four normal-operation busbars 5a1, 5a2, 5b1, and 5b2 are connected by house transformers HT to the two power lines M and N.

With the above configuration, the power supply system 10 for driving reactor coolant recirculation pumps of this embodiment makes it possible to simplify the structural components and use common specifications therefor, in a similar manner to the second embodiment. In addition, the number of halted RIPs is restricted to no more than two, regardless of which single failure occurs among the RIP power line components (the ASDs, input transformers, and MG sets, etc.), so that operation can be continued with the remaining eight RIPs without any drop in the rated output of the plant. The above-described inertia of the MG sets 9a to 9c also makes it possible for operation to continue without any drop in the rated output of the plant, even if there should be a momentary halt or loss in the power supply system.

There now follows an investigation of calculations of the frequencies at which trips occur in various different numbers of the RIPs 8a to 8j in the power supply system 10 for driving reactor coolant recirculation pumps of this embodiment.

Figure 11:
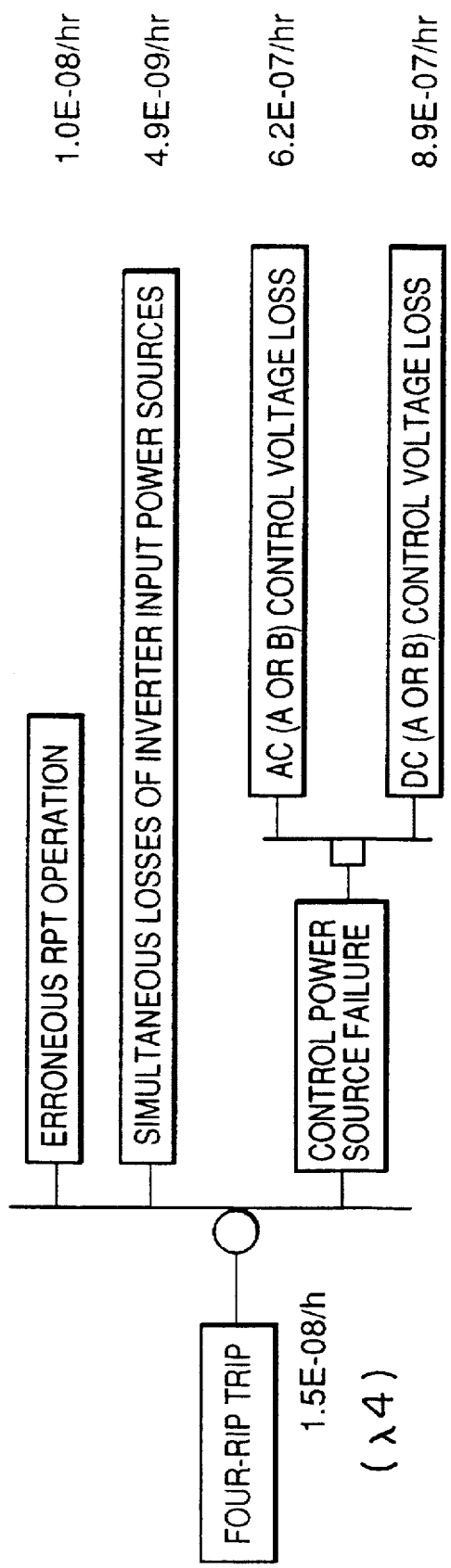
FIG. 11 is a fault tree of the causes and frequencies of four-RIP trips.

For the power supply system 10 for driving reactor coolant recirculation pumps of this embodiment, a fault tree of the causes and frequencies of two-RIP trips in MG-equipped RIPs is shown in FIG. 4, and a fault tree of the causes and frequencies of four-RIP trips is shown in FIG. 11.

In addition, a fault tree of the causes and frequencies of six-RIP trips is shown in FIG. 6 and a fault tree of the causes and frequencies of simultaneous all-RIP trips (ten-RIP trips) is shown extending over FIGS. 7 and 8. The trip frequencies for each number of RIPs 8a to 8j can be calculated as follows by combining these fault trees:

one-RIP trip frequency=0 two-RIP trip frequency=$2\lambda MG\text{-less}2+3\lambda MG\text{-equipped}2$ =$1.38\times 10^{-6}$/year three-RIP trip frequency=0 four-RIP trip frequency=$\lambda 4+\lambda MG\text{-less}2^2+2\lambda MG\text{-less}2 \times 3\lambda MG\text{-equipped}2+3\lambda MG\text{-equipped}2^2=2.19\times 10^{-4}$/year five-RIP trip frequency=0 six-RIP trip frequency=$\lambda 6+\lambda 4\times 3\lambda MG\text{-equipped}2+\lambda MG\text{-less}2^2\times 3\lambda MG\text{-equipped}2+2\lambda MG\text{-less}2\times 3\lambda MG\text{-equipped}2^2+\lambda MG\text{-equipped}2^3=1.94\times 10^{-8}$/year seven-RIP trip frequency=0 eight-RIP trip frequency=$\lambda 6\times \lambda MG\text{-less}2+\lambda 6\times \lambda MG\text{-equipped}2+\lambda 4\times 3\lambda MG\text{-equipped}2^2+\lambda MG\text{-less}2^2\times 3\lambda MG\text{-equipped}2^2+2\lambda MG\text{-less}2\times \lambda MG\text{-equipped}2^3=7.14\times 10^{-13}$/year nine-RIP trip frequency=0 ten-RIP trip frequency=$8.8\times 10^{-13}$/year

It can be seen from the above that the only one of the above frequencies that is as high as $10^{-2}$/year, a transient phenomenon, is the two-RIP trip phenomenon. In addition, the all-RIP trip frequency is equivalent to that of existing systems.

Note that a comparison of the power supply system 10 for driving reactor coolant recirculation pumps with the second embodiment shows that the RIPs connected to the same normal-operation busbar 5a1 are a pair of MG-less RIPs 8a and 8b and a pair of MG-equipped RIPs 8c and 8d. Thus the effect of inertia in the MG set 9a ensures that the number of RIPs tripped directly by a failure in the normal-operation busbar 5a1 or components upstream thereof can be halved from the four RIPs 8a to 8d to the two RIPs 8a and 8b.

As a result, each of the four-, six-, and eight-RIP trip frequencies is reduced and thus the reliability of the power supply system 10 for driving reactor coolant recirculation pumps is improved.

This ends the description of the third embodiment. The description now turns to a power supply system for driving reactor coolant recirculation pumps in accordance with a fourth embodiment of this invention.

Figure 12:
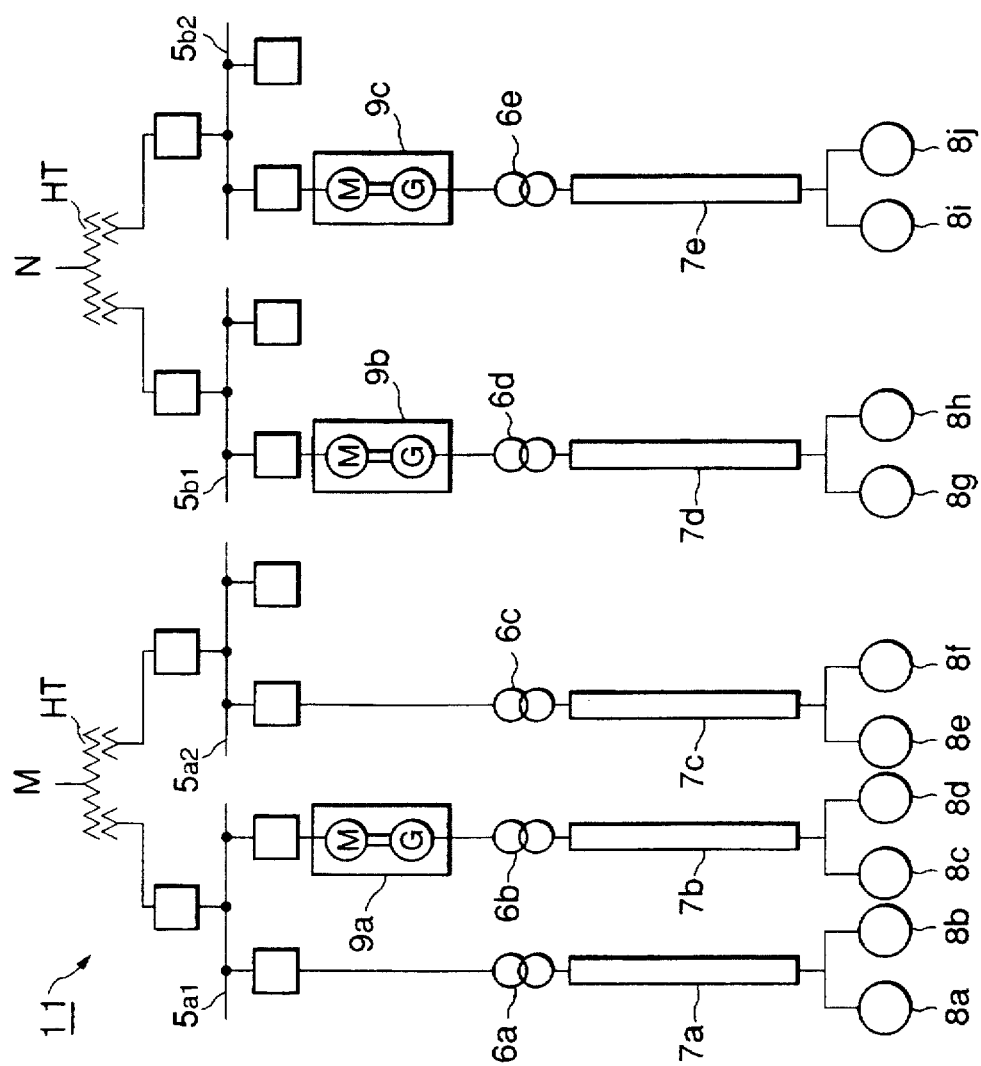
FIG. 12 shows the configuration of a fourth embodiment of the power supply system for driving reactor coolant recirculation pumps.

The system configuration of a power supply system 11 for driving reactor coolant recirculation pumps in accordance with this fourth embodiment is shown in FIG. 12. Note that components thereof that are the same as those of the second embodiment are denoted by the same reference numbers, to facilitate comprehension of this embodiment.

The power supply system 11 for driving reactor coolant recirculation pumps of this fourth embodiment is similar to the power supply system 10 for driving reactor coolant recirculation pumps of the above-described third embodiment, except that the MG-equipped RIPs 8e and 8f connected to the normal-operation busbar 5a2 are replaced by MG-less RIPs 8e and 8f and the MG-less RIPs 8g and 8h connected to the normal-operation busbar 5b1 are replaced with MG-equipped RIPs 8g and 8h. Specific details of this configuration are given below.

As shown in FIG. 12, the power supply system 11 for driving reactor coolant recirculation pumps is configured in such a manner that two power lines M and N for auxiliary power generation branch off from a main on-site power line (not shown in the figure), two normal-operation busbars 5a1 and 5a2 are connected by a house transformer HT to the first power line M for auxiliary power generation, and two normal-operation busbars 5b1 and 5b2 are connected by another house transformer HT to the other power line N for auxiliary power generation.

Furthermore, one static adjustable-frequency power supply device ASD 7a is connected directly to the normal-operation busbar 5a1 of the first power line M for auxiliary power generation and also one static adjustable-frequency power supply device ASD 7b is connected by an MG set 9a thereto. One static adjustable-frequency power supply device ASD 7c is connected directly to the other normal-operation busbar 5a2 of this power line M for auxiliary power generation.

One static adjustable-frequency power supply device ASD 7d is connected by an MG set 9b to the normal-operation busbar 5b1 of the other power line N for auxiliary power generation and another static adjustable-frequency power supply device ASD 7e is connected by an MG set 9c to the other normal-operation busbar 5b2 of this power line N for auxiliary power generation.

This embodiment is similar to the second and third embodiments in that input transformers 6a to 6e are provided at the input portions of the static adjustable-frequency power supply devices ASD 7a to 7e, if necessary, and two of the recirculation pump RIPs 8a to 8j are connected to each of the power supply devices ASD 7a to 7e.

Thus the power supply system 11 for driving reactor coolant recirculation pumps of this embodiment is configured in such a manner that one pair of MG-less RIPs 8a and 8b and one pair of MG-equipped RIPs 8c and 8d are connected to the first normal-operation busbar 5a1 of the power line M for auxiliary power generation, and one pair of MG-less RIPs 8e and 8f is connected to the other normal-operation busbar 5a2 thereof. In addition, one pair of MG-equipped RIPs 8g and 8h is connected to the normal-operation busbar 5b1 of the power line N for auxiliary power generation and one pair of MG-equipped RIPs 8i and 8j is connected to the other normal-operation busbar 5b2 thereof.

The power supply system 11 for driving reactor coolant recirculation pumps of this embodiment is configured in the same way as previous embodiments to drive ten recirculation pumps RIP 8a to 8j by three MG sets 9a to 9c and five static adjustable-frequency power supply devices ASD 7a to 7e. In addition, the power supply system has a total of four normal-operation busbars 5a1, 5a2, 5b1, and 5b2 which are connected by house transformers HT to the two power lines M and N.

The MG sets 9a to 9c have a further role to play by applying supplementary inertia to the six RIPs 8c, 8d, and 8g to 8j if a momentary halt occurs in the power line or an external power loss occurs, in a similar manner to that described above.

The system is therefore configured in such a manner that it is not possible for three or more RIPs to halt simultaneously, even if a single failure of any kind occurs among the RIP power line components (the ASDS, input transformers, and MG sets, etc.). Furthermore, the inertia of the MG sets 9a to 9c makes it possible for operation to continue without any drop in the rated output of the plant, even if there should be a momentary halt or loss in the power supply system.

There now follows an investigation of calculations of the frequencies at which trips occur in various different numbers of the RIPs 8a to 8j in the power supply system 11 for driving reactor coolant recirculation pumps of this embodiment.

Figure 10:
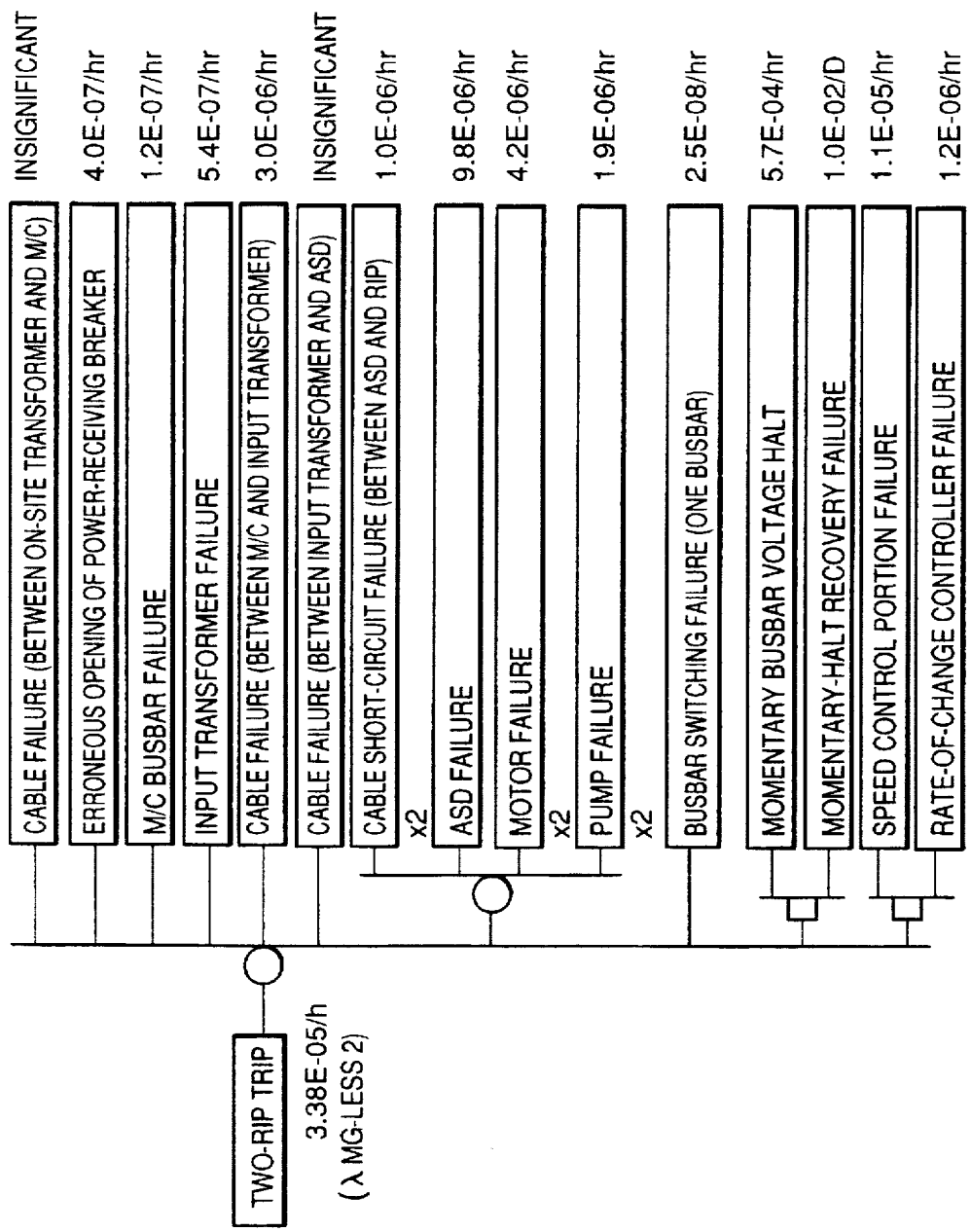
FIG. 10 is a fault tree of the causes and frequencies of two-RIP trips in MG-less RIPs.

For the power supply system 11 for driving reactor coolant recirculation pumps of this embodiment, a fault tree of the causes and frequencies of two-RIP trips on the non-MG-set side is shown in FIG. 10, a fault tree of the causes and frequencies of side-RIP trips on the MG-equipped side is shown in FIG. 4, and a fault tree of the causes and frequencies of four-RIP trips is shown in FIG. 11.

In addition, a fault tree of the causes and frequencies of six-RIP trips is shown in FIG. 6 and a fault tree of the causes and frequencies of simultaneous all-RIP trips (ten-RIP trips) is shown extending over FIGS. 7 and 8. The trip frequencies for each number of RIPs 8a to 8j can be calculated as follows by combining these fault trees:

one-RIP trip frequency=0 two-RIP trip frequency=$2\lambda$MG-less2+$3\lambda$MG-equipped2
=$1.38\times10^{6}$/year three-RIP trip frequency=0 four-RIP trip frequency=$\lambda4+\lambda$MG-less$2^2$+$2\lambda$MG-less2
×$3\lambda$MG-equipped2+$3\lambda$MG-equipped$2^2$=$2.19\times10^{-4}$/year five-RIP trip frequency=0 six-RIP trip frequency=$\lambda6+\lambda4\times3\lambda$MG-equipped2+$\lambda$MG-less$2^2\times3\lambda$MG-equipped2+$2\lambda$MG-less2×$3\lambda$MG-equipped$2^2$+$\lambda$MG-equipped$2^3$=$1.94\times10^{-8}$/year seven-RIP trip frequency=0 eight-RIP trip frequency=$\lambda6\times2\lambda$MG-equipped2+$\lambda4\times3\lambda$MG-equipped$2^2$+$\lambda$MG-less$2^2\times3\lambda$MG-equipped$2^2$+$2\lambda$MG-less2×$\lambda$MG-equipped$2^3$=$6.96\times10^{-13}$/year nine-RIP trip frequency=0 ten-RIP trip frequency=$8.8\times10^{-13}$/year

It can be seen from the above that the only one of the above frequencies that is as high as $10^{-2}$/year, a transient phenomenon, is the two-RIP trip phenomenon. In addition, the all-RIP trip frequency is equivalent to that of existing systems.

Note that a comparison of the power supply system 11 for driving reactor coolant recirculation pumps with the third embodiment shows that the connection of the two pairs of MG-equipped RIP 8g and 8h, and 8i and 8j to the house transformer HT of the N line ensures that the frequencies of six-RIP trips in the M line (control power loss being the most likely cause) and two-RIP trips (tripping of MG-equipped RIPs) in the N line, which are the primary causes of eight-RIP trips, are reduced by the inertial effect of the MG sets 9a to 9c.

As a result, the eight-RIP trip frequency is reduced and the reliability of the power supply system 11 for driving reactor coolant recirculation pumps is improved.

In addition, if the energy losses in the MG sets 9a to 9c are considered, the balance of load capacities of the M and N lines is better than that of third embodiment.

This ends the description of the fourth embodiment. The description now turns to a power supply system for driving reactor coolant recirculation pumps in accordance with a fifth embodiment of this invention.

Figure 13:
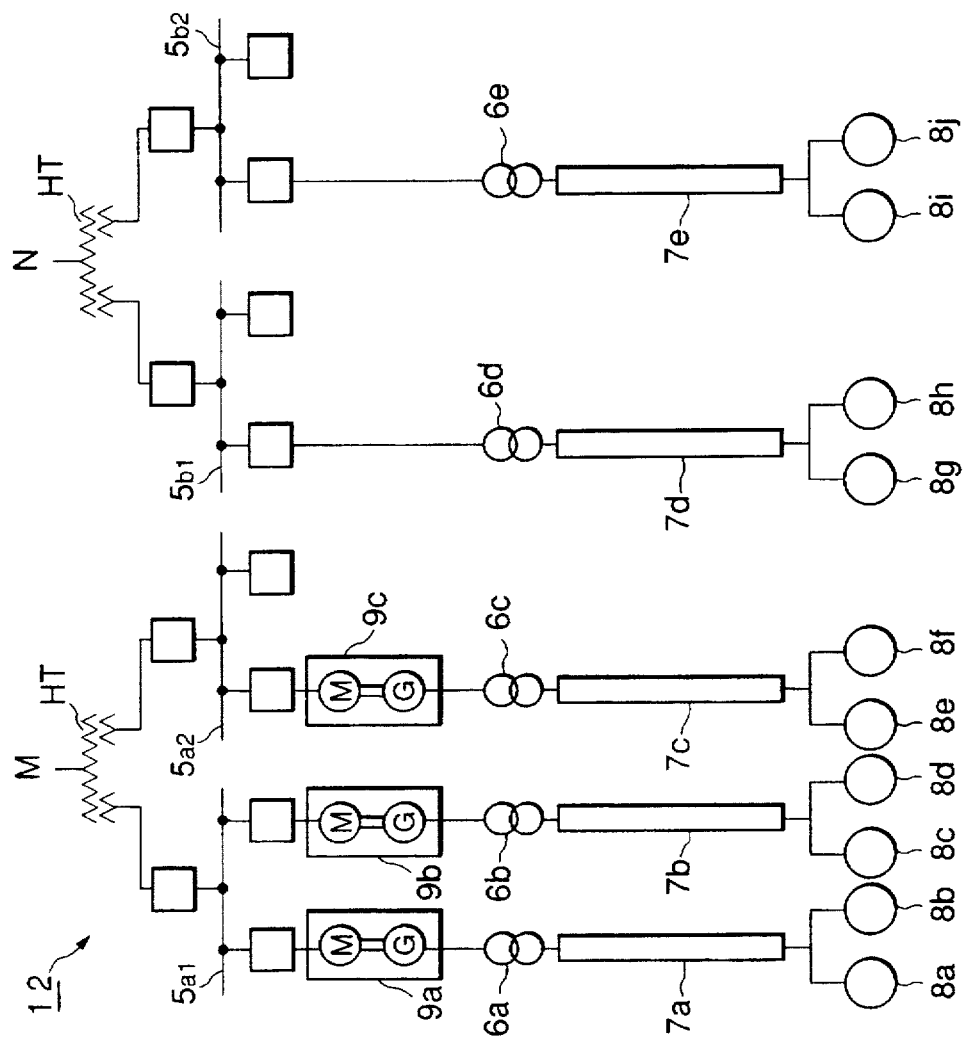
FIG. 13 shows the configuration of a fifth embodiment of the power supply system for driving reactor coolant recirculation pumps.

The system configuration of a power supply system 12 for driving reactor coolant recirculation pumps in accordance with this fifth embodiment is shown in FIG. 13. Note that components thereof that are the same as those of the second embodiment are denoted by the same reference numbers, to facilitate comprehension of this embodiment.

The power supply system 12 for driving reactor coolant recirculation pumps of this fifth embodiment differs from the previously described power supply system 4 for driving reactor coolant recirculation pumps of the second embodiment in that the MG-less RIPs 8a to 8d connected to the normal-operation busbar 5a1 are replaced by MG-equipped RIPs 8a to 8d and the MG-equipped RIPs 8g to 8j connected to the normal-operation busbar 5b2 are replaced by MG-less RIPs 8g to 8j. Specific details of this configuration are given below.

As shown in FIG. 13, the power supply system 12 for driving reactor coolant recirculation pumps is configured in such a manner that two power lines M and N for auxiliary power generation branch off from a main on-site power line (not shown in the figure), two normal-operation busbars 5a1 and 5a2 are connected by a house transformer HT to the first power line M for auxiliary power generation, and two normal-operation busbars 5b1 and 5b2 are connected by another house transformer HT to the other power line N for auxiliary power generation.

Furthermore, two static adjustable-frequency power supply devices ASD 7a and 7b are connected by MG sets 9a and 9b to the normal-operation busbar 5a1 of the first power line M for auxiliary power generation. One static adjustable-frequency power supply device ASD 7c is connected by an MG set 9c to the other normal-operation busbar 5a2 of this power line M for auxiliary power generation.

One static adjustable-frequency power supply device ASD 7d is connected directly to the normal-operation busbar 5b1 of the other power line N for auxiliary power generation and another static adjustable-frequency power supply device ASD 7e is connected directly to the other normal-operation busbar 5b2 of this power line N for auxiliary power generation.

This embodiment is similar to the first to third embodiments in that input transformers 6a to 6e are provided at the input portions of the static adjustable-frequency power supply devices ASD 7a to 7e, if necessary, and two of the recirculation pump RIPs 8a to 8j are connected to each of the power supply devices ASD 7a to 7e.

Thus the power supply system 12 for driving reactor coolant recirculation pumps of this embodiment is configured in such a manner that two pairs of MG-equipped RIPs 8a and 8b, and 8c and 8d are connected to the first normal-operation busbar 5a1 of the power line M for auxiliary power generation and one pair of MG-equipped RIPs 8e and 8f is connected to the other normal-operation busbar 5a2 thereof. In addition, one pair of MG-less RIPs 8g and 8h is connected to the normal-operation busbar 5b1 of the power line N for auxiliary power generation and one pair of MG-less RIPs 8i and 8j is connected to the other normal-operation busbar 5b2 thereof.

The power supply system 12 for driving reactor coolant recirculation pumps of this embodiment is configured in the same way as previous embodiments to drive ten recirculation pumps RIP 8a to 8j by three MG sets 9a to 9c and five static adjustable-frequency power supply devices ASD 7a to 7e. In addition, the power supply system has a total of four normal-operation busbars 5a1, 5a2, 5b1, and 5b2 which are connected by house transformers HT to two power lines M and N. The effects obtained by simplifying the components that configure the power supply system and using common specifications therefore are similar to those of the first embodiment.

The MG sets 9a to 9c have a further role to play by applying supplementary inertia to the six RIPs 8c to 8f if a momentary halt occurs in the power line or an external power loss occurs, in a similar manner to that described above.

The system is therefore configured in such a manner that it is not possible for three or more RIPs to halt simultaneously, even if a single failure of any kind occurs among the RIP power line components (the ASDs, input transformers, and MG sets, etc.). Furthermore, the inertia of the MG sets 9a to 9c makes it possible for operation to continue without any drop in the rated output of the plant, even if there should be a momentary halt or loss in the power supply system.

There now follows an investigation of calculations of the frequencies at which trips occur in various different numbers of the RIPs 8a to 8j in the power supply system 12 for driving reactor coolant recirculation pumps of this embodiment.

For the power supply system 12 for driving reactor coolant recirculation pumps of this embodiment, a fault tree of the causes and frequencies of two-RIP trips of MG-less RIPs is shown in FIG. 10, a fault tree of the causes and frequencies of two-RIP trips in MG-equipped RIPs is shown in FIG. 4, and a fault tree of the causes and frequencies of four-RIP trips is shown in FIG. 11.

In addition, a fault tree of the causes and frequencies of six-RIP trips is shown in FIG. 6 and a fault tree of the causes and frequencies of simultaneous all-RIP trips (ten-RIP trips) is shown extending over FIGS. 7 and 8. The trip frequencies for each number of RIPs 8a to 8j can be calculated as follows by combining these fault trees:

one-RIP trip frequency=0 two-RIP trip frequency=$2\lambda$MG-less2+$3\lambda$MG-equipped2 =$1.38\times10^{\circ}$/year three-RIP trip frequency=0 four-RIP trip frequency=$\lambda 4+\lambda$MG-less$2^2$+$2\lambda$MG-less2 $\times 3\lambda$MG-equipped2+$3\lambda$MG-equipped$2^2$=$2.19\times10^{-4}$/year five-RIP trip frequency=0 six-RIP trip frequency=$\lambda 6+\lambda 4\times 3\lambda$MG-equipped2+$\lambda$MG-less$2^2\times 3\lambda$MG-equipped2+$2\lambda$MG-less$2\times 3\lambda$MG-equipped$2^2$+$\lambda$MG-equipped$2^3$=$1.94\times10^{-8}$/year seven-RIP trip frequency=0 eight-RIP trip frequency=$\lambda 6\times 2\lambda$MG-less2+$\lambda 4\times 3\lambda$MG-equipped$2^2$+$\lambda$MG-less$2^2\times 3\lambda$MG-equipped$2^2$+$2\lambda$MG-less$2\times\lambda$MG-equipped$2^3$=$7.31\times10^{-13}$/year nine-RIP trip frequency=0 ten-RIP trip frequency=$8.8\times10^{-13}$/year

It can be seen from the above that the only one of the above frequencies that is as high as $10^2$/year, a transient phenomenon, is the two-RIP trip phenomenon. In addition, the all-RIP trip frequency is equivalent to that of existing systems.

Note that a comparison with the second embodiment shows that the connection of two pairs of MG-equipped RIPs 8a and 8b, and 8c and 8d ensures that the effect of inertia in the MG sets 9a and 9b means that the number of RIPs tripped directly by a failure in the normal-operation busbar 5a1 or components upstream thereof is reduced from four to zero.

As a result, each of the four-, six-, and eight-RIP trip frequencies is reduced and thus the reliability of the power supply system 12 for driving reactor coolant recirculation pumps is improved.

This ends the description of the fifth embodiment. The description now turns to a power supply system for driving reactor coolant recirculation pumps in accordance with a sixth embodiment of this invention.

Figure 14:
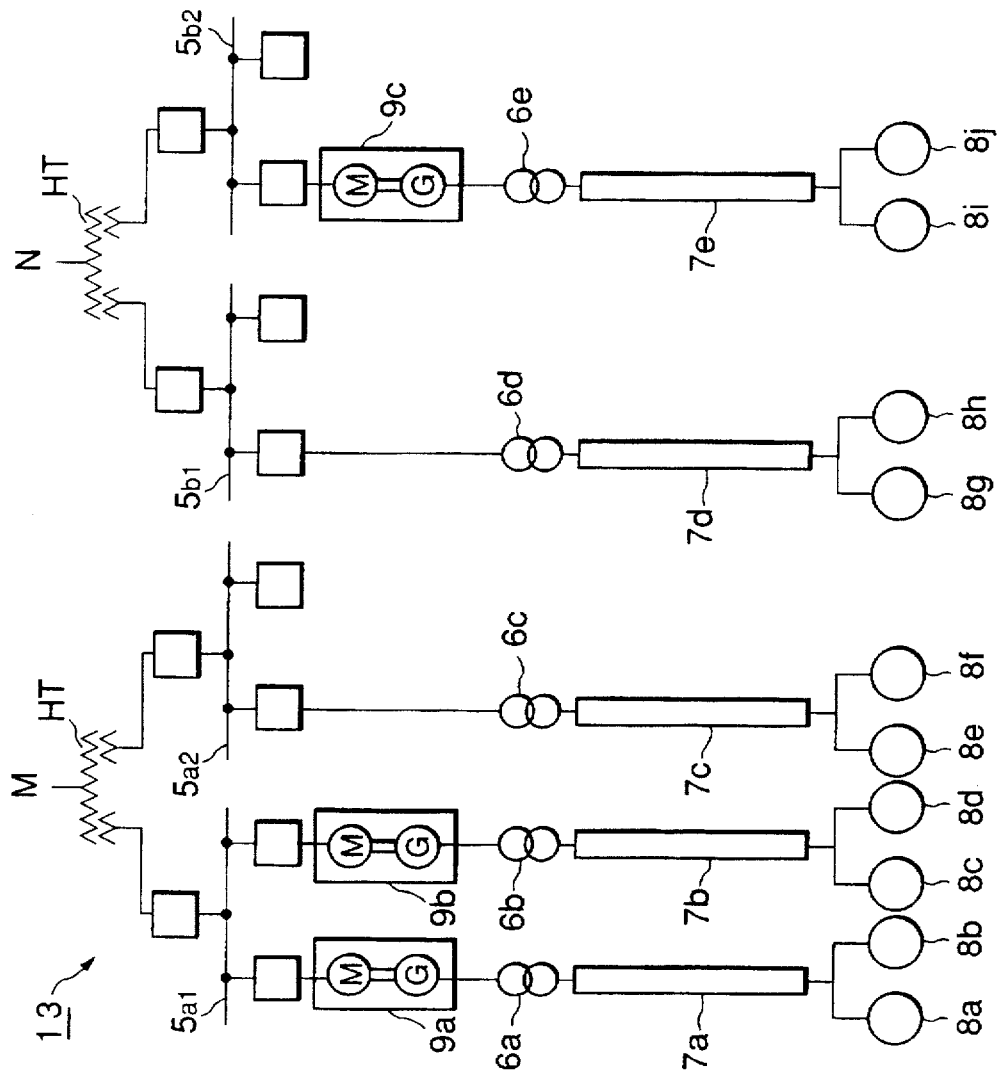
FIG. 14 shows the configuration of a sixth embodiment of the power supply system for driving reactor coolant recirculation pumps.

The system configuration of a power supply system 13 for driving reactor coolant recirculation pumps in accordance with this sixth embodiment is shown in FIG. 14. Note that components thereof that are the same as those of the second embodiment are denoted by the same reference numbers, to facilitate comprehension of this embodiment.

The power supply system 13 for driving reactor coolant recirculation pumps of this sixth embodiment differs from the above-described power supply system 12 for driving reactor coolant recirculation pumps of the fifth embodiment in that the MG-equipped RIPs 8e and 8f connected to the normal-operation busbar 5a2 are replaced by MG-less RIPs 8e and 8f and the MG-less RIPs 8i and 8j connected to the normal-operation busbar 5b2 are replaced by MG-equipped RIPs 8i and 8j. Specific details of this configuration are given below.

As shown in FIG. 14, the power supply system 13 for driving reactor coolant recirculation pumps is configured in such a manner that two power lines M and N for auxiliary power generation branch off from a main on-site power line (not shown in the figure), two normal-operation busbars 5a1 and 5a2 are connected by a house transformer HT to the first power line M for auxiliary power generation, and two normal-operation busbars 5b1 and 5b2 are connected by another house transformer HT to the other power line N for auxiliary power generation.

Furthermore, two static adjustable-frequency power supply devices ASD 7a and 7b are connected by MG sets 9a and 9b to the normal-operation busbar 5a1 of the first power line M for auxiliary power generation. One static adjustable-frequency power supply device ASD 7c is connected directly to the other normal-operation busbar 5a2 of this power line M for auxiliary power generation.

One static adjustable-frequency power supply device ASD 7d is connected directly to the normal-operation busbar 5b1 of the other power line N for auxiliary power generation and another static adjustable-frequency power supply device ASD 7e is connected by an MG set 9c to the other normal-operation busbar 5b2 of this power line N for auxiliary power generation.

This embodiment is similar to the second to fifth embodiments in that input transformers 6a to 6e are provided at the input portions of the static adjustable-frequency power supply devices ASD 7a to 7e, if necessary, and two of the recirculation pump RIPs 8a to 8j are connected to each of the power supply devices ASD 7a to 7e.

Thus the power supply system 13 for driving reactor coolant recirculation pumps of this embodiment is configured in such a manner that two pairs of MG-equipped RIPs 8a and 8b, and 8c and 8d are connected to the first normal-operation busbar 5a1 of the power line M for auxiliary power generation and one pair of MG-less RIPs 8e and 8f is connected to the other normal-operation busbar 5a2 thereof. In addition, one pair of MG-less RIPs 8g and 8h is connected to the normal-operation busbar 5b1 of the power line N for auxiliary power generation and one pair of MG-equipped RIPs 8i and 8j is connected to the other normal-operation busbar 5b2 thereof.

The power supply system 13 for driving reactor coolant recirculation pumps of this embodiment is configured in the same way as previous embodiments to drive ten recirculation pumps RIP 8a to 8j by three MG sets 9a to 9c and five static adjustable-frequency power supply devices ASD 7a to 7e. In addition, the power supply system has a total of four normal-operation busbars 5a1, 5a2, 5b1, and 5b2 which are connected by house transformers HT to two power lines M and N. The effects obtained by simplifying the components that configure the power supply system and using common specifications therefore are similar to those of the first embodiment.

The MG sets 9a to 9c have a further role to play by applying supplementary inertia to the six RIPs 8a to 8d, 8i, and 8j if a momentary halt occurs in the power line or an external power loss occurs, in a similar manner to that described above.

The system is therefore configured in such a manner that it is not possible for three or more RIPs to halt simultaneously, even if a single failure of any kind occurs among the RIP power line components (the ASDs, input transformers, and MG sets, etc.). Furthermore, the inertia of the MG sets 9a to 9c makes it possible for operation to continue without any drop in the rated output of the plant, even if there should be a momentary halt or loss in the power supply system.

There now follows an investigation of calculations of the frequencies at which trips occur in various different numbers of the RIPs 8a to 8j in the power supply system 13 for driving reactor coolant recirculation pumps of this embodiment.

For the power supply system 13 for driving reactor coolant recirculation pumps of this embodiment, a fault tree of the causes and frequencies of two-RIP trips in MG-less RIPs is shown in FIG. 10, a fault tree of the causes and frequencies of two-RIP trips in MG-equipped RIPs is shown in FIG. 4, and a fault tree of the causes and frequencies of four-RIP trips is shown in FIG. 11.

In addition, a fault tree of the causes and frequencies of six-RIP trips is shown in FIG. 6 and a fault tree of the causes and frequencies of simultaneous all-RIP trips (ten-RIP trips) is shown extending over FIGS. 7 and 8. The trip frequencies for each number of RIPs 8a to 8j can be calculated as follows by combining these fault trees:

one-RIP trip frequency=0 two-RIP trip frequency=$2\lambda\text{MG-less}2+3\lambda\text{MG-equipped}2$
   =$1.38\times10^{\circ}$/year three-RIP trip frequency=0 four-RIP trip frequency=$\lambda4+\lambda\text{MG-less}2^2+2\lambda\text{MG-less}2\times3\lambda\text{MG-equipped}2+3\lambda\text{MG-equipped}2^2=2.19\times10^{-4}$/year five-RIP trip frequency=0 six-RIP trip frequency=$\lambda6+\lambda4\times3\lambda\text{MG-equipped}2+\lambda\text{MG-less}2^2\times3\lambda\text{MG-equipped}2+2\lambda\text{MG-less}2\times3\lambda\text{MG-equipped}2^2+\lambda\text{MG-equipped}2^3=1.94\times10^{-8}$/year seven-RIP trip frequency=0 eight-RIP trip frequency=$\lambda6\times\lambda\text{MG-less}2+\lambda6\times\lambda\text{MG-equipped}2+\lambda4\times3\lambda\text{MG-equipped}2^2+\lambda\text{MG-less}2^2\times3\lambda\text{MG-equipped}2^2+2\lambda\text{MG-less}2\times\lambda\text{MG-equipped}2^3=7.14\times10^{-13}$/year nine-RIP trip frequency=0 ten-RIP trip frequency=$8.8\times10^{-13}$/year

It can be seen from the above that the only one of the above frequencies that is as high as $10^{-2}$/year, a transient phenomenon, is the two-RIP trip phenomenon. In addition, the all-RIP trip frequency is equivalent to that of existing systems.

Note that a comparison with the fifth embodiment shows that the connection of the MG-less RIPs 8g and 8h and the MG-equipped RIPs 8i and 8j to the house transformer HT of the N line ensures that the frequencies of six-RIP trips in the M line (control power loss being the most likely cause) and two-RIP trips (tripping of MG-equipped RIPs) in the N line, which are the primary causes of eight-RIP trips, are reduced by the inertial effect of the MG sets 9a to 9c.

As a result, the eight-RIP trip frequency is reduced and thus the reliability of the power supply system 13 for driving reactor coolant recirculation pumps is improved. In addition, if the energy losses in the MG sets 9a to 9c are considered, the balance of load capacities of the M and N lines is better than that of the above fifth embodiment.

This ends the description of the sixth embodiment. The description now turns to a power supply system for driving reactor coolant recirculation pumps in accordance with a seventh embodiment of this invention.

Figure 15:
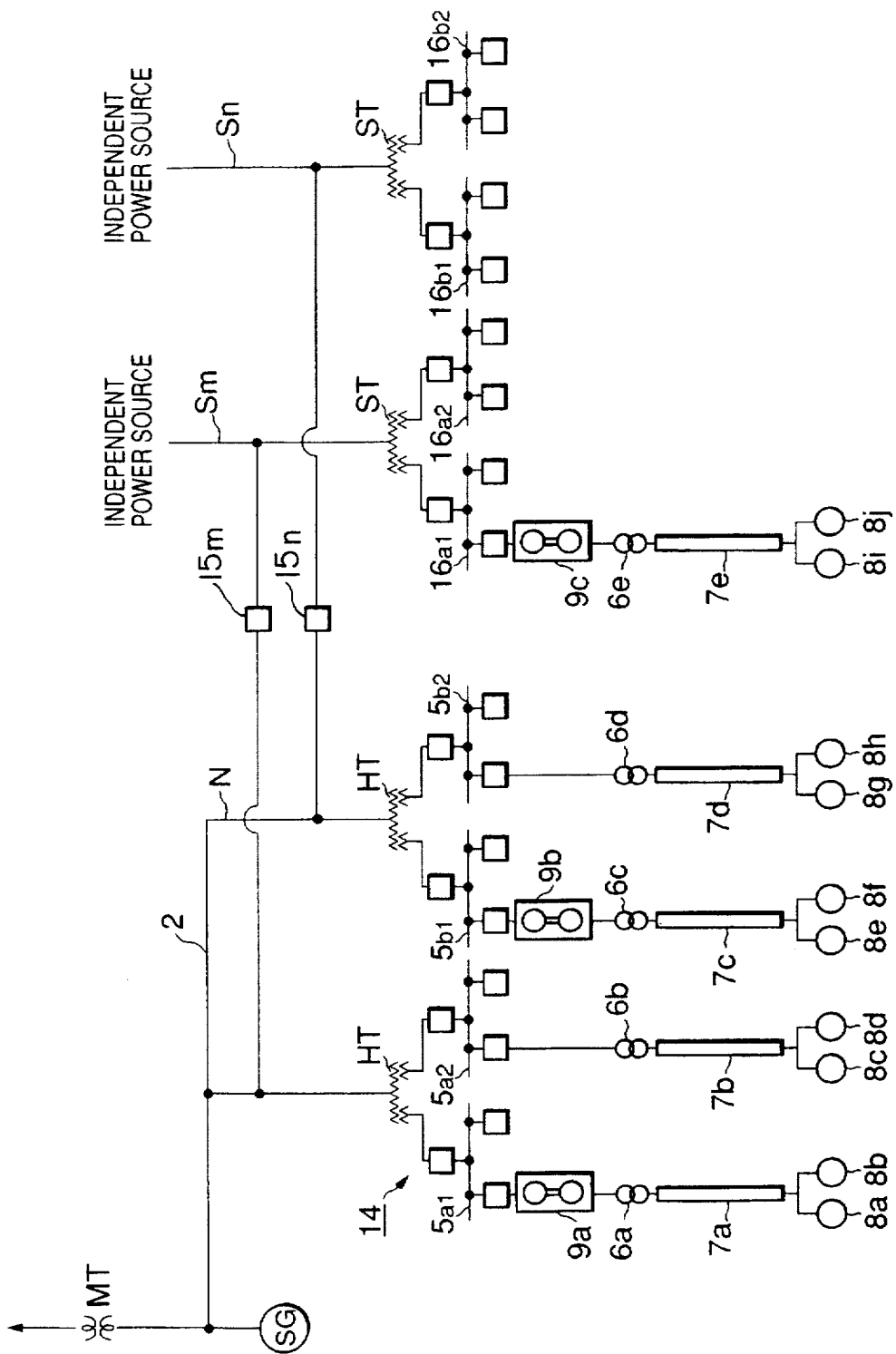
FIG. 15 shows the configuration of a seventh embodiment of the power supply system for driving reactor coolant recirculation pumps.

The system configuration of a power supply system 14 for driving reactor coolant recirculation pumps in accordance with this seventh embodiment is shown in FIG. 15. Note that components thereof that are the same as those of the second embodiment are denoted by the same reference numbers, to facilitate comprehension of this embodiment.

The power supply system 14 for driving reactor coolant recirculation pumps of this seventh embodiment differs from the above-described power supply system for driving reactor coolant recirculation pumps of the second to fifth embodiments in that the configuration is rearranged so that the recirculation pump RIPs 8a to 8j are not driven by the power lines M and N for auxiliary power generation, but by starter power lines Sm and Sn. Note that a common feature of this seventh embodiment and eighth and ninth embodiments that will be described later is this driving of the recirculation pump RIPs 8i and 8j by the starter power lines Sm and Sn.

The power lines of the power supply system 14 for driving reactor coolant recirculation pumps of this embodiment are a first power line M for auxiliary power generation and a second power line N for auxiliary power generation that branch off a main on-site power line 2, as shown in FIG. 15, and the first starter power line Sm and the second starter power line Sn that branch off from an independent power supply. This independent power supply is either external to the generating plant or is any type of power supply unit for driving plant.

The first starter power line Sm is connected to the first power line M for auxiliary power generation by a breaker means 15m. Similarly, the second starter power line Sn is connected to the second power line N for auxiliary power generation by a breaker means 15n. This means that electrical power introduced from an independent power supply can be supplied through the breaker means 15m and 15n to the first and second power lines M and N for auxiliary power generation during start-up of the plant, to start up the plant. Note that power is supplied to the first and second power lines M and N for auxiliary power generation from the main generator SG when the plant is operating as normal.

The normal-operation busbars 5a1 and 5a2 branch off from the first power line M for auxiliary power generation, with a house transformer HT therebetween. Similarly, the normal-operation busbars 5b1 and 5b2 branch off from the second power line N for auxiliary power generation, with a house transformer HT therebetween. Common busbars 16a1 and 16a2 branch off from the first starter power line Sm, with a starter transformer ST therebetween. Similarly, common busbars 16b1 and 16b2 branch off from the second starter power line Sn, with a starter transformer ST therebetween.

One static adjustable-frequency power supply device ASD 7a is connected by an MG set 9a to the normal-operation busbar 5a1 and another static adjustable-frequency power supply device ASD 7b is connected directly to the other normal-operation busbar 5a2 of this first power line M for auxiliary power generation.

One static adjustable-frequency power supply device ASD 7c is connected by an MG set 9b to the normal-operation busbar 5b1 of the second power line N for auxiliary power generation. In addition, one static adjustable-frequency power supply device ASD 7d is connected directly to the other normal-operation busbar 5b2 of the second power line N for auxiliary power generation.

Furthermore, one static adjustable-frequency power supply device ASD 7e is connected by an MG set 9c to one common busbar 16a1 of the first starter power line Sm.

This embodiment is similar to the second to sixth embodiments in that input transformers 6a to 6e are provided at the input portions of the static adjustable-frequency power supply devices ASD 7a to 7e, if necessary, and two of the recirculation pump RIPs 8a to 8j are connected to each of the power supply devices ASD 7a to 7e.

Thus the power supply system 14 for driving reactor coolant recirculation pumps of this embodiment is configured in such a manner that one pair of MG-equipped RIPs 8a and 8b is connected to the first normal-operation busbar 5a1 of the first power line M for auxiliary power generation, one pair of MG-less RIPs 8c and 8d is connected to the other normal-operation busbar 5a2 thereof, one pair of MG-equipped RIPs 8e and 8f is connected to the normal-operation busbar 5b1 of the second power line N for auxiliary power generation, and one pair of MG-less RIPs 8g and 8h is connected to the other normal-operation busbar 5b2. In addition, one pair of MG-equipped RIPs 8i and 8j is connected to the common busbar 16a1 of the first starter power line Sm.

The power supply system 14 for driving reactor coolant recirculation pumps of this embodiment is configured in the same way as previous embodiments to drive ten recirculation pumps RIP 8a to 8j by three MG sets 9a to 9c and five static adjustable-frequency power supply devices ASD 7a to 7e. The effects obtained by simplifying the components that configure the power supply system and using common specifications therefore are similar to those of the first embodiment.

In addition, power is supplied from a total of four lines (the two power lines M and N and two power lines Sm and Sn that receive power from a separate source). Four normal-operation busbars 5a1, 5a2, 5b1, and 5b2 are connected by two house transformers HT to the lines M and N, in the same way as in the second embodiment. In addition, four common busbars 16a1, 16a2, 16b1, and 16b2 are connected by two starter transformer ST to the lines Sm and Sn. This configuration enables further control over the number of RIPs that are halted simultaneously by the failure of one busbar.

The MG sets 9a to 9c have a further role to play by applying supplementary inertia to the six RIPs 8a, 8b, 8e, 8f, 8i, and 8j if a momentary halt occurs in the power line or an external power loss occurs, in the same way as in the above-described second to sixth embodiments.

The system is therefore configured in such a manner that it is not possible for three or more RIPs to halt simultaneously, even if a single failure of any kind occurs among the RIP power line components (the ASDs, input transformers, and MG sets, etc.). Furthermore, the inertia of the MG sets 9a to 9c makes it possible for operation to continue without any drop in the rated output of the plant, even if there should be a momentary halt or loss in the power supply system.

There now follows an investigation of calculations of the frequencies at which trips occur in various different numbers of the RIPs 8a to 8j in the power supply system 14 for driving reactor coolant recirculation pumps of this embodiment.

For the power supply system 14 for driving reactor coolant recirculation pumps of this embodiment, a fault tree of the causes and frequencies of two-RIP trips in MG-less RIPs is shown in FIG. 10, a fault tree of the causes and frequencies of two-RIP trips in MG-equipped RIPs is shown in FIG. 4, and a fault tree of the causes and frequencies of four-RIP trips is shown in FIG. 11.

Figure 16:
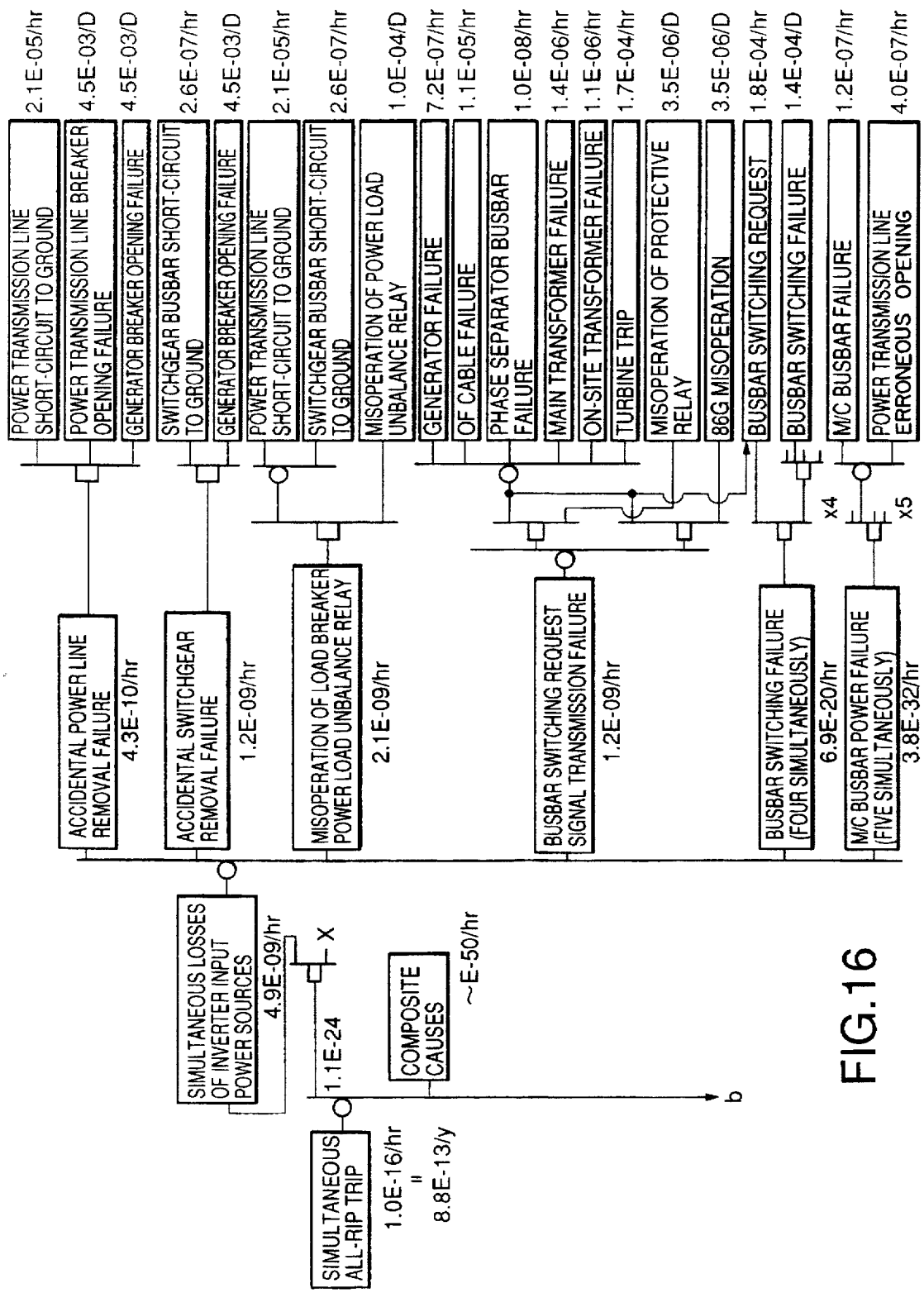
FIG. 16 shows a fault tree of the causes and frequencies of simultaneous all-RIP trips (ten-RIP trips)
Figure 17:
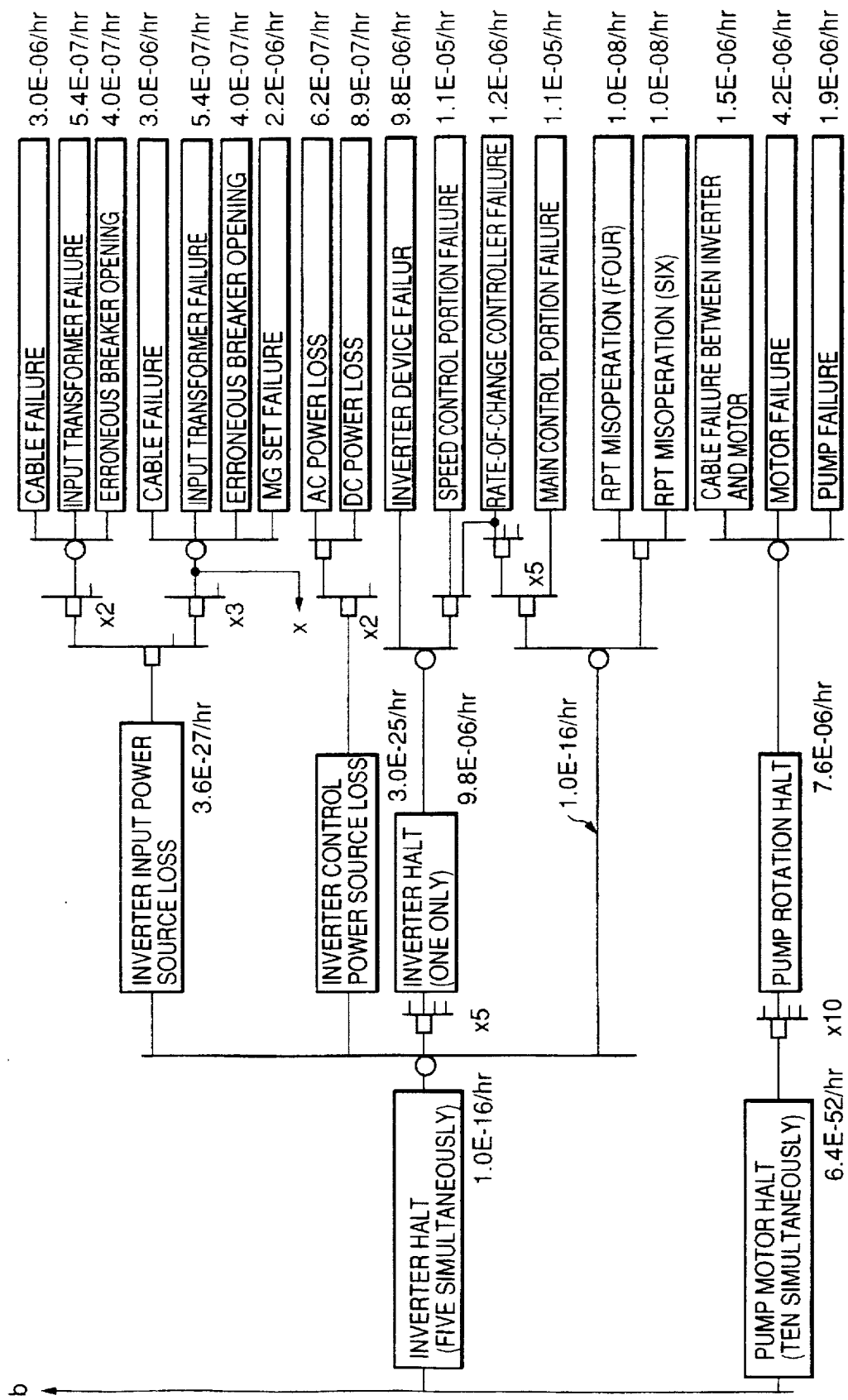
FIG. 17 is a continuation of the fault tree of FIG. 16.

In addition, a fault tree of the causes and frequencies of six-RIP trips is shown in FIG. 6 and a fault tree of the causes and frequencies of simultaneous all-RIP trips (ten-RIP trips) is shown extending over FIGS. 16 and 17 connected with an arrow b—b. The trip frequencies for each number of RIPs 8a to 8j can be calculated as follows by combining these fault trees:

one-RIP trip frequency=0 two-RIP trip frequency=$2\lambda$MG-less2+$3\lambda$MG-equipped2
=$1.38\times10^9$/year three-RIP trip frequency=0 four-RIP trip frequency=$\lambda 4+\lambda$MG-less$2^2+2\lambda$MG-less2
$\times 3\lambda$MG-equipped2+$3\lambda$MG-equipped$2^2$=$2.19\times10^{-4}$/year five-RIP trip frequency=0 six-RIP trip frequency=$\lambda 6+\lambda 4\times 3\lambda$MG-equipped2+$\lambda$MG-less$2^2\times 3\lambda$MG-equipped2+$2\lambda$MG-less2$\times 3\lambda$MG-equipped$2^2+\lambda$MG-equipped$2^3$=$1.94\times10^{-8}$/year seven-RIP trip frequency=0 eight-RIP trip frequency=$\lambda 6\times\lambda$MG-less2+$\lambda 6\times\lambda$MG-equipped2+$\lambda 4\times 3\lambda$MG-equipped$2^2+\lambda$MG-less$2^2\times 3\lambda$MG-equipped$2^2+2\lambda$MG-less2$\times\lambda$MG-equipped$2^3$= $7.14\times10^{-13}$/year nine-RIP trip frequency=0 ten-RIP trip frequency=$8.8\times10^{-13}$/year

It can be seen from the above that the only one of the above frequencies that is as high as $10^{-2}$/year, a transient phenomenon, is the two-RIP trip phenomenon. In addition, the all-RIP trip frequency is equivalent to that of existing systems.

Note that a comparison with the second embodiment shows that the connection of one pair of MG-equipped RIPs 2a and 2b to the same normal-operation busbar 5a1 ensures that the number of RIPs tripped directly by a failure in the normal-operation busbar 5a1 or components upstream thereof can reduced from the four RIPs 8a to 8d to two RIPs 8a and 8b, halving the number of simultaneously halted RIPs.

As a result, each of the four-, six-, and eight-RIP trip frequencies is reduced and thus the reliability of the power supply system 14 for driving reactor coolant recirculation pumps is improved.

This ends the description of the seventh embodiment. The description now turns to a power supply system for driving reactor coolant recirculation pumps in accordance with an eighth embodiment of this invention.

Figure 18:
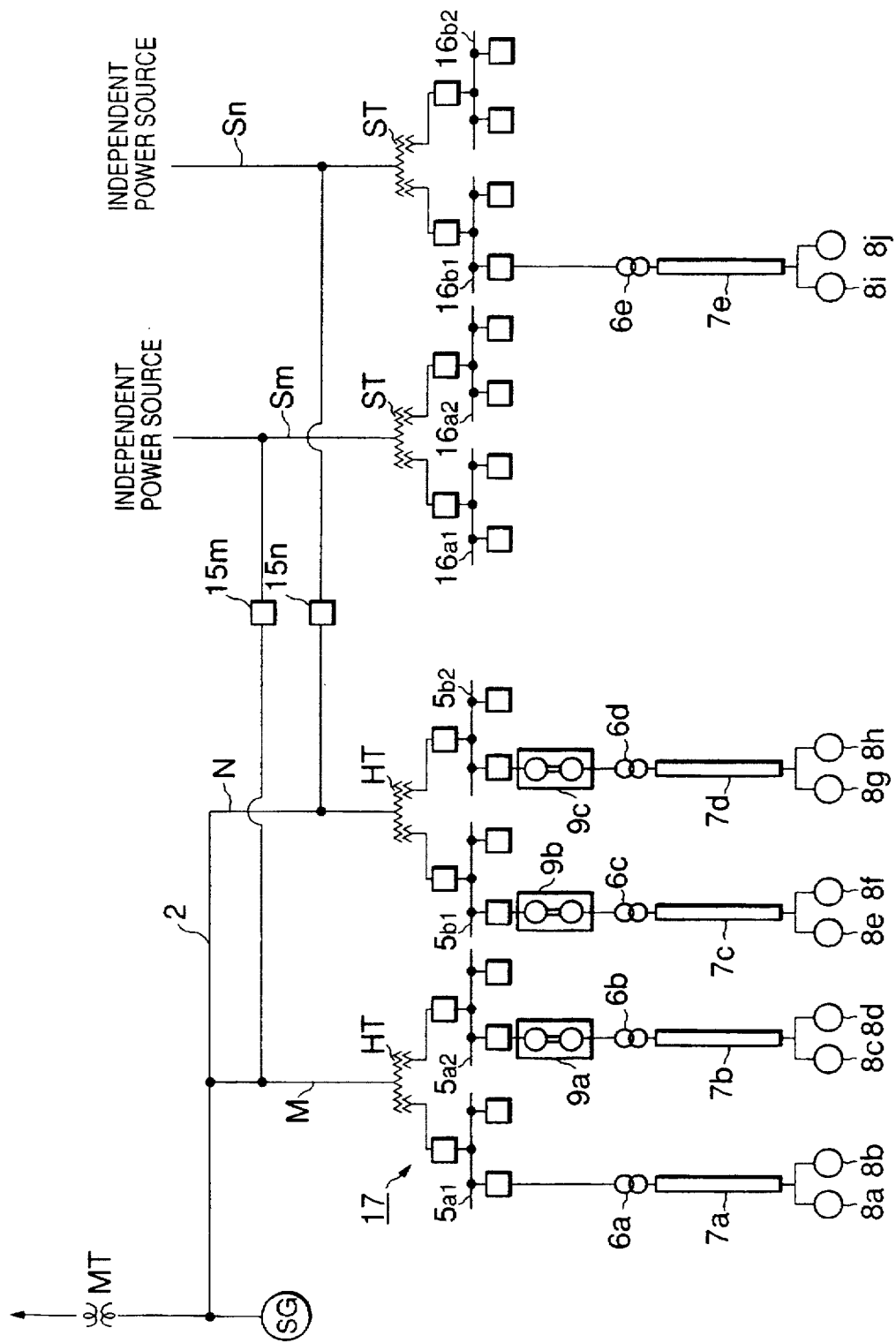
FIG. 18 shows the configuration of an eighth embodiment of the power supply system for driving reactor coolant recirculation pumps.

The system configuration of a power supply system 17 for driving reactor coolant recirculation pumps in accordance with this eighth embodiment is shown in FIG. 18. Note that components thereof that are the same as those of the seventh embodiment are denoted by the same reference numbers, to facilitate comprehension of this embodiment.

The power supply system 17 for driving reactor coolant recirculation pumps of this eighth embodiment differs from the above-described power supply system 14 for driving reactor coolant recirculation pumps of the seventh embodiment in that the MG-equipped RIPs 8a and 8b connected to the normal-operation busbar 5a1 are replaced by MG-less RIPs 8a and 8b, the MG-less RIPs 8c and 8d connected to the normal-operation busbar 5a2 are replaced by MG-equipped RIPs 8c and 8d, the MG-less RIPs 8g and 8h connected to the normal-operation busbar 5b2 are replaced by MG-equipped RIPs 8g and 8h, and also the RIPs 8i and 8j connected by the MG set 9c to the common busbar 16a1 are reconnected directly thereto. Specific details of this configuration are given below.

The power lines of the power supply system 17 for driving reactor coolant recirculation pumps in accordance with this embodiment are the same as those of the above-described seventh embodiment. In other words, the system has first and second power lines M and N for auxiliary power generation (which obtain electrical power from the main on-site power line 2) and first and second starter power lines Sm and Sn (which obtain electrical power from an independent power source), the first starter power line Sm is connected by a breaker means 15m to the first power line M for auxiliary power generation, and the second starter power line Sn is connected by a breaker means 15n to the second power line N for auxiliary power generation, as shown in FIG. 15.

The normal-operation busbars 5a1 and 5a2 branch off from the first power line M for auxiliary power generation, with a house transformer HT therebetween. Similarly, the normal-operation busbars 5b1 and 5b2 branch off from the second power line N for auxiliary power generation, with a house transformer HT therebetween. The common busbars 16a1 and 16a2 branch off from the first starter power line Sm, with a starter transformer ST therebetween. Similarly, the common busbars 16b1 and 16b2 branch off from the second starter power line Sn, with a starter transformer ST therebetween.

One static adjustable-frequency power supply device ASD 7a is connected directly to the normal-operation busbar 5a1. Another static adjustable-frequency power supply device ASD 7b is connected by an MG set to the other normal-operation busbar 5a2 of this first power line M for auxiliary power generation.

One static adjustable-frequency power supply device ASD 7c is connected by an MG set 9b to the normal-operation busbar 5b1 of the second power line N for auxiliary power generation. Similarly, one static adjustable-frequency power supply device ASD 7d is connected by an MG set 9c to other normal-operation busbar 5b2 of the second power line N for auxiliary power generation.

In addition, one static adjustable-frequency power supply device ASD 7e is connected directly to one common busbar 16b1 of the second starter power line Sn.

This embodiment is similar to the second to seventh embodiments in that input transformers 6a to 6e are provided at the input portions of the static adjustable-frequency power supply devices ASD 7a to 7e, if necessary, and two of the recirculation pump RIPs 8a to 8j are connected to each of the power supply devices ASD 7a to 7e.

Thus the power supply system 17 for driving reactor coolant recirculation pumps in accordance with this embodiment is configured in such a manner that one pair of MG-less RIPs 8a and 8b is connected to the normal-operation busbar 5a1 of the first power line M for auxiliary power generation, one pair of MG-equipped RIPs 8c and 8d is connected to the other normal-operation busbar 5a2 thereof, one pair of MG-equipped RIPs 8e and 8f is connected to the normal-operation busbar 5b1 of the second power line N for auxiliary power generation, and one pair of MG-equipped RIPs 8g and 8h is connected to the other normal-operation busbar 5b2 thereof. In addition, one pair of MG-less RIPs 8i and 8j are connected to the common busbar 16b1 of the second starter power line Sn.

The power supply system 17 for driving reactor coolant recirculation pumps of this embodiment is configured in the same way as previous embodiments to drive ten recirculation pumps RIP 8a to 8j by three MG sets 9a to 9c and five static adjustable-frequency power supply devices ASD 7a to 7e. The effects obtained by simplifying the components that configure the power supply system and using common specifications therefore are similar to those of the first embodiment.

In addition, power is supplied from a total of four lines (the two power lines M and N and two power lines Sm and Sn that receive power from a separate source) and there is a total of eight busbars, which enables further control over the number of RIPs that are halted simultaneously by the failure of one busbar, in the same way as in the seventh embodiment.

The MG sets 9a to 9c have a further role to play by applying supplementary inertia to the six RIPs 8c to 8h if a momentary halt occurs in the power line or an external power loss occurs, in a similar manner to that of the above-described second to seventh embodiments.

The system is therefore configured in such a manner that it is not possible for three or more RIPs to halt simultaneously, even if a single failure of any kind occurs among the RIP power line components (the ASDs, input transformers, and MG sets, etc.). Furthermore, the inertia of the MG sets 9a to 9c makes it possible for operation to continue without any drop in the rated output of the plant, even if there should be a momentary halt or loss in the power supply system.

There now follows an investigation of calculations of the frequencies at which trips occur in various different numbers of the RIPs 8a to 8j in the power supply system 17 for driving reactor coolant recirculation pumps of this embodiment.

Figure 19:
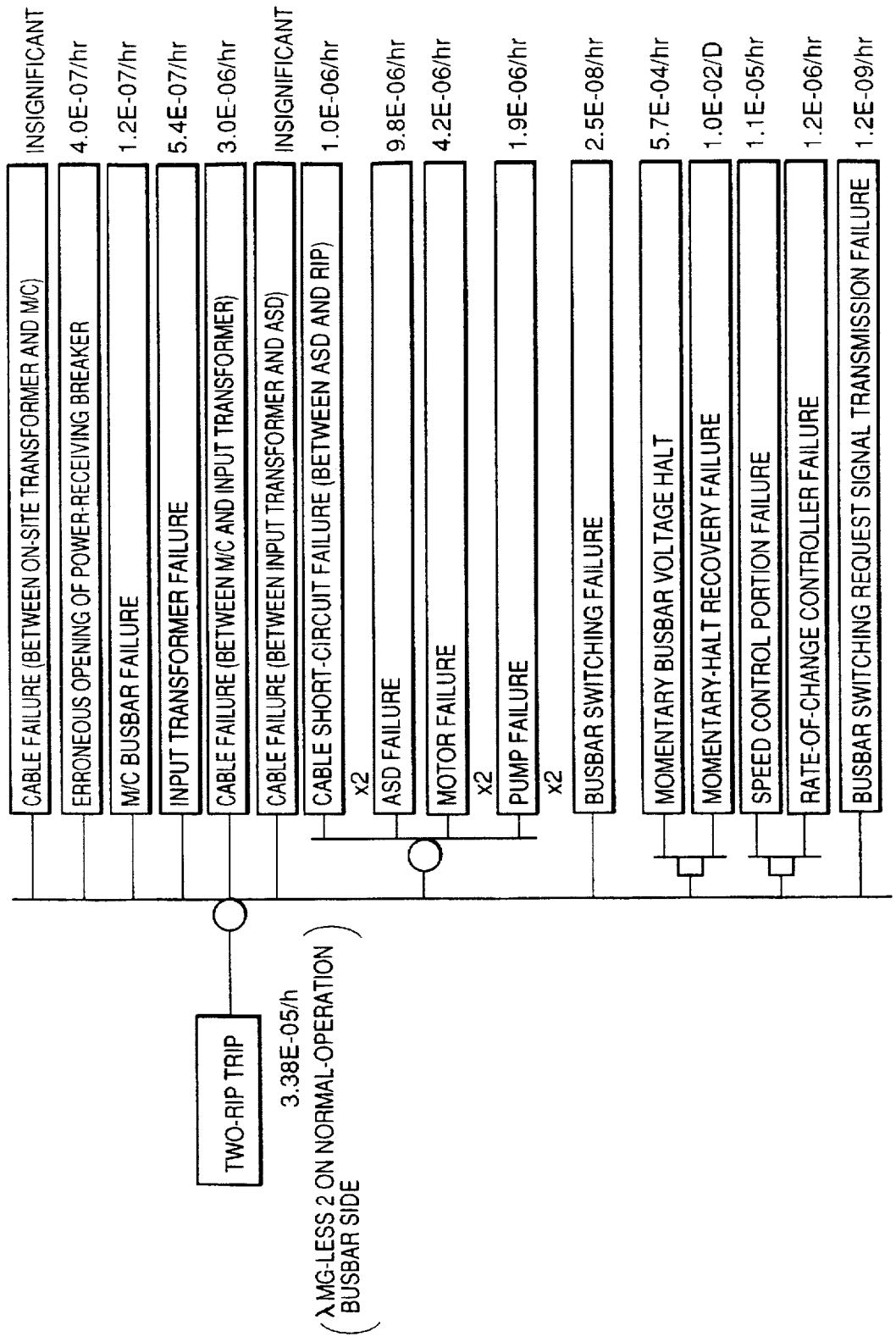
FIG. 19 is a fault tree of the causes and frequencies of two-RIP trips in MG-less RIPs connected to normal-operation busbars.
Figure 20:
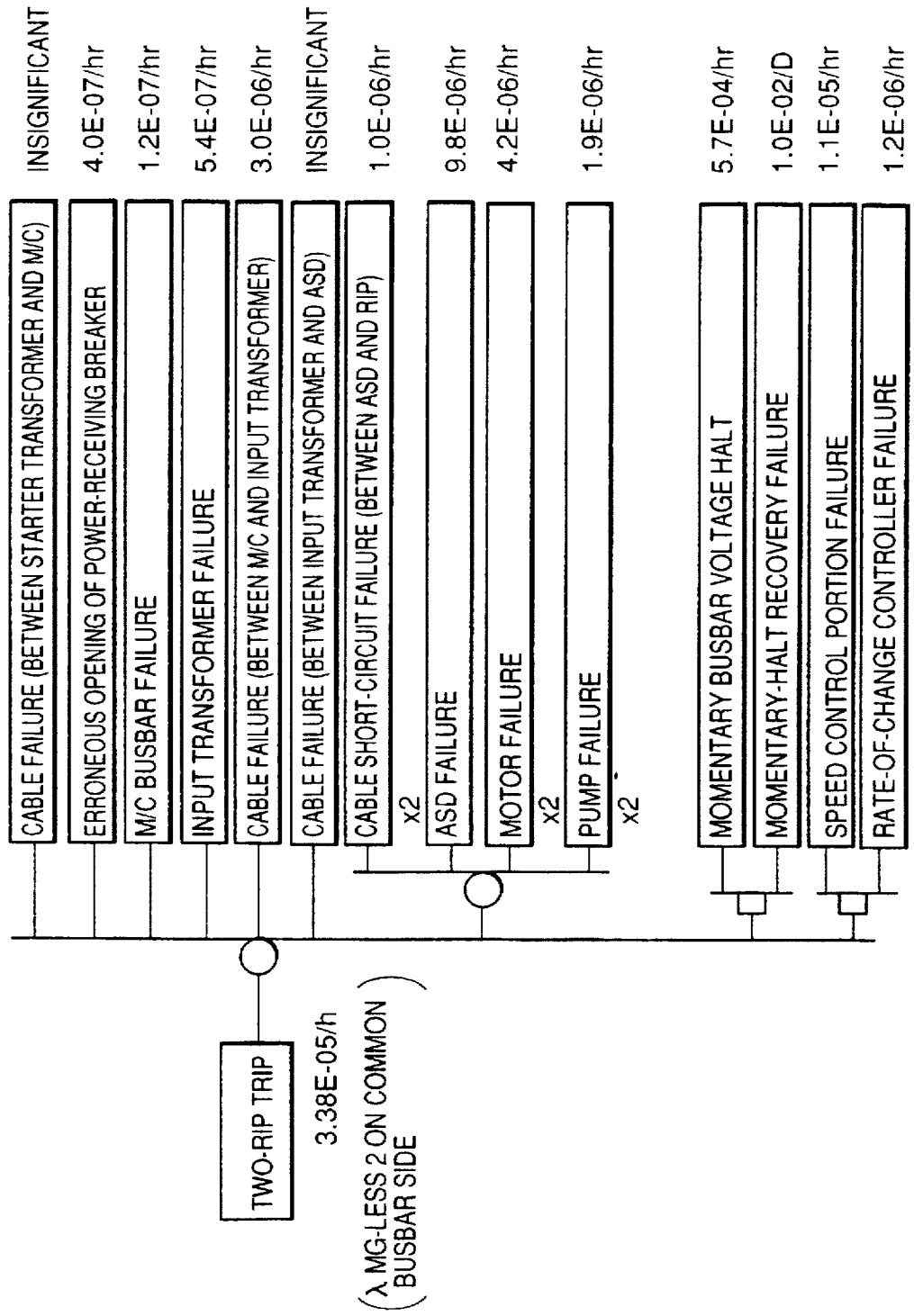
FIG. 20 is a fault tree of the causes and frequencies of two-RIP trips in MG-less RIPs connected to common busbars.
Figure 21:
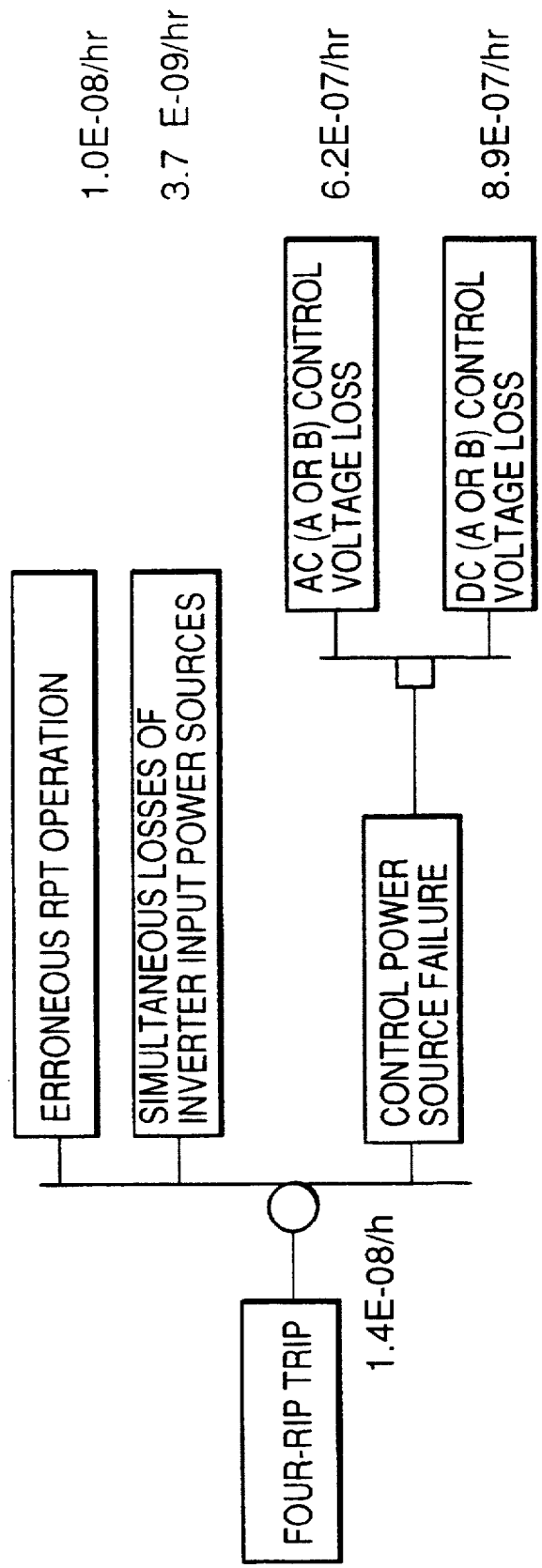
FIG. 21 a fault tree of the causes and frequencies of four-RIP trips.

For the power supply system 17 for driving reactor coolant recirculation pumps of this embodiment, a fault tree of the causes and frequencies of two-RIP trips in MG-less RIPs connected to the normal-operation busbars is shown in FIG. 19, a fault tree of the causes and frequencies of two-RIP trips in MG-less RIPs connected to the common busbars is shown in FIG. 20, a fault tree of the causes and frequencies of two-RIP trips in MG-equipped RIPs is shown in FIG. 4, and a fault tree of the causes and frequencies of four-RIP trips is shown in FIG. 21.

Note that the primary factors of the $\lambda$MG-less2 cases shown in FIGS. 19 and 20 are different, but overall they have the same order of magnitude so are handled in the same manner in the calculations.

Figure 22:
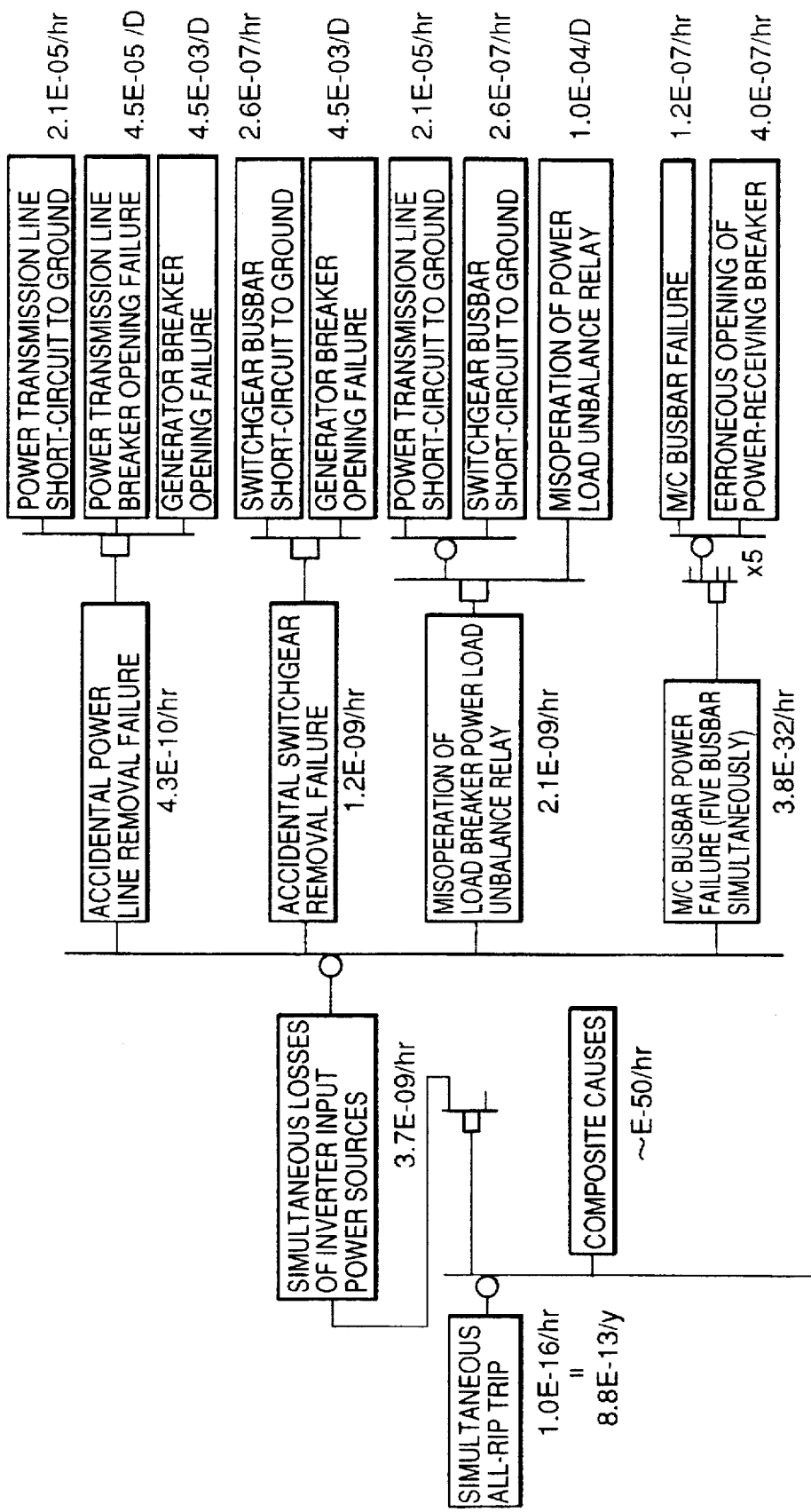
FIG. 22 is a fault tree of the causes and frequencies of simultaneous all-RIP trips (ten-RIP trips)
Figure 23:
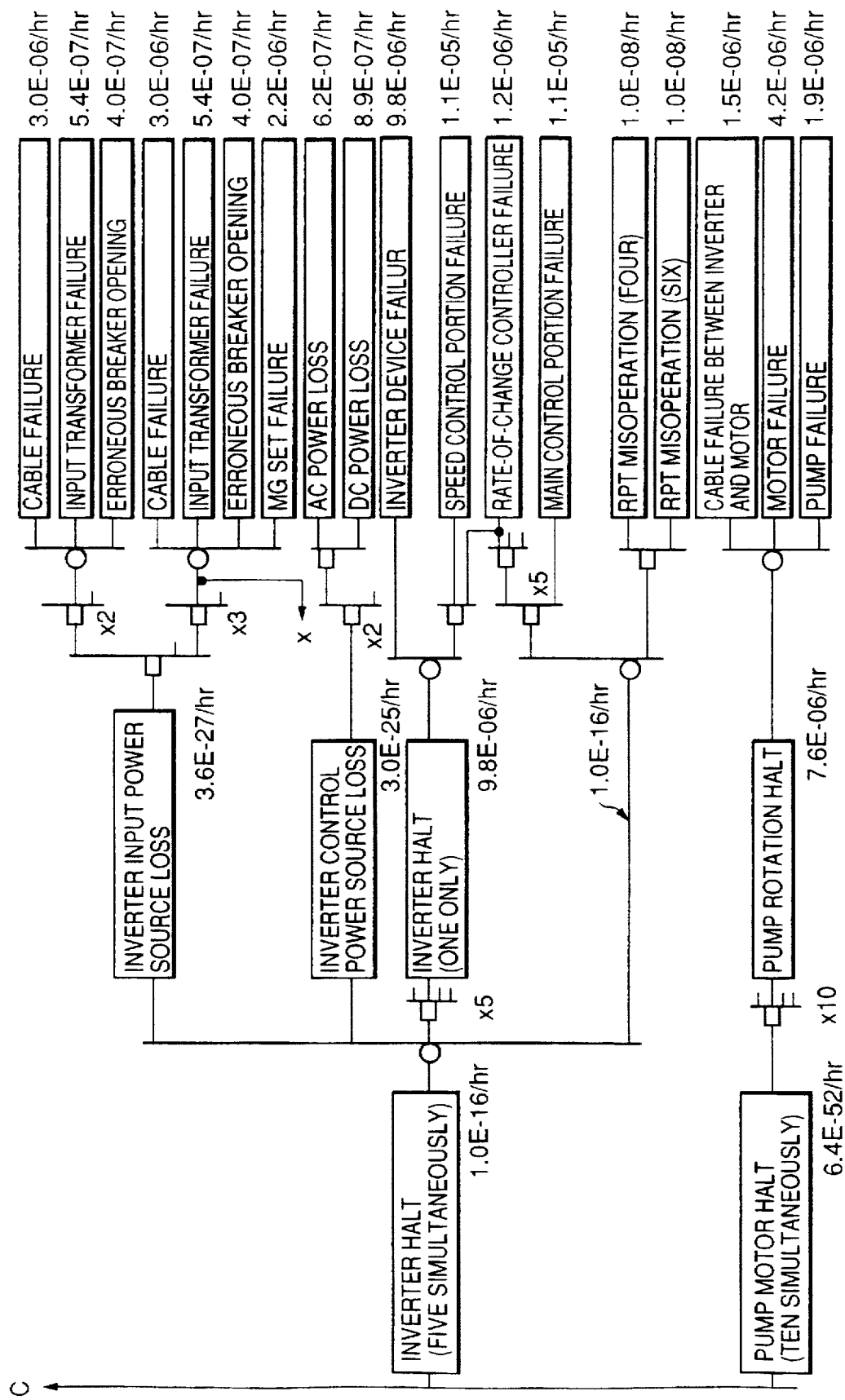
FIG. 23 is a continuation of the fault tree of FIG. 23.

In addition, a fault tree of the causes and frequencies of six-RIP trips is shown in FIG. 6 and a fault tree of the causes and frequencies of simultaneous all-RIP trips (ten-RIP trips) is shown extending over FIGS. 22 and 23 connected with an arrow c—c. The trip frequencies for each number of RIPs 8a to 8j can be calculated as follows by combining these fault trees:

one-RIP trip frequency=0 two-RIP trip frequency=$2\lambda$MG-less2 +$3\lambda$MG-equipped2 =$1.38 \times 10^{20}$ /year three-RIP trip frequency=0 four-RIP trip frequency=$\lambda 4+\lambda$MG-less$2^2+2\lambda$MG-less2 $\times 3\lambda$MG-equipped2+$3\lambda$MG-equipped$2^2$=$2.10 \times 10^{-4}$/year five-RIP trip frequency=0 six-RIP trip frequency=$\lambda 6+\lambda 4 \times 3\lambda$MG-equipped2+$\lambda$MG-less$2^2 \times 3\lambda$MG-equipped2+$2\lambda$MG-less2$\times 3\lambda$MG-equipped$2^2$+$\lambda$MG-equipped$2^3$=$1.87 \times 10^{-8}$/year seven-RIP trip frequency=0 eight-RIP trip frequency=$\lambda 6 \times \lambda$MG-less2+$\lambda 6 \times \lambda$MG-equipped2+$\lambda 4 \times 3\lambda$MG-equipped$2^2$+$\lambda$MG-less$2^2 \times 3\lambda$MG-equipped$2^2$+$2\lambda$MG-less2$\times \lambda$MG-equipped$2^3$= $6.90 \times 10^{-13}$/year nine-RIP trip frequency=0 ten-RIP trip frequency=$8.8 \times 10^{-13}$/year

It can be seen from the above that the only one of the above frequencies that is as high as $10^{-2}$/year, a transient phenomenon, is the two-RIP trip phenomenon. In addition, the all-RIP trip frequency is equivalent to that of existing systems.

Note that a comparison with the seventh embodiment shows that this connection of the MG-less RIPs 8i and 8j to the common busbar 16b1 of the second starter power line Sn affects the busbar switching request signal transfer losses and busbar switching losses of the primary factors for simultaneous inverter input power supply losses, which is the primary cause of four-RIP trips, so that it becomes the primary cause of two-RIP trips in the MG-less RIPs 8a and 8b connected to the normal-operation busbar 5a1

However, this is not a primary cause of tripping in the MG-less RIPs 8i and 8j connected to the common busbar 16b1, so these primary factors are excluded from the four-RIP trip frequency.

Note that the trip frequencies of the RIPs 8i and 8j are added to the two-RIP trip frequencies for MG-less RIPs (on the normal-operation busbar side), but comparison of these primary factors with other primary causes of two-RIP trip frequencies shows that the order of magnitude thereof is small so there is no effect on the overall two-RIP trip frequency.

As a result, each of the four-, six-, and eight-RIP trip frequencies is reduced and thus the reliability of the power supply system 17 for driving reactor coolant recirculation pumps is improved.

This ends the description of the eighth embodiment. The description now turns to a power supply system for driving reactor coolant recirculation pumps in accordance with a ninth embodiment of this invention.

Figure 24:
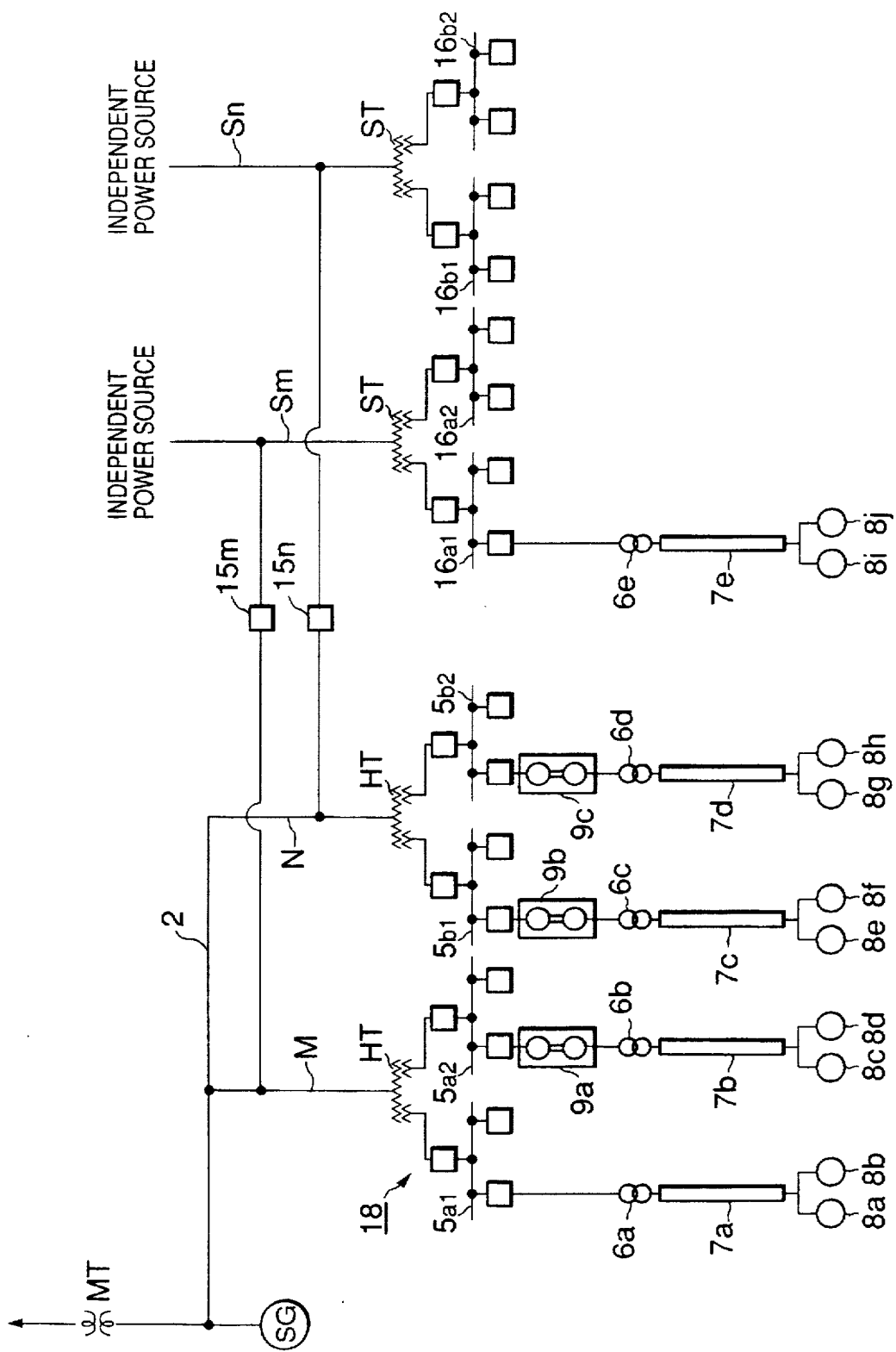
FIG. 24 shows the configuration of a ninth embodiment of the power supply system for driving reactor coolant recirculation pumps.

The system configuration of a power supply system 18 for driving reactor coolant recirculation pumps in accordance with this ninth embodiment is shown in FIG. 24. Note that components thereof that are the same as those of the eighth embodiment are denoted by the same reference numbers, to facilitate comprehension of this embodiment.

The power supply system 18 for driving reactor coolant recirculation pumps in accordance with this ninth embodiment has basically the same configuration as the above power supply system 17 for driving reactor coolant recirculation pumps of the eighth embodiment, except that the RIPs 8i and 8j connected to the common busbar 16b1 of the second starter power line Sn are connected to the common busbar 16a1 of the first starter power line Sm instead. Specific details of this configuration are given below.

The power lines of the power supply system 18 for driving reactor coolant recirculation pumps of this embodiment are the same as those of the above-described eighth embodiment. In other words, the system has first and second power lines M and N for auxiliary power generation (which obtain electrical power from the main on-site power line 2) and first and second starter power lines Sm and Sn (which obtain electrical power from an independent power source), the first starter power line Sm is connected by a breaker means 15m to the first power line M for auxiliary power generation, and the second starter power line Sn is connected by a breaker means 15n to the second power line N for auxiliary power generation, as shown in FIG. 24.

The normal-operation busbars 5a1 and 5a2 branch off from the first power line M for auxiliary power generation, with a house transformer HT therebetween. Similarly, the normal-operation busbars 5b1 and 5b2 branch off from the second power line N for auxiliary power generation, with a house transformer HT therebetween. The common busbars 16a1 and 16a2 branch off from the first starter power line Sm, with a starter transformer ST therebetween. Similarly, the common busbars 16b1 and 16b2 branch off from the second starter power line Sn, with a starter transformer ST therebetween.

One static adjustable-frequency power supply device ASD 7a is connected directly to the normal-operation busbar 5a1. Another static adjustable-frequency power supply device ASD 7b is connected by an MG set to the other normal-operation busbar 5a2 of this first power line M for auxiliary power generation.

One static adjustable-frequency power supply device ASD 7c is connected by an MG set 9b to the normal-operation busbar 5b1 of the second power line N for auxiliary power generation. Similarly, one static adjustable-frequency power supply device ASD 7d is connected by an MG set 9c to other normal-operation busbar 5b2 of the second power line N for auxiliary power generation.

In addition, one static adjustable-frequency power supply device ASD 7e is connected directly to one common busbar 16a1 of the first starter power line Sm.

This embodiment is similar to the second to eighth embodiments in that input transformers 6a to 6e are provided at the input portions of the static adjustable-frequency power supply devices ASD 7a to 7e, if necessary, and two of the recirculation pump RIPs 8a to 8j are connected to each of the power supply devices ASD 7a to 7e.

Thus the power supply system 18 for driving reactor coolant recirculation pumps of this embodiment is configured in such a manner that one pair of MG-less RIPs 8a and 8b is connected to the normal-operation busbar 5a1 of the first power line M for auxiliary power generation, one pair of MG-equipped RIPs 8c and 8d is connected to the other normal-operation busbar 5a2 thereof, one pair of MG-equipped RIPs 8e and 8f is connected to the normal-operation busbar 5b1 of the second power line N for auxiliary power generation, and one pair of MG-equipped RIPs 8g and 8h is connected to the other normal-operation busbar 5b2 thereof. In addition, one pair of MG-less RIPs 8i and 8j is connected to the common busbar 16a1 of the first starter power line Sm.

The power supply system 18 for driving reactor coolant recirculation pumps of this embodiment is configured in the same way as previous embodiments to drive ten recirculation pumps RIP 8a to 8j by three MG sets 9a to 9c and five static adjustable-frequency power supply devices ASD 7a to 7e. The effects obtained by simplifying the components that configure the power supply system and using common specifications therefore are similar to those of the first embodiment.

In addition, power is supplied from a total of four lines (the two power lines M and N and two power lines Sm and Sn that receive power from a separate source) and there is a total of eight busbars, which enables further control over the number of RIPs that are halted simultaneously by the failure of one busbar, in the same way as in the eighth embodiment. The MG sets 9a to 9c have a further role to play by applying supplementary inertia to the six RIPs 8c to 8h if a momentary halt occurs in the power line or an external power loss occurs, in a similar manner to that of the above-described second to seventh embodiments.

The system is therefore configured in such a manner that it is not possible for three or more RIPs to halt simultaneously, even if a single failure of any kind occurs among the RIP power line components (the ASDs, input transformers, and MG sets, etc.). Furthermore, the inertia of the MG sets 9a to 9c makes it possible for operation to continue without any drop in the rated output of the plant, even if there should be a momentary halt or loss in the power supply system.

There now follows an investigation of calculations of the frequencies at which trips occur in various different numbers of the RIPs 8a to 8j in the power supply system 18 for driving reactor coolant recirculation pumps of this embodiment.

For the power supply system 18 for driving reactor coolant recirculation pumps of this embodiment, a fault tree of the causes and frequencies of two-RIP trips in MG-less RIPs connected to the normal-operation busbars is shown in FIG. 19, a fault tree of the causes and frequencies of two-RIP trips in MG-less RIPs connected to the common busbars is shown in FIG. 20, a fault tree of the causes and frequencies of two-RIP trips in MG-equipped RIPs is shown in FIG. 4, and a fault tree of the causes and frequencies of four-RIP trips is shown in FIG. 21.

Note that the primary factors of the λMG-less2 cases shown in FIGS. 19 and 20 are different, but overall they have the same order of magnitude so are handled in the same manner in the calculations.

A fault tree of the causes and frequencies of six-RIP trips is shown in FIG. 6 and a fault tree of the causes and frequencies of simultaneous all-RIP trips (ten-RIP trips) is shown extending over FIGS. 22 and 23. The trip frequencies for each number of RIPs 8a to 8j can be calculated as follows by combining these fault trees:

one-RIP trip frequency=0 two-RIP trip frequency=$2\lambda\text{MG-less}2+3\lambda\text{MG-equipped}2=1.38\times10^6$/year three-RIP trip frequency=0 four-RIP trip frequency=$\lambda4+\lambda\text{MG-less}2^2+2\lambda\text{MG-less}2\times3\lambda\text{MG-equipped}2+3\lambda\text{MG-equipped}2^2=2.10\times10^{-4}$/year five-RIP trip frequency=0 six-RIP trip frequency=$\lambda6+\lambda4\times3\lambda\text{MG-equipped}2+\lambda\text{MG-less}2^2\times3\lambda\text{MG-equipped}2+2\lambda\text{MG-less}2\times3\lambda\text{MG-equipped}2^2+\lambda\text{MG-equipped}2^3=1.87\times10^{-8}$/year seven-RIP trip frequency=0 eight-RIP trip frequency=$\lambda6\times2\lambda\text{MG-equipped}2+\lambda4\times3\lambda\text{MG-equipped}2^2+\lambda\text{MG-less}2^2\times3\lambda\text{MG-equipped}2^2+2\lambda\text{MG-less}2\times\lambda\text{MG-equipped}2^3=6.73\times10^{-13}$/year nine-RIP trip frequency=0 ten-RIP trip frequency=$8.8\times10^{-13}$/year

It can be seen from the above that the only one of the above frequencies that is as high as $10^{-2}$/year, a transient phenomenon, is the two-RIP trip phenomenon. In addition, the all-RIP trip frequency is equivalent to that of existing systems.

Note that a comparison with the eighth embodiment shows that the connection of the pair of MG-less RIPs 8i and 8j to the starter transformer ST and common busbar 16a1 of the first starter power line Sm ensures that the frequencies of six-RIP trips in the first power line M for auxiliary power generation and first starter power line Sm (control power loss being the most likely cause) and two-RIP trips (tripping of MG-equipped RIPs) in the second power line N for auxiliary power generation, which are the primary causes of eight-RIP trips, are reduced by the inertial effect of the MG sets 9a to 9c.

As a result, the eight-RIP trip frequency is reduced and thus the reliability of the power supply system 18 for driving reactor coolant recirculation pumps is improved.

This ends the description of the ninth embodiment. The description now turns to a power supply system for driving reactor coolant recirculation pumps in accordance with a tenth embodiment of this invention.

Figure 25:
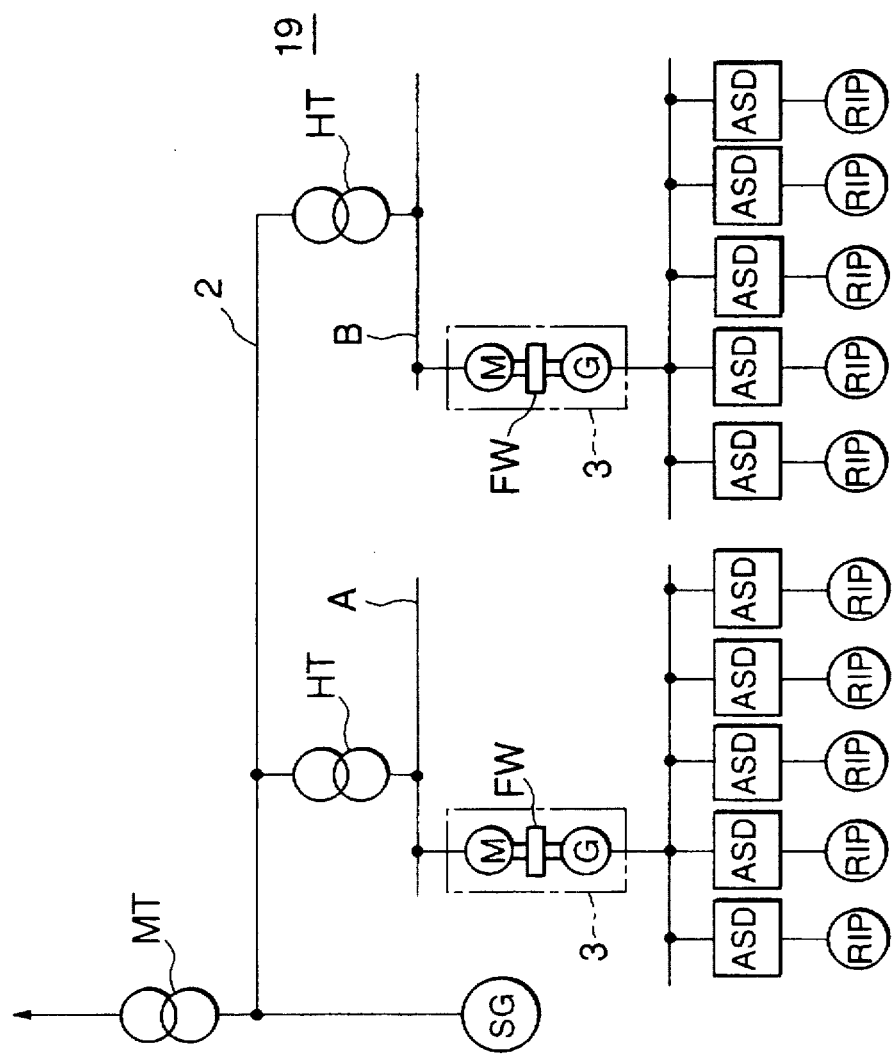
FIG. 25 shows the configuration of a tenth embodiment of the power supply system for driving reactor coolant recirculation pumps.

The tenth embodiment of this invention, as set forth in claim 10 herein, differs from the above-described first to ninth embodiments in that a plurality of static adjustable-frequency power supply devices is connected to each MG set, instead of one static adjustable-frequency power supply device to one MG set. The configuration of this tenth embodiment of the invention is shown in FIG. 25. Note that components thereof that are the same as those of the first embodiment are denoted by the same reference numbers, to facilitate comprehension of this embodiment.

As shown in FIG. 25, a power supply system 19 for driving reactor coolant recirculation pumps in accordance with the tenth embodiment is configured in such a manner that normal-operation busbars A and B are each connected to the main on-site power line 2 by a house transformer HT, one MG set 3 is connected to the normal-operation busbar A, one MG set 3 is connected to the normal-operation busbar B, five static adjustable-frequency power supply devices ASD are connected to each of these MG sets 3, and one recirculation pump RIP is connected to each static adjustable-frequency power supply device ASD. This embodiment resembles the first embodiment in that electrical power is supplied to the main on-site power line 2 by the main generator SG, the electrical power supplied to the main on-site power line 2 is supplied to the recirculation pumps RIP through the house transformers HT on the one hand, and it is also transmitted to external transmission cables through a transmission transformer MT.

Note that there are two normal-operation busbars in this embodiment, as described above, one MG set 3 is connected to each of the normal-operation busbars A and B, and also five static adjustable-frequency power supply devices ASD are connected to each MG set. However, it should be noted that the present invention is not limited to these numbers of components, so long as at least one MG set 3 is connected to one normal-operation busbar.

In the tenth embodiment configured as shown in FIG. 25, power for driving ten recirculation pumps RIP is supplied through two MG sets for the entire nuclear generating plant. This provides a system configuration that is simpler than the prior-art power supply system for driving reactor coolant recirculation pumps in which ten recirculation pumps RIP are driven by two MG sets and four static adjustable-frequency power supply devices ASD connected directly to the normal-operation busbars. Furthermore, since the static adjustable-frequency power supply devices ASD in this embodiment are connected to the normal-operation busbars A and B by the MG sets 3, leakage of high frequency current into the normal-operation busbars A and B due to the switching of the static adjustable-frequency power supply device ASD can be prevented. In addition, since one static adjustable-frequency power supply device ASD is provided for each recirculation pump RIP, the number of recirculation pumps RIP halted by a failure of one static adjustable-frequency power supply device ASD can be limited to one.

This ends the description of the tenth embodiment. The description now turns to a power supply system for driving reactor coolant recirculation pumps in accordance with an eleventh embodiment of this invention.

Figure 26:
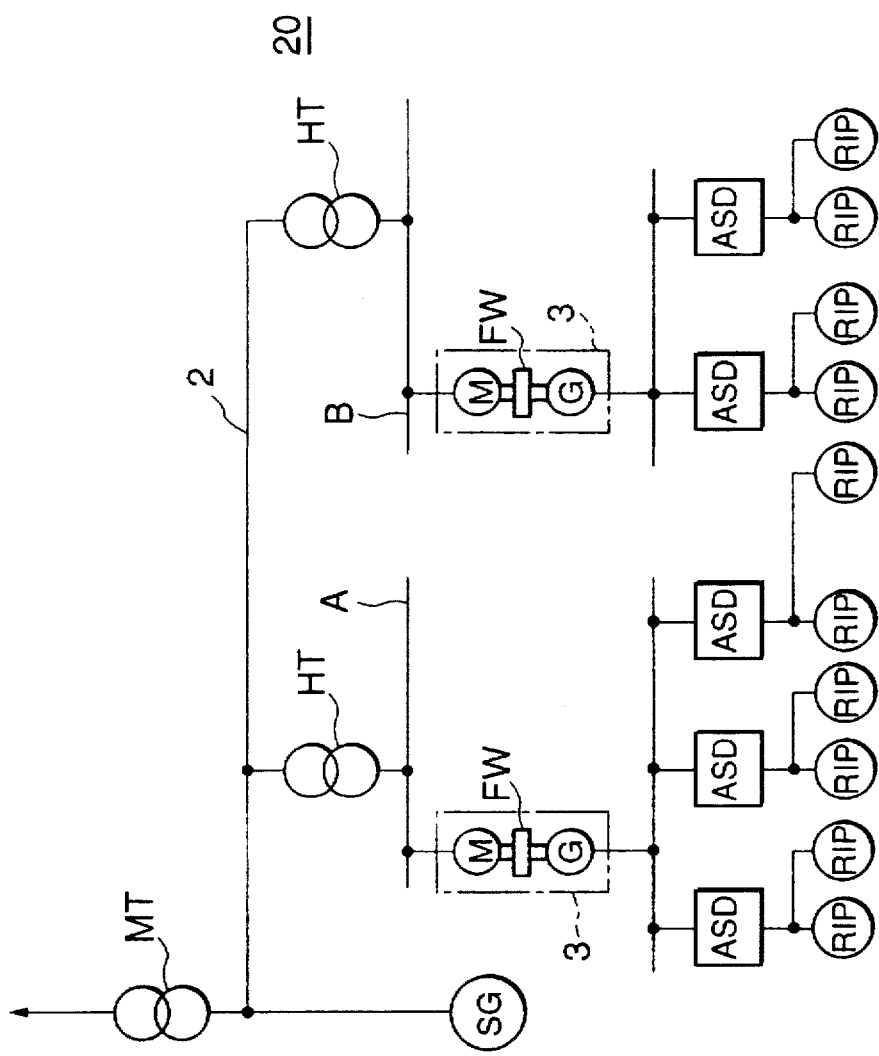
FIG. 26 shows the configuration of an eleventh embodiment of the power supply system for driving reactor coolant recirculation pumps.

The eleventh embodiment of this invention relates to an aspect of the invention that is set forth in claim 11 herein, and it differs from the above-described tenth embodiment of this invention in which one recirculation pump RIP is connected to one static adjustable-frequency power supply device ASD, in that a plurality of recirculation pumps RIP is connected to one static adjustable-frequency power supply device ASD. The configuration of the eleventh embodiment of this invention is shown in FIG. 26. Note that components thereof that are the same as those of the first embodiment are denoted by the same reference numbers, to facilitate comprehension of this embodiment.

As shown in FIG. 26, a power supply system 20 for driving reactor coolant recirculation pumps in accordance with the eleventh embodiment is configured in such a manner that normal-operation busbars A and B are each connected to the main on-site power line 2 by a house transformer HT, one MG set 3 is connected to the normal-operation busbar A, one MG set 3 is connected to the normal-operation busbar B, three static adjustable-frequency power supply devices ASD are connected to the MG set 3 on the normal-operation busbar A side and two static adjustable-frequency power supply devices ASD are connected to the MG set 3 on the normal-operation busbar B side, and two recirculation pumps RIP are connected to each static adjustable-frequency power supply device ASD.

This embodiment resembles the first embodiment in that electrical power is supplied to the main on-site power line 2 by the main generator SG, the electrical power supplied to the main on-site power line 2 is supplied to the recirculation pumps RIP through the house transformers HT on the one hand, and it is also transmitted to external transmission cables through a transmission transformer MT.

In addition, there are two normal-operation busbars in this embodiment, as described above, one MG set 3 is connected to each of the normal-operation busbars A and B, and two and three static adjustable-frequency power supply devices ASD are connected to these MG sets, respectively. However, the numbers of these components are not limited by this invention, so long as at least one MG set 3 is connected to one normal-operation busbar, a plurality of static adjustable-frequency power supply devices ASD is connected to one MG set, and a plurality of recirculation pumps RIP is connected to each static adjustable-frequency power supply device ASD.

In the eleventh embodiment configured as shown in FIG. 26, power for driving ten recirculation pumps RIP is supplied through two MG sets for the entire nuclear generating plant. This provides a system configuration that is simpler than the prior-art power supply system for driving reactor coolant recirculation pumps in which ten recirculation pumps RIP are driven by two MG sets and four static adjustable-frequency power supply devices ASD connected directly to the normal-operation busbars. In particular, in comparison with the above tenth embodiment, a plurality of recirculation pumps RIP is driven by one static adjustable-frequency power supply device ASD, enabling a reduction in the number of static adjustable-frequency power supply devices ASD.

Furthermore, since the static adjustable-frequency power supply devices ASD in this embodiment are connected to the normal-operation busbars A and B by the MG sets 3, leakage of high frequency current into the normal-operation busbars A and B due to the switching of the static adjustable-frequency power supply device ASD can be prevented.

This ends the description of the eleventh embodiment. The description now turns to a power supply system for driving reactor coolant recirculation pumps in accordance with a twelfth embodiment of this invention.

Figure 27:
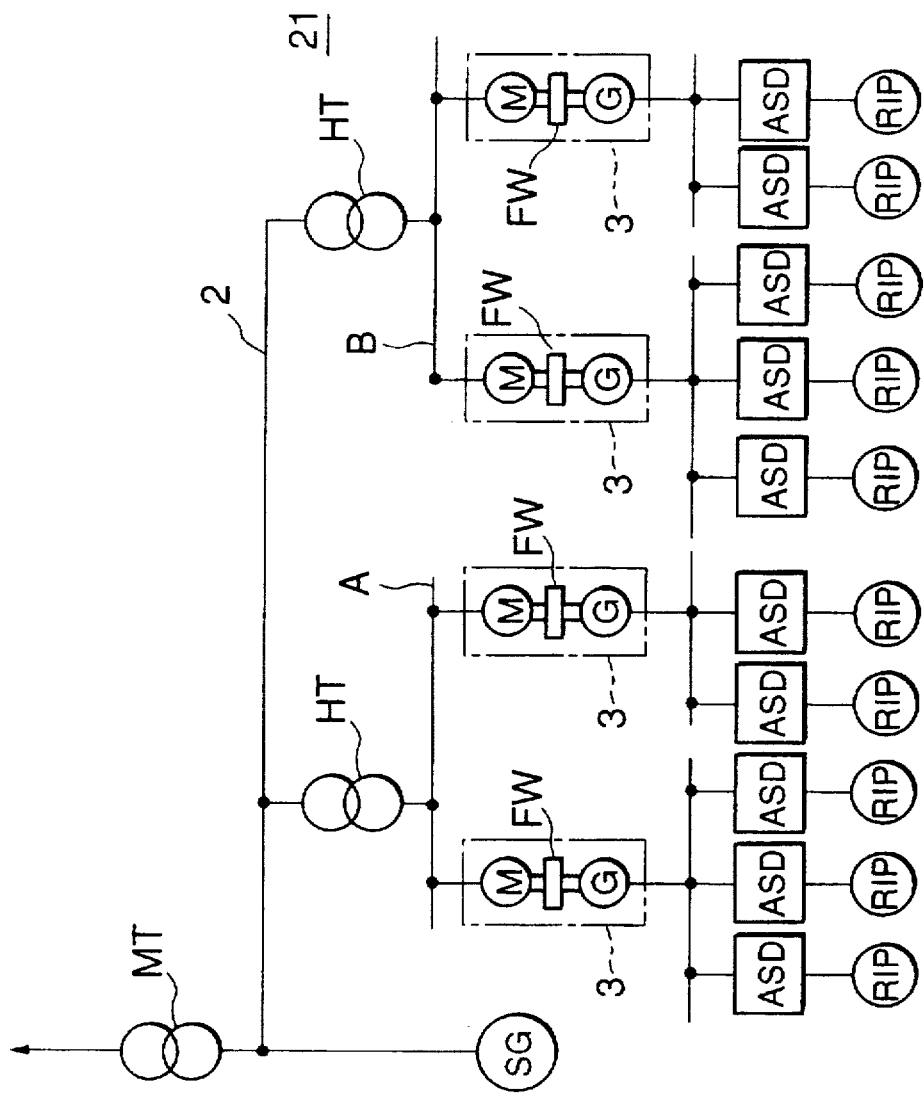
FIG. 27 shows the configuration of a twelfth embodiment of the power supply system for driving reactor coolant recirculation pumps.

The twelfth embodiment of this invention relates to an aspect of the invention that is set forth in claim 12 herein, and it differs from the above-described eleventh embodiment in that it is not just at least one MG set connected to each normal-operation busbar, but at least three MG sets are connected thereto. The configuration of the twelfth embodiment of this invention is shown in FIG. 27. Note that components thereof that are the same as those of the first embodiment are denoted by the same reference numbers, to facilitate comprehension of this embodiment.

As shown in FIG. 27, a power supply system 21 for driving reactor coolant recirculation pumps of this twelfth embodiment of this invention is configured in such a manner that normal-operation busbars A and B are each connected to the main on-site power line 2 by a house transformer HT; two MG sets 3 are connected to the normal-operation busbar A; two and three static adjustable-frequency power supply devices ASD are connected to these MG sets, respectively; and one recirculation pump RIP is connected to each static adjustable-frequency power supply device ASD; and, similarly, two MG sets 3 are connected to the normal-operation busbar B; two and three static adjustable-frequency power supply devices ASD are connected to these MG sets, respectively; and one recirculation pump RIP is connected to each static adjustable-frequency power supply device ASD.

This embodiment resembles the first embodiment in that electrical power is supplied to the main on-site power line 2 by the main generator SG, the electrical power supplied to the main on-site power line 2 is supplied to the recirculation pumps RIP through the house transformers HT on the one hand, and it is also transmitted to external transmission cables through a transmission transformer MT.

In addition, there are two normal-operation busbars in this embodiment, as described above, there are two MG sets 3 connected to each of the normal-operation busbars A and B, and two and three static adjustable-frequency power supply devices ASD are connected to each of these MG sets, respectively. However, it should be noted that the present invention is not limited to these numbers of components, so long as at least three MG sets 3 are connected to a normal-operation busbar, at least one static adjustable-frequency power supply device ASD is connected to one MG set, and one recirculation pump RIP is connected to each static adjustable-frequency power supply device ASD.

In the twelfth embodiment configured as shown in FIG. 27, power for driving ten recirculation pumps RIP is supplied through four MG sets 3 for the entire nuclear generating plant. This provides a system configuration that is simpler than the prior-art power supply system for driving reactor coolant recirculation pumps in which ten recirculation pumps RIP are driven by two MG sets and four static adjustable-frequency power supply devices ASD connected directly to the normal-operation busbars. Furthermore, since the static adjustable-frequency power supply devices ASD in this embodiment are connected to the normal-operation busbars A and B by the MG sets 3, leakage of high frequency current into the normal-operation busbars A and B due to the switching of the static adjustable-frequency power supply device ASD can be prevented. In addition, one static adjustable-frequency power supply device ASD for each recirculation pump RIP, so that the number of recirculation pumps RIP halted by a failure of one static adjustable-frequency power supply device ASD can be limited to one.

This ends the description of the twelfth embodiment. The description now turns to a power supply system for driving reactor coolant recirculation pumps in accordance with a thirteenth embodiment of this invention.

Figure 28:
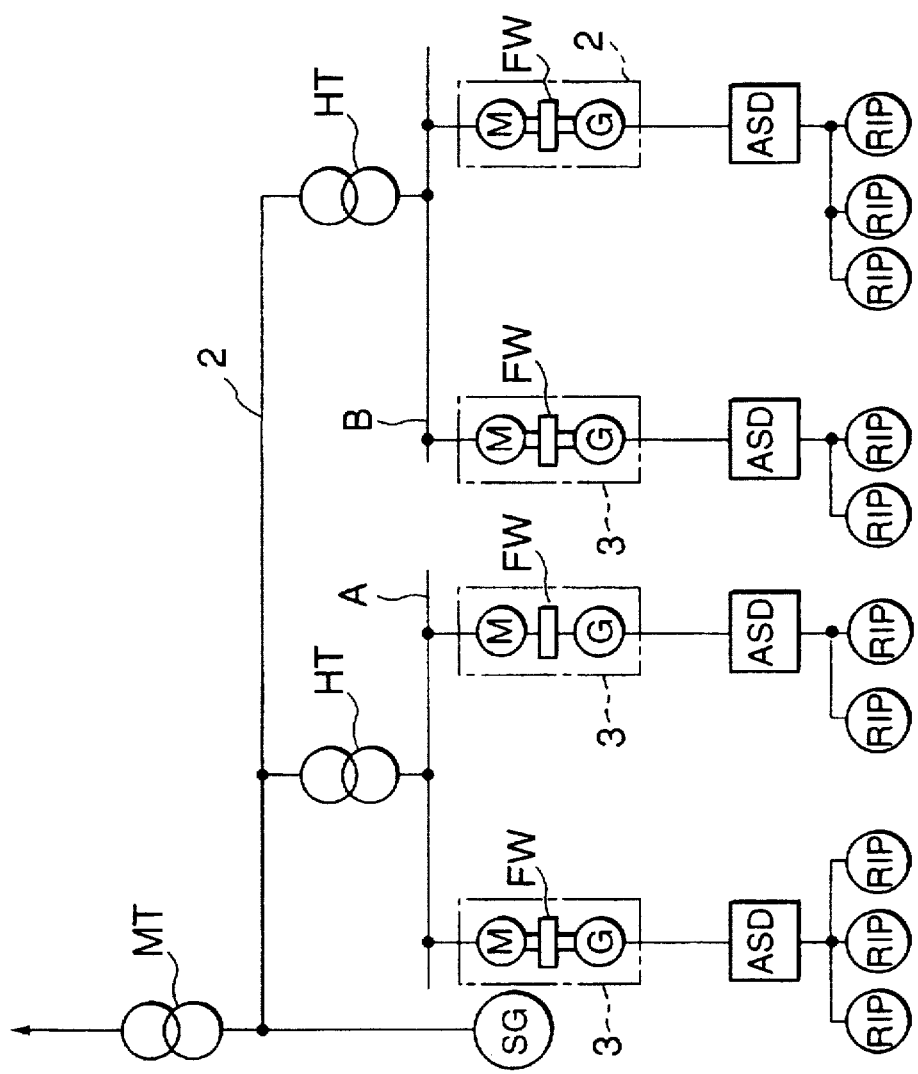
FIG. 28 shows the configuration of a thirteenth embodiment of the power supply system for driving reactor coolant recirculation pumps.

The thirteenth embodiment of this invention relates to an aspect of the invention that is set forth in claim 13 herein, and it differs from the above-described twelfth embodiment of this invention in that a plurality of recirculation pumps RIP is connected to one static adjustable-frequency power supply device ASD, instead of one recirculation pump RIP. The configuration of the thirteenth embodiment of this invention is shown in FIG. 28. Note that components thereof that are the same as those of the first embodiment are denoted by the same reference numbers, to facilitate comprehension of this embodiment.

As shown in FIG. 28, a power supply system 22 for driving reactor coolant recirculation pumps in accordance with the thirteenth embodiment is configured in such a manner that normal-operation busbars A and B are each connected to the main on-site power line 2 by a house transformer HT; two MG sets 3 are connected to the normal-operation busbar A; one static adjustable-frequency power supply device ASD is connected to each MG set 3; and two and three recirculation pumps RIP are connected to each static adjustable-frequency power supply device ASD, respectively; and, on the other hand, two MG sets 3 are connected to the normal-operation busbar B; one static adjustable-frequency power supply device ASD is connected to each MG set 3; and two and three recirculation pumps RIP are connected to each of these static adjustable-frequency power supply devices ASD, respectively.

This embodiment resembles the first embodiment in that electrical power is supplied to the main on-site power line 2 by the main generator SG, the electrical power supplied to the main on-site power line 2 is supplied to the recirculation pumps RIP through the house transformers HT on the one hand, and it is also transmitted to external transmission cables through a transmission transformer MT.

In addition, there are two normal-operation busbars in this embodiment, as described above, there are two MG sets 3 connected to each of the normal-operation busbars A and B, one static adjustable-frequency power supply device ASD is connected to each MG set, and two and three static adjustable-frequency power supply devices ASD are connected to each of these MG sets, respectively. However, it should be noted that the present invention is not limited to these numbers of components, so long as at least three MG sets 3 are connected to a normal-operation busbar, at least one static adjustable-frequency power supply device ASD is connected to one MG set, and a plurality of recirculation pumps RIP is connected to each static adjustable-frequency power supply device ASD.

In the embodiment configured as shown in FIG. 28, power for driving ten recirculation pumps RIP is supplied through four MG sets for the entire nuclear generating plant. This provides a system configuration that is simpler than the prior-art power supply system for driving reactor coolant recirculation pumps in which ten recirculation pumps RIP are driven by two MG sets and four static adjustable-frequency power supply devices ASD connected directly to the normal-operation busbars. In particular, in comparison with the above-described twelfth embodiment, a plurality of recirculation pumps RIP is driven by one static adjustable-frequency power supply device ASD, enabling a reduction in the number of static adjustable-frequency power supply devices ASD.

Furthermore, since the static adjustable-frequency power supply devices ASD in this embodiment are connected to the normal-operation busbars A and B by the MG sets 3, leakage of high frequency current into the normal-operation busbars A and B due to the switching of the static adjustable-frequency power supply device ASD can be prevented.

This ends the description of the thirteenth embodiment. The description now turns to a power supply system for driving reactor coolant recirculation pumps in accordance with a fourteenth embodiment of this invention.

Figure 29:
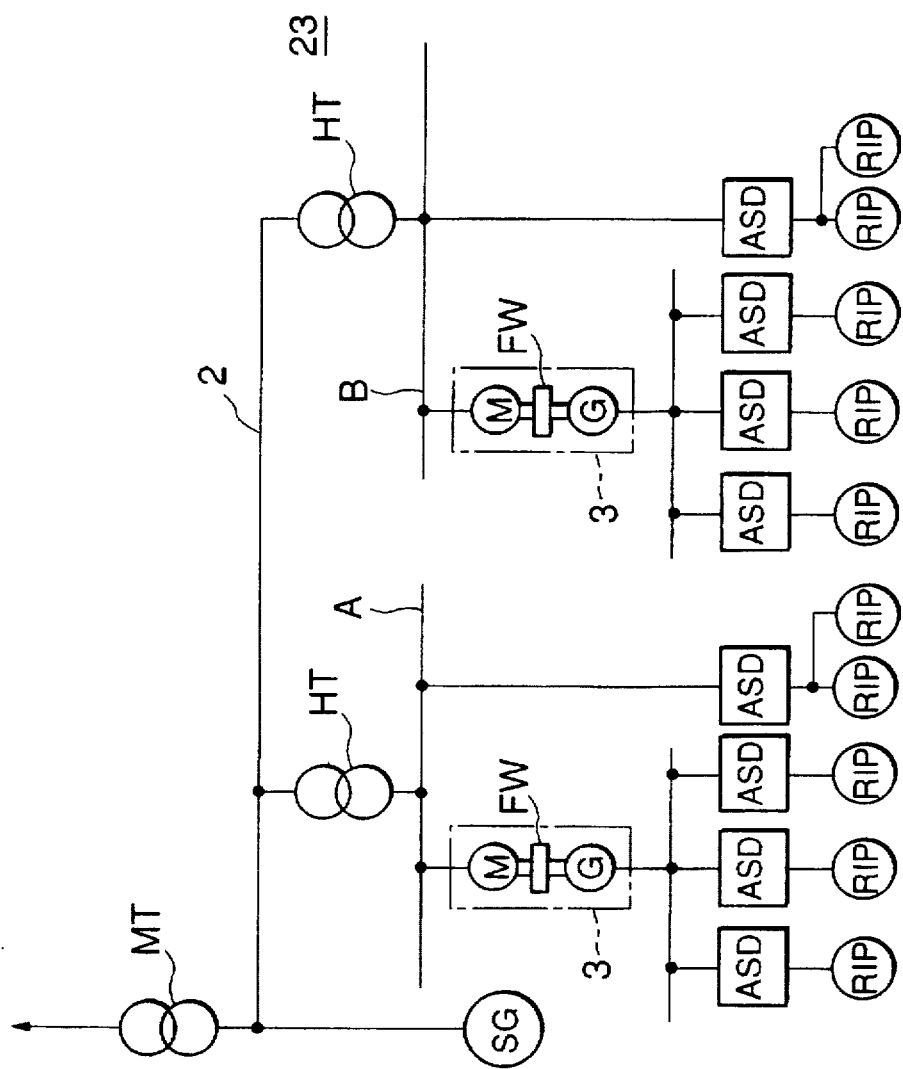
FIG. 29 shows the configuration of a fourteenth embodiment of the power supply system for driving reactor coolant recirculation pumps.

The fourteenth embodiment of this invention relates to an aspect of the invention that is set forth in claim 11 herein, and it differs from the above-described tenth to thirteenth embodiments in that a static adjustable-frequency power supply device ASD is connected by an MG set to a normal-operation busbar and another static adjustable-frequency power supply device ASD is connected directly thereto, instead of a configuration in which static adjustable-frequency power supply devices ASD are connected by MG sets to the normal-operation busbar. The configuration of the fourteenth embodiment of this invention is shown in FIG. 29. Note that components thereof that are the same as those of the first embodiment are denoted by the same reference numbers, to facilitate comprehension of this embodiment.

As shown in FIG. 29, a power supply system 23 for driving reactor coolant recirculation pumps in accordance with the fourteenth embodiment is configured in such a manner that normal-operation busbars A and B are each connected to the main on-site power line 2 by a house transformer HT, one MG set 3 is connected to the normal-operation busbar A, three static adjustable-frequency power supply devices ASD are connected to that MG set 3, and one recirculation pump RIP is connected to each static adjustable-frequency power supply device ASD. In addition, one static adjustable-frequency power supply device ASD is connected directly to this normal-operation busbar A and two recirculation pumps RIP are connected to this static adjustable-frequency power supply device ASD. In a similar manner, one MG set 3 is connected to the normal-operation busbar B, three static adjustable-frequency power supply devices ASD are connected to that MG set 3, one recirculation pump RIP is connected to each static adjustable-frequency power supply device ASD. In addition, one static adjustable-frequency power supply device ASD is connected directly to this normal-operation busbar B and two recirculation pumps RIP are connected to this static adjustable-frequency power supply device ASD.

This embodiment resembles the first embodiment in that electrical power is supplied to the main on-site power line 2 by the main generator SG, the electrical power supplied to the main on-site power line 2 is supplied to the recirculation pumps RIP through the house transformers HT on the one hand, and it is also transmitted to external transmission cables through a transmission transformer MT.

Note that there are two normal-operation busbars in this embodiment, as described above, one static adjustable-frequency power supply device ASD is connected by an MG set 3 to each of these normal-operation busbars A and B and another static adjustable-frequency power supply device ASD is connected directly thereto, three static adjustable-frequency power supply devices ASD are connected to each MG set 3, one recirculation pump RIP is connected to each static adjustable-frequency power supply device ASD that is connected by an MG set 3 to the corresponding normal-operation busbar, and two recirculation pumps RIP are connected to each static adjustable-frequency power supply device ASD that is connected directly to the corresponding normal-operation busbar. However, it should be noted that the present invention is not limited to this configuration, so long as static adjustable-frequency power supply devices ASD are connected by two MG sets and two direct connections to the normal-operation busbars in total, at least one static adjustable-frequency power supply device ASD is connected to each MG set, and at least one recirculation pump RIP is connected to each static adjustable-frequency power supply device ASD.

In the fourteenth embodiment configured as shown in FIG. 29, power for driving ten recirculation pumps RIP is supplied through two MG sets 3 and eight static adjustable-frequency power supply devices ASD for the entire nuclear generating plant. This system configuration is simpler than that of the prior-art power supply system for driving reactor coolant recirculation pumps in which ten recirculation pumps RIP are driven by two MG sets and ten static adjustable-frequency power supply devices ASD.

This ends the description of the fourteenth embodiment. The description now turns to a power supply system for driving reactor coolant recirculation pumps in accordance with a fifteenth embodiment of this invention.

Figure 30:
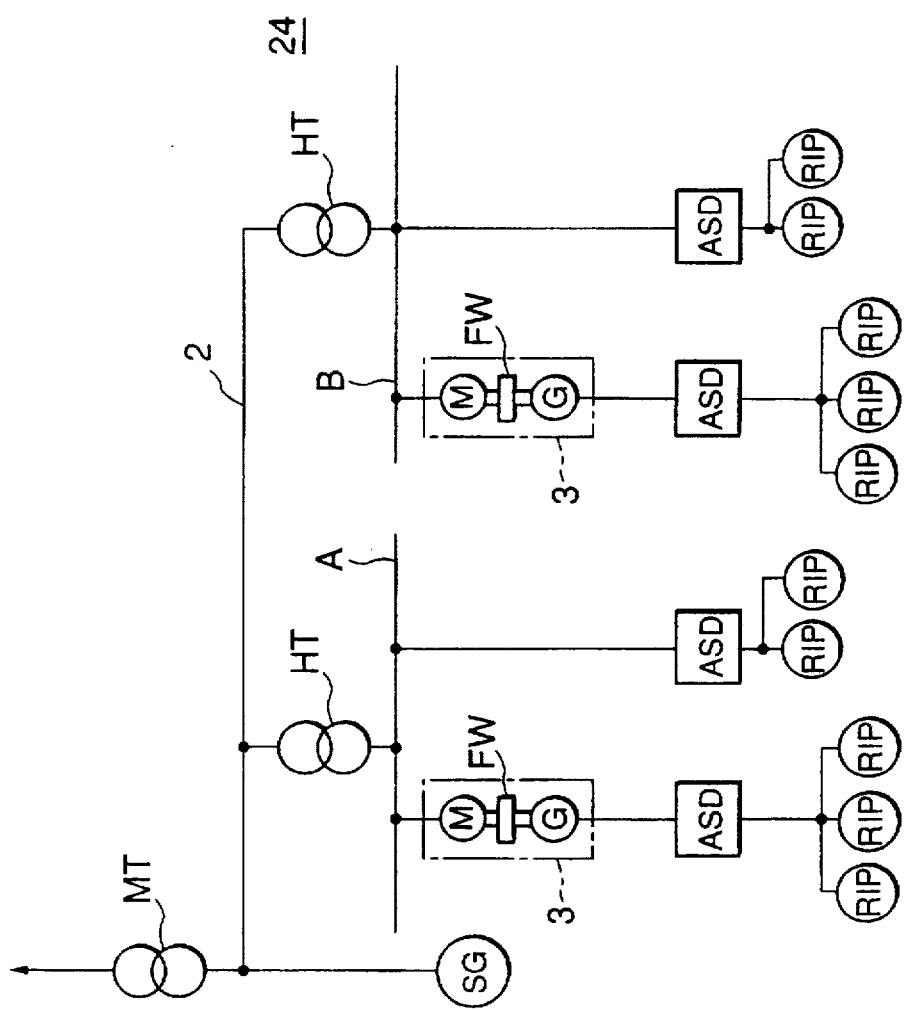
FIG. 30 shows the configuration of a fifteenth embodiment of the power supply system for driving reactor coolant recirculation pumps.

The fifteenth embodiment of this invention relates to an aspect of the invention that is set forth in claim 15 herein, and it differs from the above-described fourteenth embodiment in that a plurality of recirculation pumps RIP is connected to one static adjustable-frequency power supply device ASD that is connected by an MG set to a normal-operation busbar, instead of one recirculation pump RIP connected to one static adjustable-frequency power supply device ASD. The configuration of the fifteenth embodiment of this invention is shown in FIG. 30. Note that components thereof that are the same as those of the first embodiment are denoted by the same reference numbers, to facilitate comprehension of this embodiment.

As shown in FIG. 30, a power supply system 24 for driving reactor coolant recirculation pumps in accordance with this fifteenth embodiment of the invention is configured in such a manner that normal-operation busbars A and B are each connected to the main on-site power line 2 by a house transformer HT, one MG set 3 is connected to the normal-operation busbar A, one static adjustable-frequency power supply device ASD is connected to the MG set 3, and three recirculation pumps RIP are connected to this static adjustable-frequency power supply device ASD. In addition, one static adjustable-frequency power supply device ASD is connected directly to this normal-operation busbar A and two recirculation pumps RIP are connected to this static adjustable-frequency power supply device ASD. In a similar manner, one MG set 3 is connected to the normal-operation busbar B, one static adjustable-frequency power supply device ASD is connected to the MG set 3, and three recirculation pumps RIP are connected to this static adjustable-frequency power supply device ASD. In addition, one static adjustable-frequency power supply device ASD is connected directly to this normal-operation busbar B and two recirculation pumps RIP are connected to this static adjustable-frequency power supply device ASD.

This embodiment resembles the first embodiment in that electrical power is supplied to the main on-site power line 2 by the main generator SG, the electrical power supplied to the main on-site power line 2 is supplied to the recirculation pumps RIP through the house transformers HT on the one hand, and it is also transmitted to external transmission cables through a transmission transformer MT.

Note that this embodiment as described above is not limited to the configuration of FIG. 30, so long as static adjustable-frequency power supply devices ASD are connected by two MG sets and two direct connections to the normal-operation busbars in total, at least one static adjustable-frequency power supply device ASD is connected to each MG set, and at least one recirculation pump RIP is connected to each static adjustable-frequency power supply device ASD.

In the fifteenth embodiment configured as shown in FIG. 30, power for driving ten recirculation pumps RIP is supplied through two MG sets 3 and four static adjustable-frequency power supply devices ASD for the entire nuclear generating plant. This system configuration is simpler than that of the prior-art power supply system for driving reactor coolant recirculation pumps in which ten recirculation pumps RIP are driven by two MG sets and ten static adjustable-frequency power supply devices ASD. In addition, this configuration enables a large reduction in the number of static adjustable-frequency power supply devices ASD, in comparison with the above-described fourteenth embodiment of this invention.

This ends the description of the fifteenth embodiment. The description now turns to a power supply system for driving reactor coolant recirculation pumps in accordance with a sixteenth embodiment of this invention.

Instead of the method used in the above first to fifteenth embodiments for controlling the rotational speed of recirculation pumps RIP by static adjustable-frequency power supply devices ASD, the sixteenth to nineteenth embodiments of this invention described below control the rotational speed of recirculation pumps RIP by combinations of rectifiers that convert AC power to DC power and inverters that convert DC power to AC power.

Figure 31:
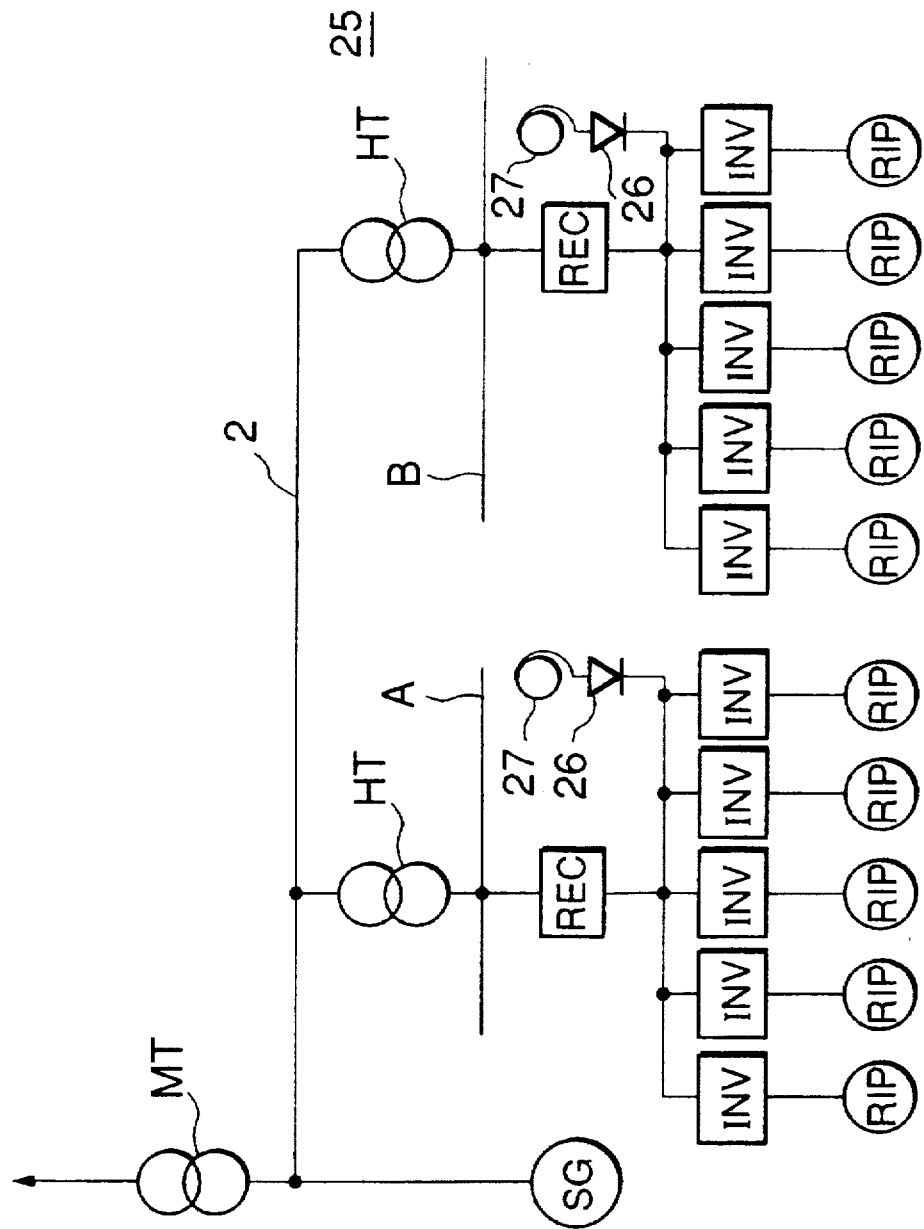
FIG. 31 shows the configuration of a sixteenth embodiment of the power supply system for driving reactor coolant recirculation pumps.

The sixteenth embodiment of this invention relates to an aspect of the invention that is set forth in claim 16 herein, with the configuration thereof being as shown in FIG. 31. Note that components thereof that are the same as those of the first embodiment are denoted by the same reference numbers, to facilitate comprehension of this embodiment.

As shown in FIG. 31, a power supply system 25 for driving reactor coolant recirculation pumps of this sixteenth embodiment is configured in such a manner that normal-operation busbars A and B are each connected to the main on-site power line 2 by a house transformer HT, one rectifier REC for converting AC power to DC power is connected to each of the normal-operation busbars A and B, five inverters INV for converting DC power to AC power are connected to each of these rectifiers REC, one recirculation pump RIP is connected to each inverter INV, and also an AC storage device 27 is connected by a rectifier device 26 to the input portions of each group of inverters INV.

Each AC storage device 27 is provided as a back-up power supply if, for example, the corresponding rectifier REC should fail. Since the input portions of the inverters INV use DC power, an AC supply from the AC storage device 27 is converted to DC by the rectifier device 26 and is supplied to the five inverters INV. A superconductive coil for storing AC energy, an MG set connected to a flywheel FW, a high-speed electrical motor connected to a flywheel FW, or the like, could be used as this AC storage device 27.

This embodiment resembles the first embodiment in that electrical power is supplied to the main on-site power line 2 by the main generator MG, the electrical power supplied to the main on-site power line 2 is supplied to the recirculation pumps RIP through the house transformers HT on the one hand, and it is also transmitted to external transmission cables through a transmission transformer MT.

Note that there are two normal-operation busbars in this embodiment, as described above, one rectifier REC is connected to each of the normal-operation busbars A and B, and five inverters INV are connected to each rectifier REC. However, it should be noted that the present invention is not limited to these numbers of components, so long as at least one rectifier REC is connected to one normal-operation busbar, a plurality of inverters INV is connected to each rectifier REC, and one recirculation pump RIP is connected to each inverter INV.

This sixteenth embodiment makes it possible to use a comparatively simple structure of inexpensive rectifiers and inverters to control the rotational speed of the recirculation pumps RIP, in other words, the coolant flow rate and reactivity within the core. In addition, since the storage devices 27 are provided as a back-up power supply, the reactor can continue operating even when power is lost.

This ends the description of the sixteenth embodiment. The description now turns to a power supply system for driving reactor coolant recirculation pumps in accordance with a seventeenth embodiment of this invention.

Figure 32:
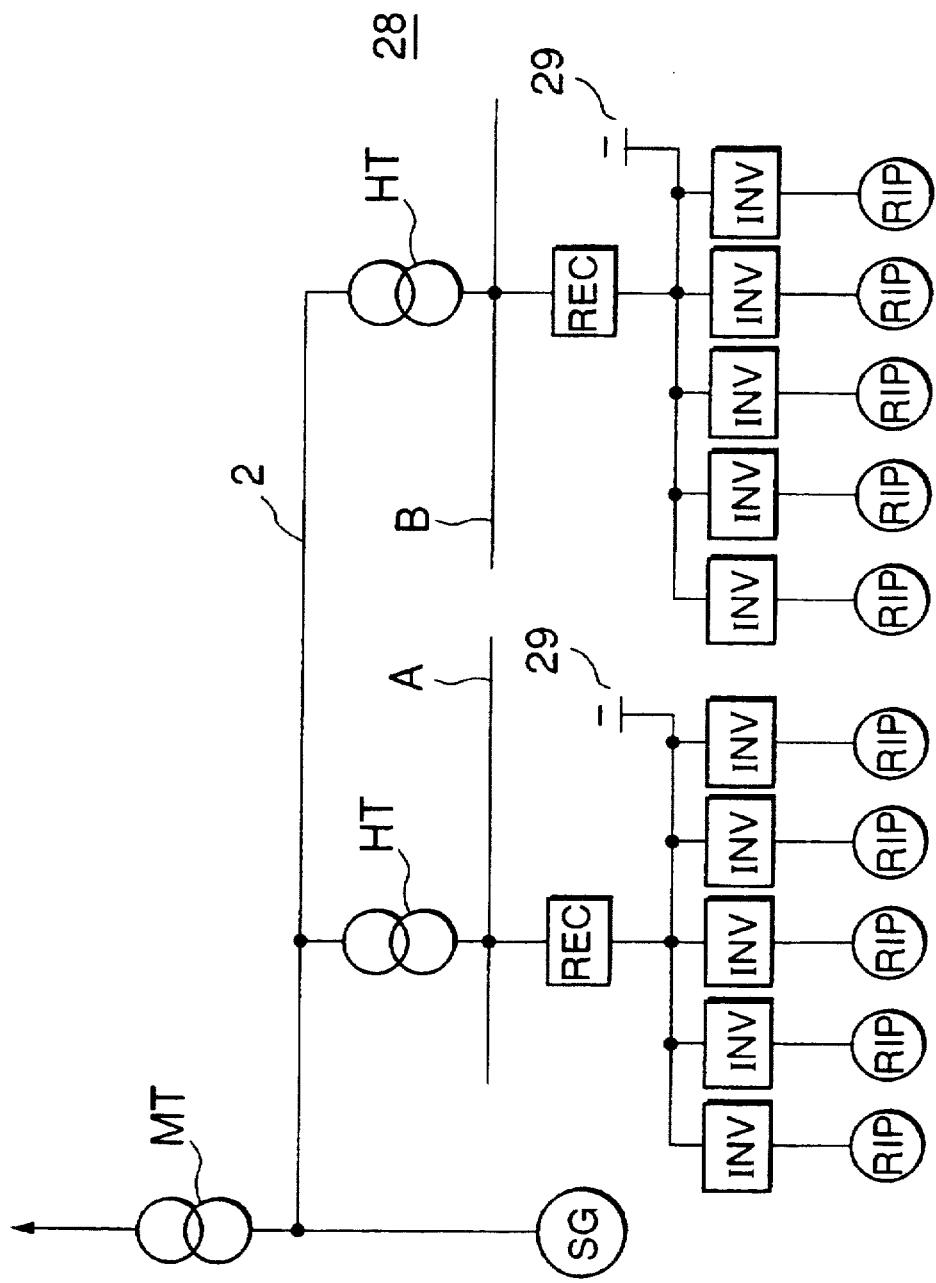
FIG. 32 shows the configuration of a seventeenth embodiment of the power supply system for driving reactor coolant recirculation pumps.

The seventeenth embodiment of this invention relates to an aspect of the invention that is set forth in claim 17 herein, and it differs from the above-described power supply system 25 for driving reactor coolant recirculation pumps of the sixteenth embodiment in that DC storage devices are provided as a back-up power supply instead of the AC storage devices 27. The configuration of the seventeenth embodiment of this invention is shown in FIG. 32. Note that components thereof that are the same as those of the first embodiment are denoted by the same reference numbers, to facilitate comprehension of this embodiment.

As shown in FIG. 32, a power supply system 28 for driving reactor coolant recirculation pumps of this seventeenth embodiment is configured in such a manner that normal-operation busbars A and B are each connected to the main on-site power line 2 by a house transformer HT, one rectifier REC for converting AC power to DC power is connected to each of the normal-operation busbars A and B, five inverters INV for converting DC power to AC power are connected to each of these rectifiers REC, one recirculation pump RIP is connected to each inverter INV, and a DC storage device 29 is connected to the input portions of each group of inverters INV. A battery, fuel cell, or the like could be used as each DC storage device 29.

This embodiment resembles the first embodiment in that electrical power is supplied to the main on-site power line 2 by the main generator MG, the electrical power supplied to the main on-site power line 2 is supplied to the recirculation pumps RIP through the house transformers HT on the one hand, and it is also transmitted to external transmission cables through a transmission transformer MT.

Note that the numbers of components of this embodiment are not limited to those shown in FIG. 32, and this configuration is exactly the same as that of the sixteenth embodiment in that at least one rectifier REC is connected to one normal-operation busbar, a plurality of inverters INV is connected to each rectifier REC, and one recirculation pump RIP is connected to each inverter INV.

This seventeenth embodiment makes it possible to use a comparatively simple structure of inexpensive rectifiers and inverters to control the rotational speed of the recirculation pumps RIP, in other words, the coolant flow rate and reactivity within the core. In addition, since the DC storage devices 29 are provided as a back-up power supply, the reactor can continue operating even when power is lost.

This ends the description of the seventeenth embodiment. The description now turns to a power supply system for driving reactor coolant recirculation pumps in accordance with an eighteenth embodiment of this invention.

Figure 33:
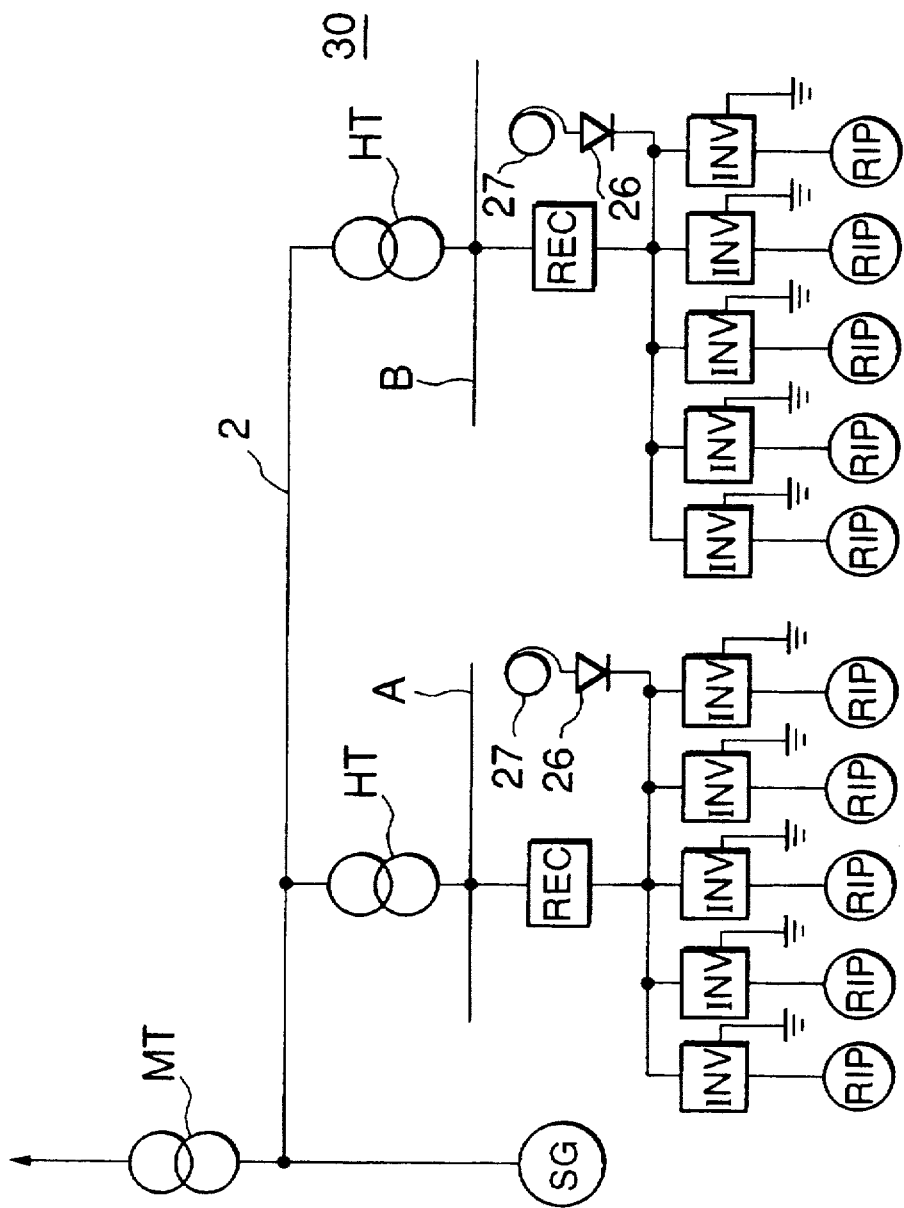
FIG. 33 shows the configuration of an eighteenth embodiment of the power supply system for driving reactor coolant recirculation pumps.

The eighteenth embodiment of this invention relates to an aspect of the invention that is set forth in claim 18 herein, and it differs from the above sixteenth embodiment in that an inverter that causes the generation of positive and negative voltages with respect to a neutral point is used as each inverter INV. The configuration of a power supply system 30 for driving reactor coolant recirculation pumps of this eighteenth embodiment is shown in FIG. 33. Note that components thereof that are the same as those of the sixteenth embodiment are denoted by the same reference numbers, to facilitate comprehension of this embodiment.

As shown in FIG. 33, a power supply system 30 for driving reactor coolant recirculation pumps of this eighteenth embodiment is configured in such a manner that normal-operation busbars A and B are each connected to the main on-site power line 2 by a house transformer HT, one rectifier REC for converting AC power to DC power is connected to each of the normal-operation busbars A and B, and five inverters INV for converting DC power to AC power are connected to each of these rectifiers REC.

An inverter that causes the generation of positive and negative voltages with respect to a neutral point is used as each of these inverters INV. In addition, one recirculation pump RIP is connected to each of these inverters INV in this embodiment, and an AC storage device 27 is connected by a rectifier device 26 to the input portions of each group of inverters INV. The AC storage device 27 is configured of a superconductive coil, an MG set having a flywheel FW, a high-speed electrical motor having a flywheel FW, or the like, in the same way as in the sixteenth embodiment, so that it can operate as a back-up power supply if the corresponding rectifier REC should fail.

This embodiment resembles the first embodiment in that electrical power is supplied to the main on-site power line 2 by the main generator MG, the electrical power supplied to the main on-site power line 2 is supplied to the recirculation pumps RIP through the house transformers HT on the one hand, and it is also transmitted to external transmission cables through a transmission transformer MT.

In addition, this embodiment is not limited to the numbers of components shown in FIG. 33, so long as at least one rectifier REC is connected to one normal-operation busbar, a plurality of inverters INV are also connected for one rectifier REC, and one recirculation pump RIP is connected to each inverter INV.

This eighteenth embodiment makes it possible to use a comparatively simple structure of inexpensive rectifiers and inverters to control the rotational speed of the recirculation pumps RIP, in other words, the coolant flow rate and reactivity within the core. In addition, the use of inverters INV that generate positive and negative voltages with respect to a neutral point make it possible to simplify the circuit configuration in comparison with the sixteenth embodiment and thus enable an even simpler, more compact system configuration. Furthermore, since the storage device 27 is provided as a back-up power supply, the reactor can continue operating even when power is lost.

This ends the description of the eighteenth embodiment. The description now turns to a power supply system for driving reactor coolant recirculation pumps in accordance with a nineteenth embodiment of this invention.

Figure 34:
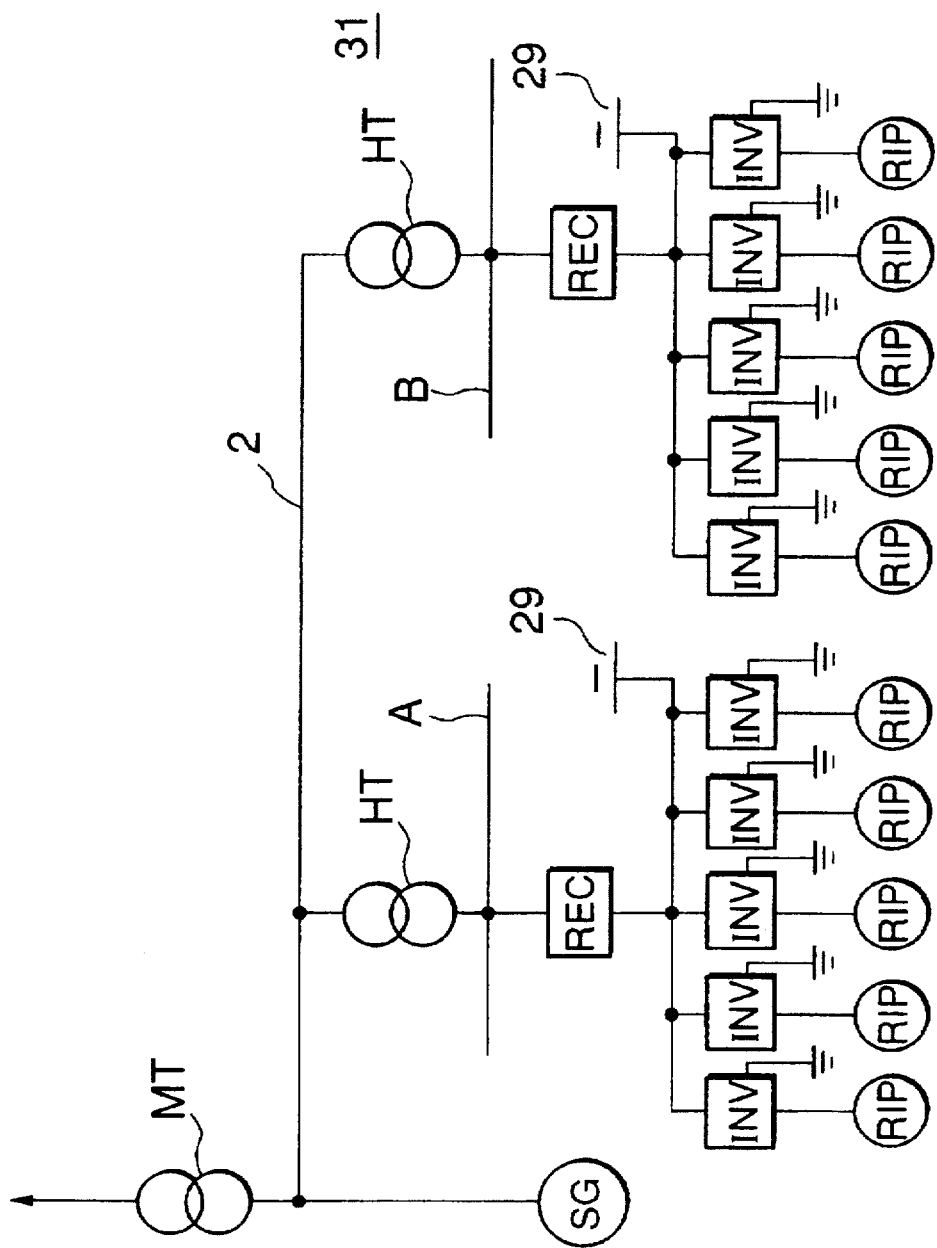
FIG. 34 shows the configuration of a nineteenth embodiment of the power supply system for driving reactor coolant recirculation pumps.

The nineteenth embodiment of this invention relates to an aspect of the invention that is set forth in claim 19 herein, and it differs from the above seventeenth embodiment in the use of an inverter that causes the generation of positive and negative voltages with respect to a neutral point as each inverter INV. The configuration of a power supply system 31 for driving reactor coolant recirculation pumps of this nineteenth embodiment is shown in FIG. 34. Note that components thereof that are the same as those of the seventeenth embodiment are denoted by the same reference numbers, to facilitate comprehension of this embodiment.

As shown in FIG. 34, a power supply system 31 for driving reactor coolant recirculation pumps in accordance with the nineteenth embodiment of this invention is configured in such a manner that normal-operation busbars A and B are each connected to the main on-site power line 2 by a house transformer HT, one rectifier REC for converting AC power to DC power is connected to each of the normal-operation busbars A and B, and five inverters INV for converting DC power to AC power are connected to each of these rectifiers REC. An inverter that causes the generation of positive and negative voltages with respect to a neutral point is used as each of these inverters INV. In addition, one recirculation pump RIP is connected to each of these inverters INV in this embodiment, and a DC storage device 29 is connected to the input portions of each group of inverters INV. The AC storage device 29 is configured of a battery, fuel cell, or the like, in the same way as in the seventeenth embodiment, to operate as a back-up power supply if the corresponding rectifier REC should fail.

This embodiment resembles the first embodiment in that electrical power is supplied to the main on-site power line 2 by the main generator MG, the electrical power supplied to the main on-site power line 2 is supplied to the recirculation pumps RIP through the house transformers HT on the one hand, and it is also transmitted to external transmission cables through a transmission transformer MT.

In addition, this embodiment is not limited to the numbers of components shown in FIG. 34, at least one rectifier REC is connected to one normal-operation busbar. In addition, a plurality of inverters INV is connected to each rectifier REC, one recirculation pump RIP is connected to each inverter INV.

This nineteenth embodiment makes it possible to use a comparatively simple structure of inexpensive rectifiers and inverters to control the rotational speed of the recirculation pumps RIP, in other words, the coolant flow rate and reactivity within the core. In addition, the use of inverters INV that generate positive and negative voltages with respect to a neutral point make it possible to simplify the circuit configuration in comparison with the seventeenth embodiment and thus enable an even simpler, more compact system configuration. Furthermore, the provision of the DC storage device 29 as a back-up power supply enables the reactor to operate safely, even when power is lost.

As described above, the present invention makes it possible to design a simple configuration for the power supply system that drives coolant recirculation pumps in a nuclear reactor, and thus provides a power supply system for driving reactor coolant recirculation pumps that has an inexpensive installation configuration, is simpler, and is thus highly reliable.

In addition, the provision of a back-up power supply or means of exerting an inertial force ensures that the resultant power supply apparatus is not readily affected by a power failure, thus making it possible to provide an economical and inexpensive power supply system for driving reactor coolant recirculation pumps that ensures that the operation of the reactor can be halted safely if a power loss occurs.

Aspects of this invention set forth in claims 1 to 9 herein make it possible to provide a power supply system for driving reactor coolant recirculation pumps in which there is an extremely low probability of any number of RIPs halting simultaneously, other than two RIPs, and which makes it possible to maintain the rated output of the plant if two RIPs should halt simultaneously, in addition to the above-described effects that are common to all aspects of this invention.

Furthermore, aspects of this invention set forth in claims 10 to 13 herein make it possible to provide a power supply system for driving reactor coolant recirculation pumps in which high-frequency current leakage into the normal operation busbar by the static adjustable-frequency power supply device ASD is prevented, in addition to the above-described effects that are common to all aspects of this invention.

Finally, aspects of this invention set forth in Claims 16 to 19 herein make it possible to provide a power supply system for driving reactor coolant recirculation pumps with an extremely simple installation configuration enabled by the use of rectifiers and inverters for controlling the flow rates of the recirculation pumps, in addition to the above-described effects that are common to all aspects of this invention.

What is claimed is:

1. A power supply system for driving reactor coolant recirculation pumps within an advanced boiling water reactor, wherein: at least one normal-operation busbar branches off from either a main on-site power line or from a power line for auxiliary power generation that branches off from said main on-site power line, with a house transformer therebetween; at least one MG set is connected to one of said normal-operation busbars; one static adjustable-frequency power supply device is connected to each of said MG sets; and a plurality of reactor coolant recirculation pumps is connected to each of said static adjustable-frequency power supply devices.

2. A power supply system for driving reactor coolant recirculation pumps within an advanced boiling water reactor, wherein: two power lines for auxiliary power generation branch off from a main on-site power line; two normal-operation busbars branch off from each of said power lines for auxiliary power generation, with a house transformer therebetween; two static adjustable-frequency power supply devices are connected directly to one normal-operation busbar of the first power line for auxiliary power generation; one static adjustable-frequency power supply device is connected via an MG set to the remaining normal-operation busbar of said power line for auxiliary power generation; one static adjustable-frequency power supply device is connected via an MG set to each of said two normal-operation busbars of the other power line for auxiliary power generation; and two reactor coolant recirculation pumps are connected to each of said static adjustable-frequency power supply devices.

3. A power supply system for driving reactor coolant recirculation pumps within an advanced boiling water reactor, wherein: two power lines for auxiliary power generation branch off from a main on-site power line; two normal-operation busbars branch off from each of said power lines for auxiliary power generation, with a house transformer therebetween; one static adjustable-frequency power supply device is connected directly to one normal-operation busbar of the first power line for auxiliary power generation and also one static adjustable-frequency power supply device is connected via an MG set thereto; one static adjustable-frequency power supply device is connected via an MG set to the remaining normal-operation busbar of said power line for auxiliary power generation; one static adjustable-frequency power supply device is connected directly to one normal-operation busbar of the other power line for auxiliary power generation; one static adjustable-frequency power supply device is connected via an MG set to the remaining normal-operation busbar of said power line for auxiliary power generation; and two reactor coolant recirculation pumps are connected to each of said static adjustable-frequency power supply devices.

4. A power supply system for driving reactor coolant recirculation pumps within an advanced boiling water reactor, wherein: two power lines for auxiliary power generation branch off from a main on-site power line; two normal-operation busbars branch off from each of said power lines for auxiliary power generation, with a house transformer therebetween; one static adjustable-frequency power supply device is connected directly to one normal-operation busbar of the first power line for auxiliary power generation and also one static adjustable-frequency power supply device is connected via an MG set thereto; one static adjustable-frequency power supply device is connected directly to the remaining normal-operation busbar of said power line for auxiliary power generation; one static adjustable-frequency power supply device is connected via an MG set to one normal-operation busbar of the other power line for auxiliary power generation; one static adjustable-frequency power supply device is connected via an MG set to the remaining normal-operation busbar of said power line for auxiliary power generation; and two reactor coolant recirculation pumps are connected to each of said static adjustable-frequency power supply devices.

5. A power supply system for driving reactor coolant recirculation pumps within an advanced boiling water reactor, wherein: two power lines for auxiliary power generation branch off from a main on-site power line; two normal-operation busbars branch off from each of said power lines for auxiliary power generation, with a house transformer therebetween; two static adjustable-frequency power supply devices are connected, each via an MG set, to one normal-operation busbar of the first power line for auxiliary power generation; one static adjustable-frequency power supply device is connected via an MG set to the remaining normal-operation busbar of said power line for auxiliary power generation; one static adjustable-frequency power supply device is connected directly to one normal-operation busbar of the other power line for auxiliary power generation; one static adjustable-frequency power supply device is connected directly to the remaining normal-operation busbar of said power line for auxiliary power generation; and two reactor coolant recirculation pumps are connected to each of said static adjustable-frequency power supply devices.

6. A power supply system for driving reactor coolant recirculation pumps within an advanced boiling water reactor, wherein: two power lines for auxiliary power generation branch off from a main on-site power line; two normal-operation busbars branch off from each of said power lines for auxiliary power generation, with a house transformer therebetween; two static adjustable-frequency power supply devices are connected, each via an MG set, to one normal-operation busbar of the first power line for auxiliary power generation; one static adjustable-frequency power supply device is connected directly to the remaining normal-operation busbar of said power line for auxiliary power generation; one static adjustable-frequency power supply device is connected directly to one normal-operation busbar of the other power line for auxiliary power generation; one static adjustable-frequency power supply device is connected via an MG set to the remaining normal-operation busbar of said power line for auxiliary power generation; and two reactor coolant recirculation pumps are connected to each of said static adjustable-frequency power supply devices.

7. A power supply system for driving reactor coolant recirculation pumps within an advanced boiling water reactor, wherein: first and second power lines for auxiliary power generation branch off from a main on-site power line; first and second starter power lines that take electrical power from an independent power supply are provided; said first starter power line is connected via a breaker means to said first power line for auxiliary power generation; said second starter power line is connected via a breaker means to said second power line for auxiliary power generation; two normal-operation busbars branch off from each of said first and second power lines for auxiliary power generation, with a house transformer therebetween; two common busbars branch off from each of said first and second starter power lines, with a starter transformer therebetween; one static adjustable-frequency power supply device is connected via an MG set to one normal-operation busbar of said first power line for auxiliary power generation and also one static adjustable-frequency power supply device is connected directly to the remaining normal-operation busbar thereof; one static adjustable-frequency power supply device is connected via an MG set to one normal-operation busbar of said second power line for auxiliary power generation and also one static adjustable-frequency power supply device is connected directly to the remaining normal-operation busbar thereof; one static adjustable-frequency power supply device is connected via an MG set to one common busbar of said first starter power line; and two reactor coolant recirculation pumps are connected to each of said static adjustable-frequency power supply devices.

8. A power supply system for driving reactor coolant recirculation pumps within an advanced boiling water reactor, wherein: first and second power lines for auxiliary power generation branch off from a main on-site power line; first and second starter power lines that take electrical power from an independent power supply are provided; said first starter power line is connected via a breaker means to said first power line for auxiliary power generation; said second starter power line is connected via a breaker means to said second power line for auxiliary power generation; two normal-operation busbars branch off from each of said first and second power lines for auxiliary power generation, with a house transformer therebetween; two common busbars branch off from each of said first and second starter power lines, with a starter transformer therebetween; one static adjustable-frequency power supply device is connected directly to one normal-operation busbar of said first power line for auxiliary power generation and also one static adjustable-frequency power supply device is connected via an MG set to the remaining normal-operation busbar thereof; one static adjustable-frequency power supply device is connected via an MG set to one normal-operation busbar of said second power line for auxiliary power generation and also one static adjustable-frequency power supply device is connected via an MG set to the remaining normal-operation busbar thereof; one static adjustable-frequency power supply device is connected directly to one common busbar of said second starter power line; and two reactor coolant recirculation pumps are connected to each of said static adjustable-frequency power supply devices.

9. A power supply system for driving reactor coolant recirculation pumps within an advanced boiling water reactor, wherein: at least one MG set is connected to one normal-operation busbar; a plurality of static adjustable-frequency power supply devices is connected to each of said MG sets; and a plurality of reactor coolant recirculation pumps is connected to each of said static adjustable-frequency power supply devices.

10. A power supply system for driving reactor reactor coolant recirculation pumps within an advanced boiling water reactor, wherein: at least one normal-operation busbar branches off from either a main on-site power line or from a power line for auxiliary power generation that branches off from said main on-site power line, with a house transformer therebetween; at least three MG sets are connected to the total number of said normal-operation busbars; at least one static adjustable-frequency power supply device is connected to each of said MG sets; and a plurality of reactor coolant recirculation pumps is connected to each of said static adjustable-frequency power supply devices.

* * * * *